United States Patent
Park et al.

(10) Patent No.: US 10,455,532 B2
(45) Date of Patent: Oct. 22, 2019

(54) SYNCHRONIZATION PROCEDURE AND RESOURCE CONTROL METHOD AND APPARATUS FOR COMMUNICATION IN D2D SYSTEM

(71) Applicant: Samsung Electronics Co., Ltd., Suwon-si, Gyeonggi-do (KR)

(72) Inventors: Seunghoon Park, Seoul (KR); Hyunseok Ryu, Yongin-si (KR); Peng Xue, Hwaseong-si (KR); Chiwoo Lim, Suwon-si (KR); Sangwon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 342 days.

(21) Appl. No.: 14/864,009

(22) Filed: Sep. 24, 2015

(65) Prior Publication Data

US 2016/0095074 A1    Mar. 31, 2016

Related U.S. Application Data

(60) Provisional application No. 62/055,232, filed on Sep. 25, 2014, provisional application No. 62/076,156, filed on Nov. 6, 2014.

(30) Foreign Application Priority Data

Sep. 18, 2015  (KR) .................. 10-2015-0132580

(51) Int. Cl.
*H04W 72/10* (2009.01)
*H04W 56/00* (2009.01)
*H04W 8/00* (2009.01)

(52) U.S. Cl.
CPC ......... *H04W 56/001* (2013.01); *H04W 8/005* (2013.01); *H04W 72/10* (2013.01)

(58) Field of Classification Search
CPC .............. H04W 56/00; H04W 56/0045; H04B 7/2662; H04J 2011/0096
See application file for complete search history.

(56) References Cited

U.S. PATENT DOCUMENTS 6,487,183 B1 * 11/2002 Lo ................... H04B 7/18582
                                                       370/326
8,213,360 B2    7/2012 Koskela et al.
(Continued)

FOREIGN PATENT DOCUMENTS

CN        103188742 A       7/2013
CN        104066126 A       9/2014
(Continued)

OTHER PUBLICATIONS

Samsung, 'Identifier in scheduling assignment for D2D communication', R1-142107, 3GPP TSG RAN WG1 #77, Seoul, South Korea, See pp. 1-4, May 10, 2014.
(Continued)

*Primary Examiner* — Hassan A Phillips
*Assistant Examiner* — Prenell P Jones
(74) *Attorney, Agent, or Firm* — Jefferson IP Law, LLP

(57) ABSTRACT

The present disclosure relates to a 5th generation (5G) or pre-5G communication system for supporting a higher data rate in comparison to the 4G communication system, such as long term evolution (LTE). A method for a terminal to establish synchronization with another terminal in a network supporting device-to-device (D2D) communication is provided. The method includes scanning, at the terminal, for synchronization signals from at least one base station, acquiring, when a synchronization signal is received from a base station, synchronization with the base station based on the synchronization signal, measuring power of the synchronization signal received from the base station, and transmitting, when data to be transmitted are generated in idle mode (Continued)

and the received signal power is less than a received signal power, a synchronization signal as a synchronization relaying terminal.

12 Claims, 47 Drawing Sheets

(56) References Cited

U.S. PATENT DOCUMENTS

| | | | | |
|---|---|---|---|---|
| 2007/0155377 | A1* | 7/2007 | Horiguchi | H04W 36/38 |
| | | | | 455/422.1 |
| 2010/0050036 | A1 | 2/2010 | Chun et al. | |
| 2010/0177757 | A1 | 7/2010 | Kim et al. | |
| 2010/0220679 | A1 | 9/2010 | Abraham et al. | |
| 2010/0261469 | A1* | 10/2010 | Ribeiro | H04W 99/00 |
| | | | | 455/423 |
| 2012/0188897 | A1 | 7/2012 | Shen | |
| 2012/0281566 | A1 | 11/2012 | Pelletier et al. | |
| 2013/0155962 | A1 | 6/2013 | Hakola et al. | |
| 2013/0178221 | A1 | 7/2013 | Jung et al. | |
| 2013/0182626 | A1 | 7/2013 | Kuo | |
| 2013/0308551 | A1 | 11/2013 | Madan et al. | |
| 2014/0011534 | A1* | 1/2014 | Dimou | H04W 16/08 |
| | | | | 455/522 |
| 2014/0112162 | A1 | 4/2014 | Tavildar et al. | |
| 2014/0112194 | A1* | 4/2014 | Novlan | H04W 48/16 |
| | | | | 370/254 |
| 2014/0126403 | A1* | 5/2014 | Siomina | H04W 24/10 |
| | | | | 370/252 |
| 2014/0141789 | A1 | 5/2014 | Tarokh et al. | |
| 2014/0233476 | A1 | 8/2014 | Kwak et al. | |
| 2014/0242995 | A1* | 8/2014 | Lee | H04W 36/20 |
| | | | | 455/436 |
| 2014/0254429 | A1 | 9/2014 | Wang et al. | |
| 2014/0301228 | A1* | 10/2014 | Kwak | H04W 8/005 |
| | | | | 370/252 |
| 2014/0321314 | A1 | 10/2014 | Fodor et al. | |
| 2015/0043398 | A1* | 2/2015 | Fwu | H04L 5/14 |
| | | | | 370/280 |
| 2015/0071272 | A1 | 3/2015 | Vermani et al. | |
| 2015/0110020 | A1 | 4/2015 | Li et al. | |
| 2015/0112924 | A1* | 4/2015 | Vanturennout | G06F 17/30174 |
| | | | | 707/610 |
| 2015/0133132 | A1 | 5/2015 | Li et al. | |
| 2015/0181546 | A1* | 6/2015 | Freda | H04W 56/0015 |
| | | | | 370/336 |
| 2016/0029429 | A1 | 1/2016 | Peng et al. | |
| 2016/0044620 | A1* | 2/2016 | Bagheri | H04W 76/14 |
| | | | | 370/252 |
| 2016/0142898 | A1* | 5/2016 | Poitau | H04W 76/14 |
| | | | | 370/329 |
| 2016/0192420 | A1* | 6/2016 | Kim | H04W 74/00 |
| | | | | 370/329 |
| 2016/0227496 | A1* | 8/2016 | Panteleev | H04W 76/18 |
| 2016/0353397 | A1* | 12/2016 | Jung | H04W 56/001 |
| 2017/0048161 | A1* | 2/2017 | Vanturennout | G06F 9/4406 |
| 2017/0303217 | A1* | 10/2017 | Lee | H04J 11/00 |
| 2018/0219716 | A1* | 8/2018 | Chae | H04J 11/00 |

FOREIGN PATENT DOCUMENTS

| | | |
|---|---|---|
| EP | 2665325 A1 | 11/2013 |
| EP | 2900022 A1 | 7/2015 |
| WO | 2013/180991 A1 | 12/2013 |
| WO | 2013-181515 A2 | 12/2013 |
| WO | 2013-181807 A1 | 12/2013 |
| WO | 2013-181823 A1 | 12/2013 |
| WO | 2014-097224 A1 | 6/2014 |
| WO | 2015138083 A1 | 9/2015 |

OTHER PUBLICATIONS

Qualcomm Incorporated, 'Control for D2D broadcast communication', R1-141966, 3GPP TSG-RAN WG1 #77, Seoul, Korea, See pp. 1-8, May 10, 2014.

Sharp, 'D2D Network Coverage Definition & Mode Selection', R1-142208 3GPP TSG RAN WG1 Meeting #77, Seoul, Korea, May 10, 2014.

ZTE, 'SA and Data Resource Allocation for Mode 1', R1-142232, 3GPP TSG-RAN WG1 Meeting #77, Seoul, Korea, May 10, 2014.

ZTE, 'Considerations on D2D Proximity Discovery', R2-132680, 3GPP TSG-RAN WG2 Meeting #83 R2-132680, Barcelona, Spain, Aug. 10, 2013.

Ericsson, 'Synchronization Procedures for D2D Discovery and Communication', R1-140773, 3GPP TSG RAN WG1 Meeting #76, Prague, Czech Republic, Jan. 31, 2014.

ZTE, 'Discussions on necessity of supporting Discovery Type 2', R1-135373, 3GPP TSG-RAN WG1 #75, San Francisco, USA, Nov. 2, 2013.

Ericsson, "On Scheduling Assignments and Receiver Behaviour", R1-141391, 3GPP TSG-RAN WG1 Meeting #76bis, Shenzhen, China, Mar. 21, 2014.

"3GPP; TSG RAN; Study on LTE Device to Device Proximity Services; Radio Aspects (Release 12)", 36GPP TR 36.843, Mar. 27, 2014.

CATT, "Discussion on D2D Synchronization Sources", R1-142894, 3GP TSG RAN WG1 Meeting #78, Dresden Germany, Aug. 10, 2014.

CATT, "Resource Allocation for D2D Synchronization", R1-148292, 3GPP TSG RAN WG1 Meeting #78, Dresden, Germany, Aug. 10, 2014.

KDDI, "Discussion on Triggering Condition for D2DSS Transmission", R1-143159, 3GPP TSG RAN WG1 Meeting #78, Dresden, Germany, Aug. 10, 2014.

CATT, Resource allocation for D2D synchronization, 3GPP TSG RAN WG1 Meeting #78, R1-142892, Dresden, Germany, Aug. 10, 2014.

Chinese Office Action dated Jul. 2, 2019, issued in the Chinese Application No. 201580052290.7.

* cited by examiner

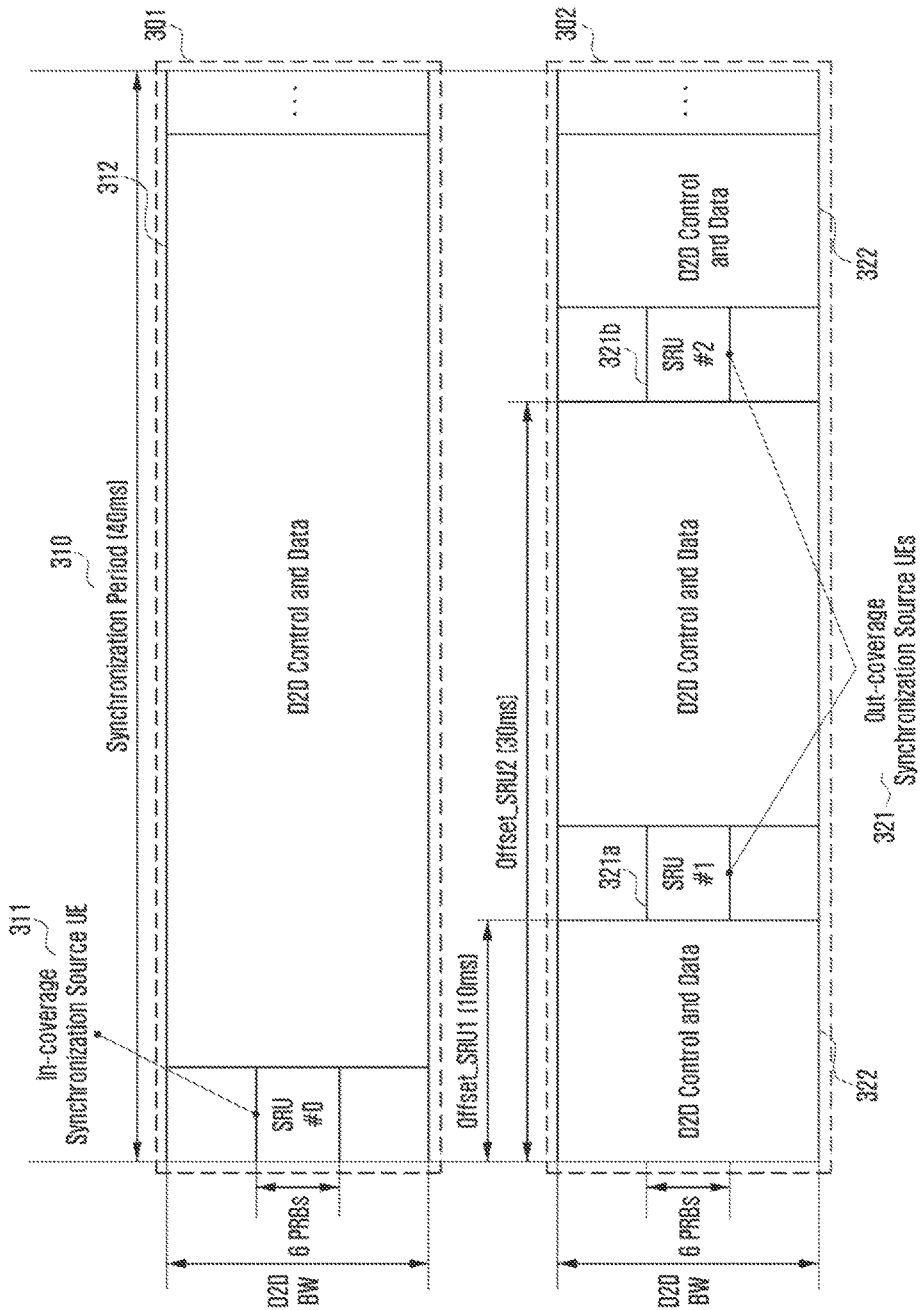

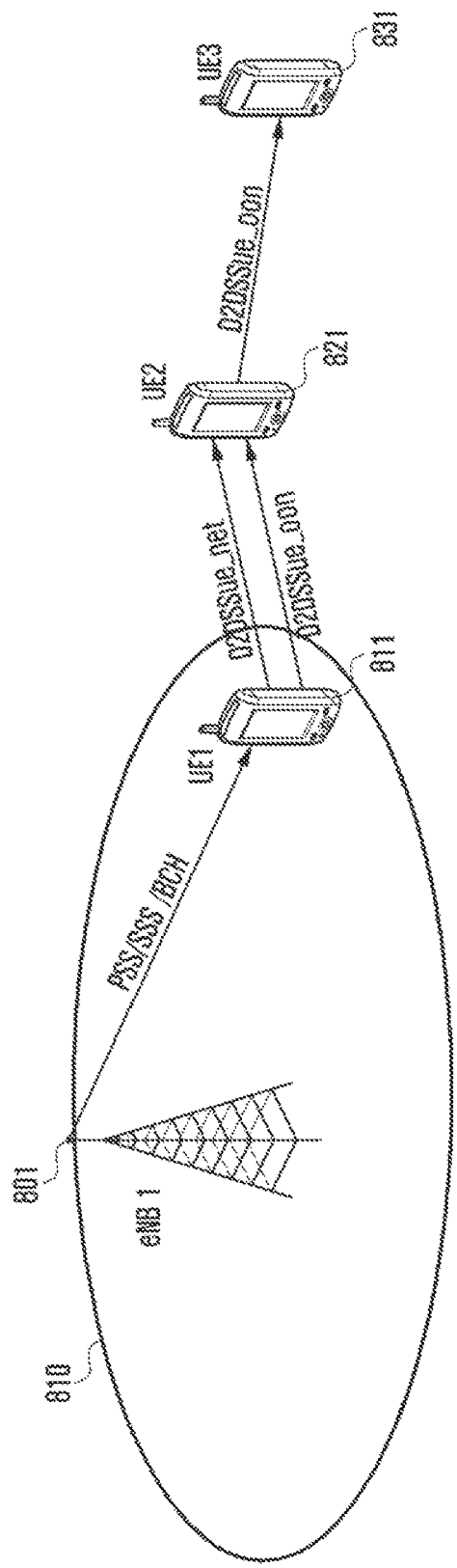

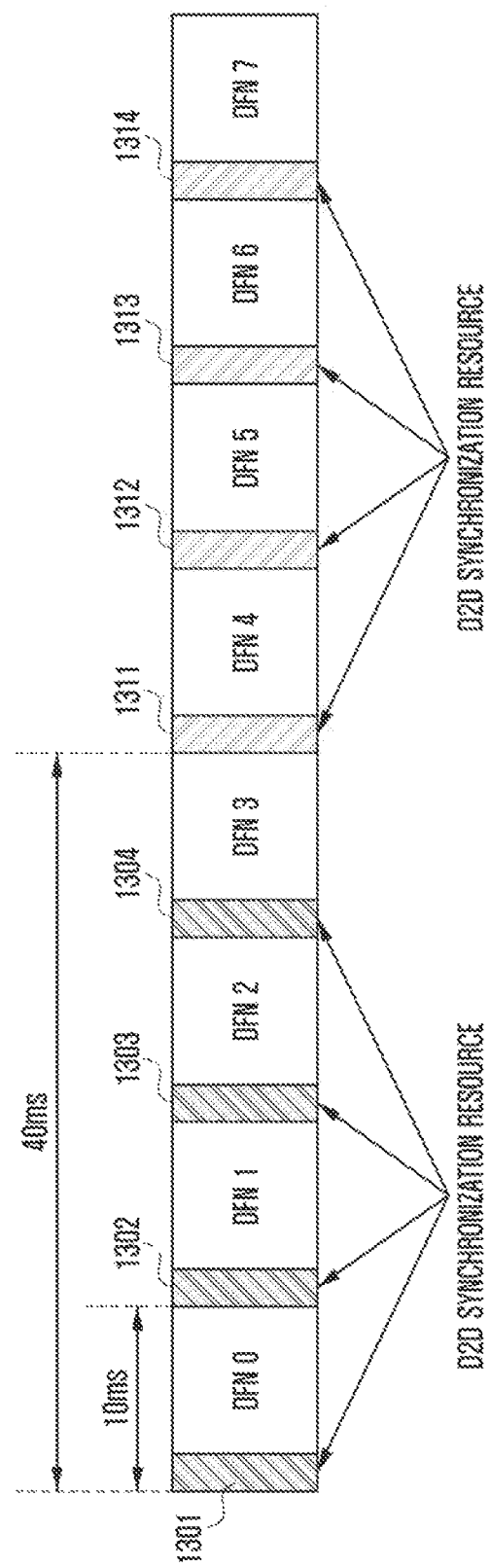

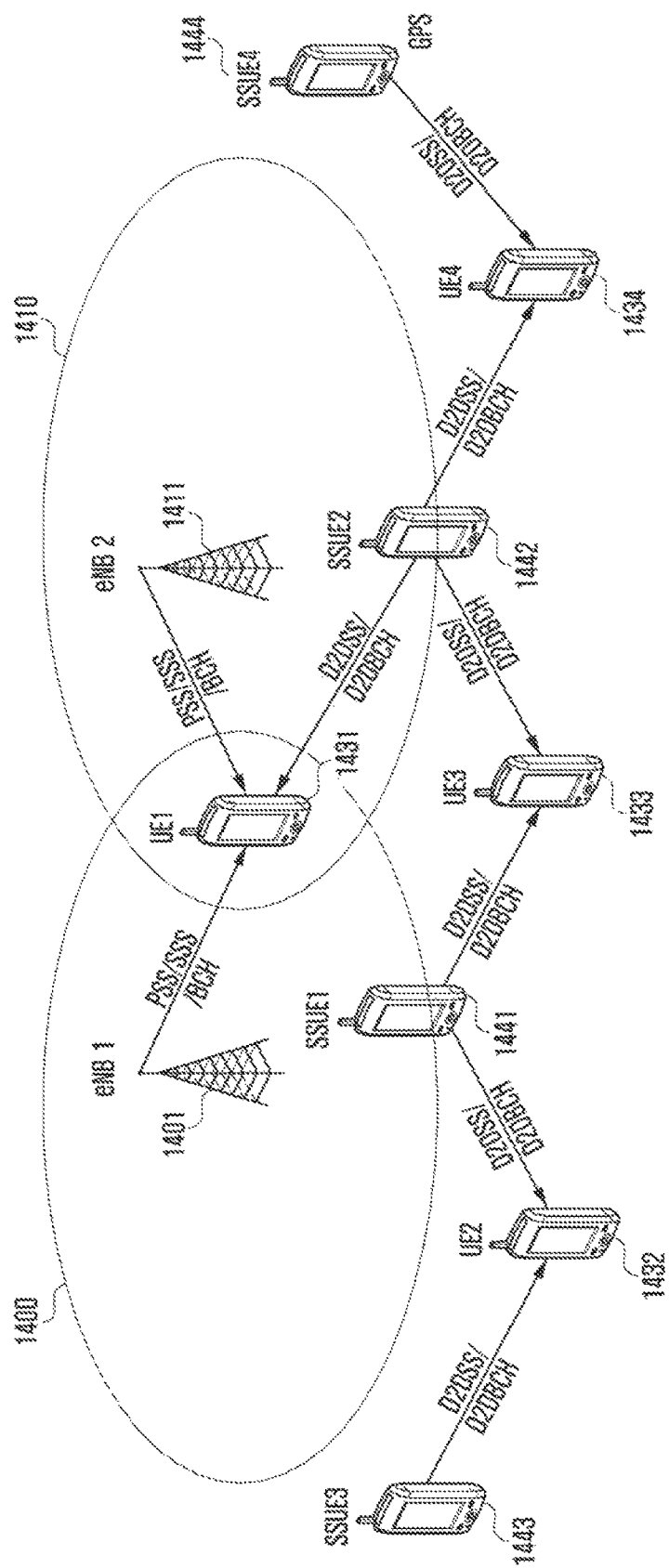

SYNCHRONIZATION PROCEDURE AND RESOURCE CONTROL METHOD AND APPARATUS FOR COMMUNICATION IN D2D SYSTEM

CROSS-REFERENCE TO RELATED APPLICATIONS

This application claims the benefit under 35 U.S.C. § 119(e) of U.S. provisional patent application filed on Sep. 25, 2014 in the U.S. Patent and Trademark Office and assigned Ser. No. 62/055,232, and U.S. provisional patent application filed on Nov. 6, 2014 in the U.S. Patent and Trademark Office and assigned Ser. No. 62/076,156, and under 35 U.S.C § 119(a) of a Korean patent application filed on Sep. 18, 2015 in the Korean Intellectual Property Office and assigned Serial number 10-2015-0132580, the entire disclosure of each of which is hereby incorporated by reference.

TECHNICAL FIELD

The present disclosure relates to a synchronization method comprised of a synchronization resource structure and synchronization procedure for device-to-device (D2D) communication and a transmission resource structure and resource control technique of a terminal in the D2D Discovery and Communication.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, and large scale antenna techniques are discussed in 5G communication systems.

In addition, in 5G communication systems, development for system network improvement is underway based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

With the popularization of smartphones, data traffic is increasing rapidly. The increasing number of smartphone users spurs the consumption of smartphone-based application services, such as social networking service (SNS) and games, resulting in an unprecedented increase in data traffic. More particularly, beyond the person-to-person communication, if the machine intelligent communication (such as person-to-machine and machine-to-machine communications) is activated as a new market field, the traffic concentration to the base station will exceed existing limitations.

There is therefore a need for a technology to address such issues, and direct communication between devices is coming into the spotlight as one such technology. This so called device to device (D2D) communication technology is promising for the licensed band communication systems, such as cellular communication systems and unlicensed band communication systems, such as wireless LAN (WLAN) systems.

In a cellular communication system, the D2D communication is attractive in terms of increasing traffic accommodation capability and reducing overload. For example, since the D2D communication is implemented in such a way that the multiple of user equipment (UEs) located in the same cell or adjacent cells establish a D2D link and exchange data through the D2D link without involvement of any evolved Node B (eNB), it is advantageous to reduce the number of communication links from 2 to 1.

The long term evolution (LTE)-based D2D communication is characterized by the D2D discovery and D2D communication. The D2D discovery is a process in which a UE determines identities or interests of other UEs located closely or advertises identity or interest of the UE to other UEs located nearby. At this time, the identity and interest may be represented by a UE identifier (ID), an application identifier, or a service identifier, and can be configured diversely depending on the D2D service and operation scenario.

As a distinguished feature unlike unicast communication in cellular networks, LTE-based D2D communication aims to support broadcast communication for public safety scenarios, and does not provide feedback functions, such as channel measurement reporting, hybrid ARQ (HARQ) and acknowledgement ACK/negative acknowledgement (NACK). The biggest challenge of D2D broadcast communication is to support reliable and seamless D2D communication with high link quality in the absence of the eNB. More particularly, in scenarios where UEs operate in a distributed manner without the help of the eNB, it is required to address the resource conflict issue that occurs when different UEs occupy the same resource.

The main object of D2D communication is to identify communication demands occurring between humans, between humans and things, and between things, and handle traffic arising in local regions in a suitable way while preventing unnecessary waste of radio resources. Thus, current research on D2D communication focus on schemes for efficient D2D discovery that enable many proximate devices to broadcast and receive information on services and content items in an efficient manner.

Currently, the 3rd generation partnership project (3GPP) standardization organization has been working on LTE Release 12 specifications providing D2D communication for public safety purposes.

In D2D communication for public safety purposes, LTE Release 12 attempts to provide a broadcast service supporting the push-to-talk (PTT) function. As D2D communication for public safety is to be operable in the absence of the eNB, UEs have to directly perform procedures related to synchronization and resource allocation among themselves. In the presence of the eNB, the eNB may control UEs to broadcast within resources allocated by the eNB for D2D. In addition, D2D communication for public safety has to account for the case where the eNB is partially unavailable.

It is necessary to establish synchronization between devices to perform D2D communication. A device may establish synchronization with another device by use of timing information received from a synchronous eNB or through a global positioning system (GPS) receiving module. To this end, the device should have access to a synchronous eNB or GPS module.

However, a network operator may not support a synchronous eNB depending upon the communication scheme. In this case, the device may fail to establish synchronization because the device cannot obtain timing information from the synchronous eNB. Additionally, when the device is placed in a GPS shadow area (e.g., between high-rise buildings, inside a tunnel, within a building, and the like), the device may fail to establish synchronization because the device cannot obtain timing information from the GPS receiving module. In other words, the device may fail to initiate D2D communication when the connection to a synchronous eNB or GPS receiving module is not good.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus of supporting device-to-device (D2D) synchronization for Discovery and Communication.

Another aspect of the present disclosure is to provide a synchronization resource structure, synchronization establishment procedure, synchronization signal measurement and condition to be a synchronized terminal, synchronization and resource pool information carried in the synchronization signal, and synchronization procedure for D2D Discovery and Communication of In-Network Coverage, Partial Network Coverage, and Out-of-Network Coverage terminals.

In addition, the present disclosure provides a transmission resource pool selection method for D2D Discovery and Communication.

In accordance with an aspect of the present disclosure, a method for a terminal to establish synchronization with another terminal in a network supporting D2D communication is provided. The method includes scanning, at the terminal, for synchronization signals from at least one base station, acquiring, when a synchronization signal is received from a base station, synchronization with the base station based on the synchronization signal, measuring power of the synchronization signal received from the base station, and transmitting, when data to be transmitted are generated in idle mode and the received signal power is less than a received signal power, a synchronization signal as a synchronization relaying terminal.

In accordance with another aspect of the present disclosure, a terminal supporting Device-to-Device communication is provided. The terminal includes a radio processing unit which transmits to and receives from base stations and other terminals, a memory which stores control data, and a control unit which controls the radio processing unit, wherein the control unit controls scanning, at the terminal, for synchronization signals from at least one base station, acquiring, when a synchronization signal is received from a base station, synchronization with the base station based on the synchronization signal, measuring power of the synchronization signal received from the base station, and transmitting, when data to be transmitted are generated in idle mode and the received signal power is less than a received signal power, a synchronization signal as a synchronization relaying terminal.

In accordance with another aspect of the present disclosure, a method for a terminal to establish synchronization with another terminal in a network supporting D2D communication is provided. The method includes scanning, at the terminal, for synchronization signals from base stations and other terminals, scanning, when no synchronization signal is received from any base station, for synchronization signals from at least one synchronization relaying terminal, acquiring, when a synchronization signal is received from the at least one synchronization relaying terminal, synchronization with the terminal transmitting the synchronization signal having the highest received signal power, and transmitting, when data to be transmitted are generated and the received signal power is less than a received signal power, a synchronization signal as a synchronization relaying terminal.

In accordance with still another aspect of the present disclosure, a terminal supporting Device-to-Device communication is provided. The terminal includes a radio processing unit which transmits to and receives from base stations and other terminals, a memory which stores control data, and a control unit which controls the radio processing unit, wherein the control unit controls scanning, at the terminal, for synchronization signals from base stations and other terminals, scanning, when no synchronization signal is received from any base station, for synchronization signals from at least one synchronization relaying terminal, acquiring, when a synchronization signal is received from the at least one synchronization relaying terminal, synchronization with the terminal transmitting the synchronization signal having the highest received signal power, and transmitting, when data to be transmitted are generated and the received signal power is less than a received signal power, a synchronization signal as a synchronization relaying terminal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 3A and 3B illustrate a resource structure for D2D synchronization according to an embodiment of the present disclosure;

FIGS. 8A and 8B illustrate scenarios for selecting a synchronization sequence between an IC and out-of-coverage OOC UEs according to an embodiment of the present disclosure;

FIGS. 13A, 13B, 13C, and 13D illustrate transmissions of frame numbers and master information block (MIB) or synchronization resource in a long term evolution (LTE) system according to an embodiment of the present disclosure;

FIG. 14 is a diagram illustrating D2D frame number determination operations in In-coverage and Out-of-coverage network scenarios according to an embodiment of the present disclosure;

Throughout the drawings, like reference numerals will be understood to refer to like parts, components, and structures.

DETAILED DESCRIPTION

Figure 1:
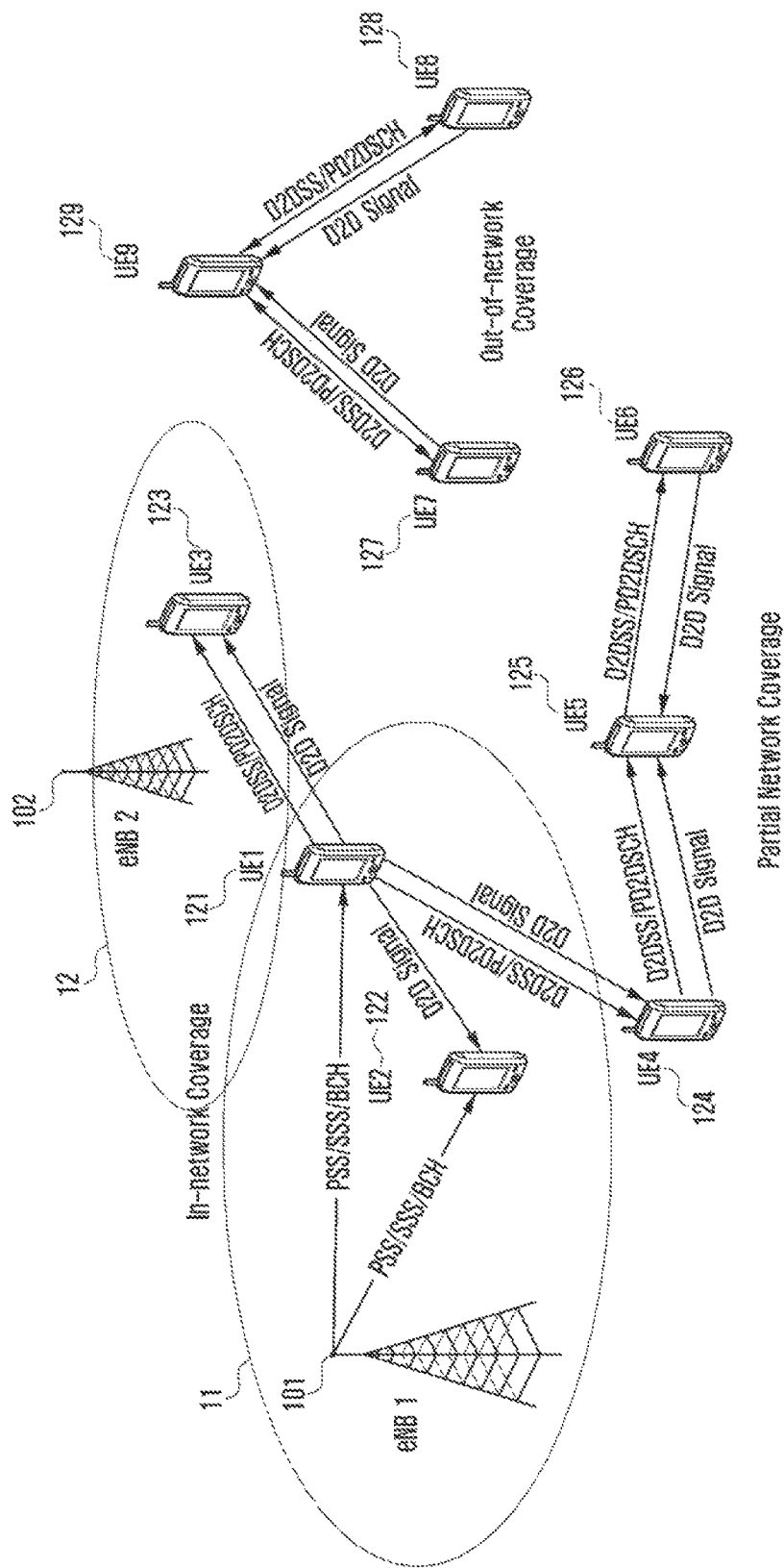
FIG. 1 illustrates operational regions, procedure, signals, and messages for Device-to-Device (D2D) synchronization according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

First, a description is made of a device to device (D2D) communication technology as the basis of the present disclosure.

It is assumed that the protocol layers of the user equipment (UE) include a D2D application layer, a D2D management layer, and a D2D transport layer. The D2D application layer accommodates D2D service application programs running on the operating system (OS) of the UE, the D2D management layer is responsible for the function of converting the discovery information generated by a D2D application program to a format suited to the transport layer, and the transport layer corresponds to the physical layer (PHY)/media access control (MAC) layer of the LTE or Wi-Fi wireless communication standard. The D2D discovery is performs in the following procedure. If the user executes the D2D application program, the application layer generates discovery information to the D2D management layer. The management layer converts the discover information received from the application layer to a management layer message. The management layer message is transmitted through the transport layer of the UE, and the UEs receiving the message operates in the reverse order of the transmission process.

The D2D communication is a communication method of exchanging traffic between UEs without passing through any infrastructure, such as an evolved node B (eNB) or access point (AP). The D2D communication may be performed based on the result of the D2D discovery procedure (i.e., with the discovered multiple of user equipment (UEs) or without a D2D discovery procedure. Whether the D2D discovery procedure is required before the D2D communication depends on the D2D service and operation scenario.

The D2D service scenarios may be categorized into commercial service or non-public safety service and public safety service. The services may include an innumerable number of examples, such as an advertisement, a social network service (SNS), games, a public safety service, and the like.

A brief description is made of the types of the aforementioned services hereinafter.

1) Advertisement: A communication network operator supporting D2D allows preregistered stores, cafes, movie theaters, and restaurants to advertise their identities to the D2D users located within a short distance using the D2D discovery or D2D communication. At this time, the interests may include advertisers' promotion, event information, and discount coupons. If the corresponding identity matches the interest of the user, the user may pay a visit to the corresponding store to collect more information through the legacy cellular communication or the D2D communication. In another example, a personal user may discover a taxi around him/her through the D2D discovery and exchange data about destination or fare through the legacy cellular communication or D2D communication.

2) SNS: The user may transmit other users located within a short distance the user's application and interests in the corresponding application. At this time, the identity or interest used for D2D discovery may be a buddy list or the application identifier. The user may share contents, such as photos and videos, with the neighboring users through the D2D communication after the D2D discovery.

3) Game: The user discovers other users and game applications for playing a mobile game with the neighboring users through the D2D discovery procedure and performs D2D communication for transmitting data necessary for the game.

4) Public Safety Service: The police and firefighters may use the D2D communication technology for the public safety purpose. For example, in the case where the cellular communication is not available due to cellular network breakage caused by emergency situations, such as fires and landslides or natural disasters, such as earthquakes, volcanic eruptions, and tsunamis, the police and firefighters may discover neighboring colleagues or share the emergency situation information with neighboring users using the D2D communication technology.

The current $3^{rd}$ generation partnership project (3GPP) long term evolution (LTE) D2D standardization is directed to both the D2D discovery and D2D communication but varies in standardization range. The current D2D discovery technology targets commercial use and thus has to be designed to operate in the network coverage area of the eNB. For example, the D2D discovery is not supported in the situation where no eNB exists (or out of the coverage area of an eNB). The D2D communication targeting the public safety and disaster network service (i.e., non-commercial use) and thus has to be designed to support both in and out of network coverage as well as a partial network coverage of the eNB (communication in the situation where some UEs are located in the coverage area of the eNB and other UEs are located out of the coverage area of the eNB). Accordingly, the public safety and disaster network service is provided through the D2D communication without support of the D2D discovery.

It is characterized that both the D2D discovery and D2D communication are performed in LTE uplink subframes. For example, the D2D transmitter transmits D2D discovery signal and data for D2D communication in the uplink subframes, and the D2D receiver receives them in the uplink subframes. In the current LTE system, the UE receives data and control information from the eNB through downlink and transmits data and control information to the eNB through uplink, but the operation of the current D2D transmitter/receiver differs from those in the legacy LTE. For example, the D2D function-enabled UE has an orthogonal frequency division multiplexing (OFDM)-based receiver to receive the downlink data and control information from the eNB and a single carrier-frequency division multiplexing (SC-FDM)—based transmitter to transmit uplink data and control information to the eNB. However, since the D2D UE has to support both the cellular mode and D2D mode, the D2D UE has to have an extra SC-FDM receiver to receive the D2D data and control information in uplink as well as the OFDM-based receiver and the SC-FDM-based transmitter.

The current LTE D2D defines two types of D2D discovery schemes according to resource allocation scheme.

1) Type 1 discovery: The eNB broadcasts the uplink resource pool available for D2D discovery in a system information block (SIB) for all D2D UEs within the cell under its control. At this time, the resource size available for D2D (e.g., x consecutive subframes) and period of resource (e.g., repeating at every y seconds) are informed. The transmitting D2D UEs which have received the information select the resource for transmitting D2D discovery signal in a distributed manner. Meanwhile, the receiving D2D UEs have to receive all D2D discovery signals transmitted in the resource fool and including SIB information.

2) Type 2 discovery: The eNB notifies the receiving D2D UEs of the discovery resource pool using the SIB. The discovery signal resources for the transmitting D2D UEs are scheduled by the eNB. At this time, the eNB may perform scheduling in a semi-persistent manner or a dynamic manner.

Similar to the D2D discovery method, the D2D communication method also operates in two modes according to resource allocation scheme.

1) Mode 1: The eNB notifies the D2D transmitter of the data transmission resource for D2D communication directly.

2) Mode 2: The eNB notifies the D2D transmitter of available resource pool, and the UEs select the resource in distributive manner in the resource pool for transmission.

Prior to explanation of the present disclosure, some available interpretation examples of the terms used in the specification are presented. However, it is noted that they are not restricted to the interpretations proposed below.

A Base Station is an entity communicating with a UE and may be referred to as BS, base transceiver station (BTS), node B (NB), eNB, or AP.

A User Equipment is an entity communicating with the Base Station and may be referred to as UE, device, mobile station (MS), mobile equipment (ME), or terminal.

The D2D communication UE may be categorized, according to its role, into one of Synchronization Source UE and Synchronization Destination UE. The Synchronization Source UE (also referred to as Synchronization Source) is the UE of transmitting a D2D synchronization signal (D2DSS), D2D synchronization channel (D2DSCH), D2D broadcast channel (D2DBCH), or D2D system information channel (D2D SICH), and may include a Synchronization Reference UE and Synchronization Relaying UE. Depending on the case, the UE which transmits the D2D synchronization signal may be treated as a 'synchronization reference UE'. The synchronization destination UE (also referred to as D2DUE) is the UE which receives (but not transmits) the synchronization signal or synchronization channel.

The synchronization signal means the signal including a synchronization sequence for use in identifying a cluster or Synchronization Source UE, and the synchronization signal resource means the resource for use in transmitting the synchronization signal. The synchronization signal means the channel including a synchronization message or system message, and the synchronization channel resource means the resource for use in transmitting the synchronization channel. The synchronization source UE may transmit the synchronization signal or synchronization channel. It should be noted that the term 'synchronization signal' is interpreted as a concept including synchronization signal and synchronization channel unless otherwise stated strictly.

The synchronization reference UE (or referred to as independent synchronization source (I-SS)) is the synchronization source UE responsible for the synchronization-representative role of creating a cluster and may determine the time independently with the exception of the case of being located within the eNB coverage area.

The synchronization relaying UE (also referred to as synchronization source (D-SS)) is the synchronization source UE relaying (i.e., receiving and forwarding) the synchronization signal or synchronization channel received from the synchronization reference UE after acquiring the timing synchronization with the synchronization reference UE. For example, when the synchronization relaying UE relays the synchronization from an eNB, the synchronization relaying UE may play a role of the synchronization hub (SH). A special type of synchronization relaying UE may play a role of relaying synchronization reference among a plurality of synchronization reference UEs as a volunteering synchronized UE.

An In-Coverage UE is in a radio resource control (RRC) IDLE state or RRC CONNECTED state.

RRC IDLE: State of selecting an eNB (or cell), monitoring the paging channel, and acquiring system information (SI), but not exchanging data with the eNB.

RRC CONNECTED: State of monitoring the control channel and exchanging data with the eNB through a data channel. State of reporting measurement result associated with the eNB and neighboring eNBs to assist of the scheduling of the eNB.

FIG. 1 illustrates operational regions, procedure, signals, and messages for D2D synchronization according to an embodiment of the present disclosure.

Referring to FIG. 1, a first eNB 101 has a coverage area 11 (In-network coverage) in which a first and second UEs 121 and 122 are located. A second eNB 102 has a coverage area 12 (In-network coverage) in which a third UE 123 is located. A fourth UE 124, a fifth UE 125, and a sixth UE 126 located out of the coverage areas of the first and second eNBs 101 and 102 but they may receive a synchronization signal for D2D communication from the first UE 121 located within the coverage area 11 of the first eNB 101. The fourth to sixth UEs 124 to 126 correspond to a case called Partial Network Coverage.

In FIG. 1, a seventh UE 127, an eighth UE 128, and a ninth UE 129 which are out of the first and second eNB's coverage areas 11 and 12 and receive not no synchronization signal from any UE located in the first and second eNB's coverage areas 11 and 12 correspond to a case called out-of-network coverage.

In the coverage areas (in-network coverage) of the first and second eNBs 101 and 102, the reference time for transmission/reception is determined typically based on the synchronization signal received from the eNB. In the 3GPP LTE standard, the UE determines the symbol and fame boundaries based on the primary synchronization signal (PSS) and secondary synchronization signal (SSS) transmitted by the eNB. The frame number of the currently received frame may be determined based on the broadcast channel (BCH) received from the eNB. In the LTE standard, a system frame number (SFN) is used to indicate the currently received frame, and there are 1024 SFNs from SFN0 to SFN1023. Typically, SFN0 is regarded as the reference frame number of an eNB.

Meanwhile, the In-network coverage operation includes inter-cell operation. In an embodiment of the present disclosure, it is assumed that although the UE performs transmission/reception operation based on the reference time of a synchronization device (i.e., an eNB or a UE) the UE may perform the Discovery and Communication operation based on the resource structure configured based on the reference time received from another synchronization device for an additional reception operation. Such assumption may be applicable to the operations in the inter-cell operation, Partial Network Coverage operation, and Out-of-network Coverage operation.

Among the UEs exemplified in FIG. 1, the first UE 121, the fourth UE 124, the sixth UE 126, the seventh UE 127, and the eighth UE 128 are the UEs transmitting D2D signals for D2D Discovery or D2D Communication. These UEs transmit the D2D signals in FIG. 1. All of the UEs may receive the D2D signals for D2D Discovery or D2D Communication. The first UE 121 may transmit the D2D signal. The UEs may receive the D2D signal transmitted by the first UE 121 in various ways. Descriptions thereof are made with reference to FIG. 1. First, the D2D signal transmitted by the first UE 121 is received by the second UE 122 served by the same serving eNB. Second, the D2D signal transmitted by the first eNB 121 is received by the third UE 123 served by the second eNB (eNB 2). Third, the D2D signal transmitted by the first eNB 121 is received by the fourth eNB 124 located in the partial network coverage area. At this time, the first eNB 121 transmits a synchronization signal and synchronization channel to provide the third and fourth UEs 123 and 124 with the reference fir signal reception with the exception of the second UE 122 which receives the reference time provided by the first eNB 101.

If the UE which transmits the synchronization signal and synchronization channel and the UE which transmits the D2D signal differ from each other, the receiving UE may receive the synchronization signal and channel but not the D2D signal (mismatch). Accordingly, it may be considered whether the UE transmits/receives a D2D signal as a condition to become a UE allowed for transmitting the synchronization signal and channel. Such a condition is described hereinafter.

Although the partial network coverage UEs (i.e., the fourth, fifth, and sixth UEs 124, 125, and 126) are out of the coverage area, they acquire the same reference signal of the first eNB 101 via the first UE 121. If the number of hops relaying the reference time increases, the reference time may be distorted. Accordingly, the number of hops for relaying should be considered. In FIG. 1, the first UE 121 is the first hop, the fourth and fifth UEs 124 and 125 are the second hops, and the sixth UE 126 is the third hop. Since the synchronization signal reception error increases as the number of hops increases, it is necessary to restrict the number of hops. The UE corresponding to the last hop may transmit the synchronization signal and channel according to a predetermined condition. A UE which receives the synchronization signal and channel transmitted by the last hop UE does not relay the synchronization signal and channel any more.

Since the out-of-network coverage UEs (i.e., the seventh to ninth UEs 127 to 129) cannot receive the reference time from any eNB, each of them may become a synchronization UE with independent reference time or, if a synchronization signal is received from a neighboring Independent synchronization source (I-SS) at a received signal power equal to or greater than a predetermined level, matches the reference signal to the synchronization signal. The out-of-network coverage UEs may operate in the synchronization relay mode or flat mode procedure. The seventh UE 127, the eighth UE 128, and the ninth UE 129 located out of the network coverage area are configured to transmit the synchronization signal and channel only when they have the D2D signal to be transmitted to avoid mismatch of the synchronization signal transmission regions. However, it may be necessary to transmit the synchronization signal and channel even when the UE has no D2D signal to be transmitted depending on the synchronization procedure. The detailed description thereof is made hereinafter.

The timing information for UE synchronization is comprised of symbol timing, frame timing, and system frame number. The symbol timing and frame timing may be acquired by receiving the synchronization sequence of the synchronization signal. The SFN is the sequence number of the frame per eNB and may be called differently as D2D frame number or direct frame number (DFN) in the D2D Discovery or Communication. The DFN may be transmitted through the synchronization channel or broadcast channel among the D2D synchronization signal transmitted by the synchronization transmission UE.

Figure 2:
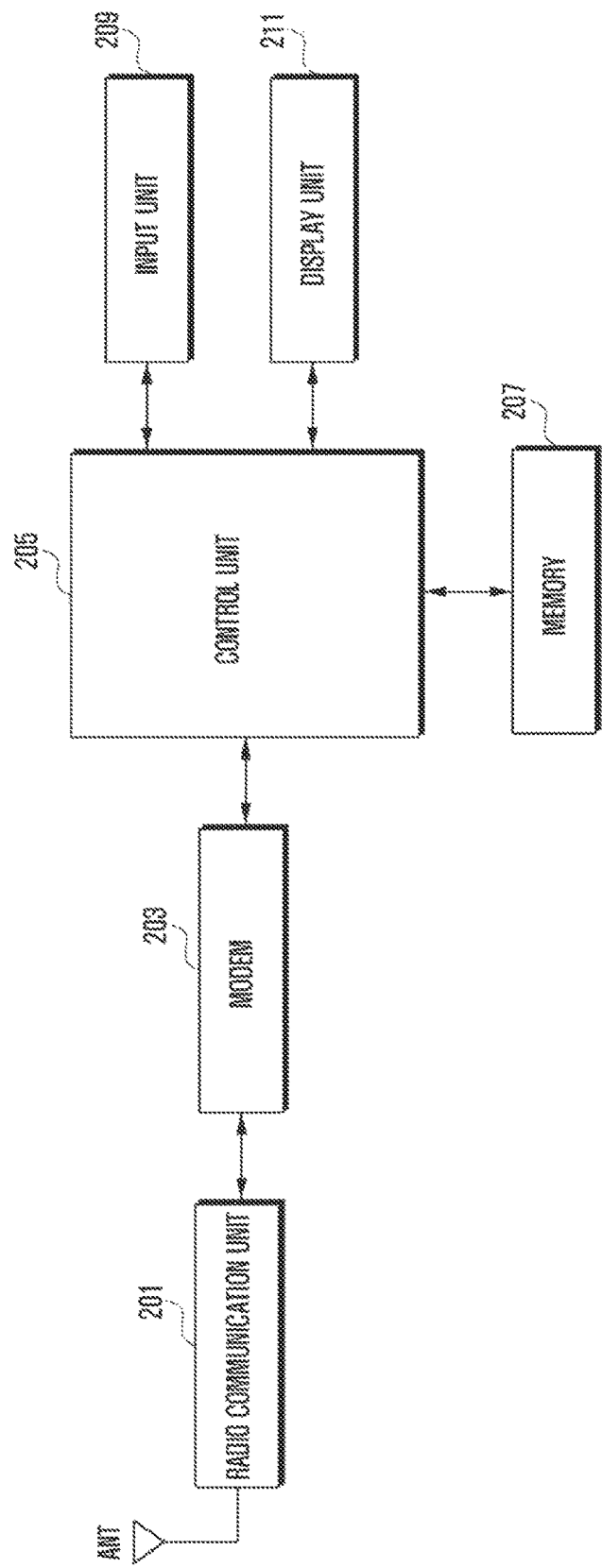
FIG. 2 is a block diagram illustrating a configuration of a user equipment (UE) according to an embodiment of the present disclosure.

FIG. 2 is a block diagram illustrating a configuration of a UE according to an embodiment of the present disclosure.

Referring to FIG. 2, the configuration exemplified in FIG. 2 may be of the first to ninth UEs 121 to 129 exemplified in FIG. 1 and, if necessary, include additional components with or without exclusion of any of the components depicted in FIG. 2. The UE may be any of a smartphone, a handheld device, a laptop computer, a tablet computer, a relay node for D2D communication, and the like.

Referring to FIG. 2, a radio communication unit 201 up-converts and amplifies a signal to be transmitted through the antenna (ANT). The radio communication unit 201 also performs low noise amplification and down conversion on the signal received by through the ANT to output a base band signal to a modem 203. The radio communication unit 201 may include a LTE communication circuitry and another communication circuitry along with the D2D communication circuitry. For example, the radio communication unit 201 may further include a Wi-Fi communication circuitry and/or global positioning system (GPS) reception circuitry.

The modem 203 performs coding and modulation on the signal to be transmitted and, if necessary, converts a digital signal to an analog signal, which is output to the radio communication unit 201. The modem 203 also may perform demodulation and decoding on the data received by the radio communication unit 201 and output the result signal to a control unit 205. If necessary, the modem 203 may convert the analog signal received by the radio communication unit 201 to a digital signal.

The control unit 205 controls overall operations of the UE. The control unit 205 may control the operations performed according to an embodiment of the present disclosure. If the modem 203 is implemented in the form of a communication processor, it may be configured to perform some of the operations of the control unit 205. In a certain case, the modem 203 and the control unit 205 may be integrated into a processor. In a certain case, the radio communication unit 201, the modem 203, the control unit 205, and a memory 207 may be integrated into a single chip. In an embodiment of the present disclosure, the UE can be implemented with various configurations without limitation as far as the UE can perform the operations to be described hereinafter. For convenience of explanation, it is assumed that the control unit 205 controls the overall operation of the UE in the following description.

The memory 207 may store the data according to the user's intension and may have regions for storing data required for the control operation of the control unit 205 and the data generated under the control of the control unit 205. The memory 207 may be implemented in various types, such as a read only memory (ROM), a random access memory (RAM), a hard disc, a compact disc dead only memory (CD-ROM), a digital versatile disc (DVD), and the like.

An input unit 209 is a device for receiving a command or data input by the user and may be implemented with various input means, such as keys, a touchscreen, a voice recognition module, a text recognition module, and the like.

A display unit 211 is a device for displaying current operation state of the UE and may be implemented with various output means, such as a liquid crystal display (LCD), light emitting diodes (LED), a speaker, a vibration motor, and the like.

Descriptions are made of the two embodiments of the present disclosure hereinafter with reference to the accompanying drawings. The first embodiment of the present disclosure is directed to the in-network coverage and out-of-network coverage UE operations for D2D communication. The second embodiment of the present disclosure is directed to the D2D Discovery and D2D Communication.

[1] In-Network Coverage and Out-of-Network Coverage Operations

Synchronization Resource Structure

The synchronization resource may be comprised of synchronization resource units (SRUs) capable of carrying the synchronization signal and channel. An SRU is a set of resources for synchronization signal (D2DSS) and synchronization channel (PD2DSCH) transmitted by a synchronized UE. The length of a synchronization resource unit may be equal to that of an LTE subframe (1 ms). In order to transmit the synchronization signal or the synchronization channel, at least one physical symbol unit is required. Since the synchronization channel is a message, it is possible to insert a pilot pattern for use by the receiver in assessing the physical channel quality into the synchronization channel resource.

The synchronization resource structure may be configured for various scenarios depending on whether to match the timings and transmission resource regions of the in-coverage (IC) UE and the out-of-coverage (OOC) UE. The IC UE may receive an instruction for transmitting the synchronization signal or transmit synchronization signal subject of the IC UE to a condition determined by the eNB or a predetermined condition. Such conditions are described below. If the IC UE transmits the synchronization signal, another IC UE served by a neighboring eNB or an OOC UE may receive the synchronization signal. If the OOC UE receives the synchronization signal from the IC UE and follows the reference timing of the eNB, this OCC UE is called category 1 OOC UE (OOC_UE_cat1). Otherwise, the OCC UE is called category 2 OOC UE (OOC_UE_cat2). Depending on the configuration of synchronization operation, if the OOC UE receives the synchronization signal from the IC UE and abides by the reference timing of the eNB, three types of UEs, i.e., IC UE, category 1 OOC UE, and category 2 OOC UE, exist. Meanwhile, if the OOC UE receives the synchronization signal from the IC UE and maintains the reference timing used in the out-of-coverage area but does not abide by the reference timing of the eNB, two types of UEs, i.e., IC UE and category 2 OOC UE, exist. The category 1 OOC UE may synchronize its transmission resource region with the transmission region notified by the IC UE only in the scenario where all of the three types of UEs exist.

In the case that the resource positions are fixed (e.g., fixed to DFN). The DFN (identical with SFN) in the IC and the DFN in the OCC may differ from each other, and there may be a predetermined offset or not be between the IC and OCC synchronization resource positions. If there is a predetermined offset, since the Synchronization Source UE which transmits signal on the IC synchronization resource uses the IC synchronization signal (identified with ID in the sequence or message), this signal is distinguished from the synchronization signal transmitted by the OOC synchronization source UE. The OOC UE selects one of the plural synchronization signals for IC in discovering IC synchronization signals, (if the condition for becoming a synchronization source UE is fulfilled), and selects a synchronization resource among the plural OOC synchronization resources having a predetermined offset to transmit the synchronization signal. In this way, the IC UE can receive the synchronization signal of the OOC UE only on the OCC synchronization resource at the predetermined position to discovery the presence of any OCC UE at a low power. If the IC UE does not transmit synchronization signal first (e.g., if no data to be transmitted is present), it is difficult for the IC UE to receive the signal of the OCC synchronization source UE and thus the eNB may command a specific IC UE to transmit the synchronization signal using a dedicated control signal or command all IC UEs to transmit synchronization signals using a common control signal. At this time, the eNB may control to transmit the synchronization signal for specific period or to transmit the synchronization signal for predetermined time duration, command a specific IC UE to stop transmitting the synchronization signal after the synchronization signal transmission command (i.e., the UE may ignore the command from the eNB if the UE is transmitting data), or command the UE which is not transmitting data among all the IC UEs to stop transmitting the synchronization signal.

If the IC UE transmits the synchronization signal under the control of the eNB, the OOC UE changes the synchronization signal transmission timing immediately, or right after the end of the data transmission, or at the time for being a new synchronization source UE, or at a predetermined time. The synchronization timing includes all of the symbol, subframe, and system frame number. The synchronization signal transmission timing of the OOC UE is changed such that the synchronization signal is mapped to the OOC synchronization resource in the coverage area of the eNB, whereby the IC UE is capable of receiving the synchronization signal of the OOC synchronization source UE.

Figure 3B:
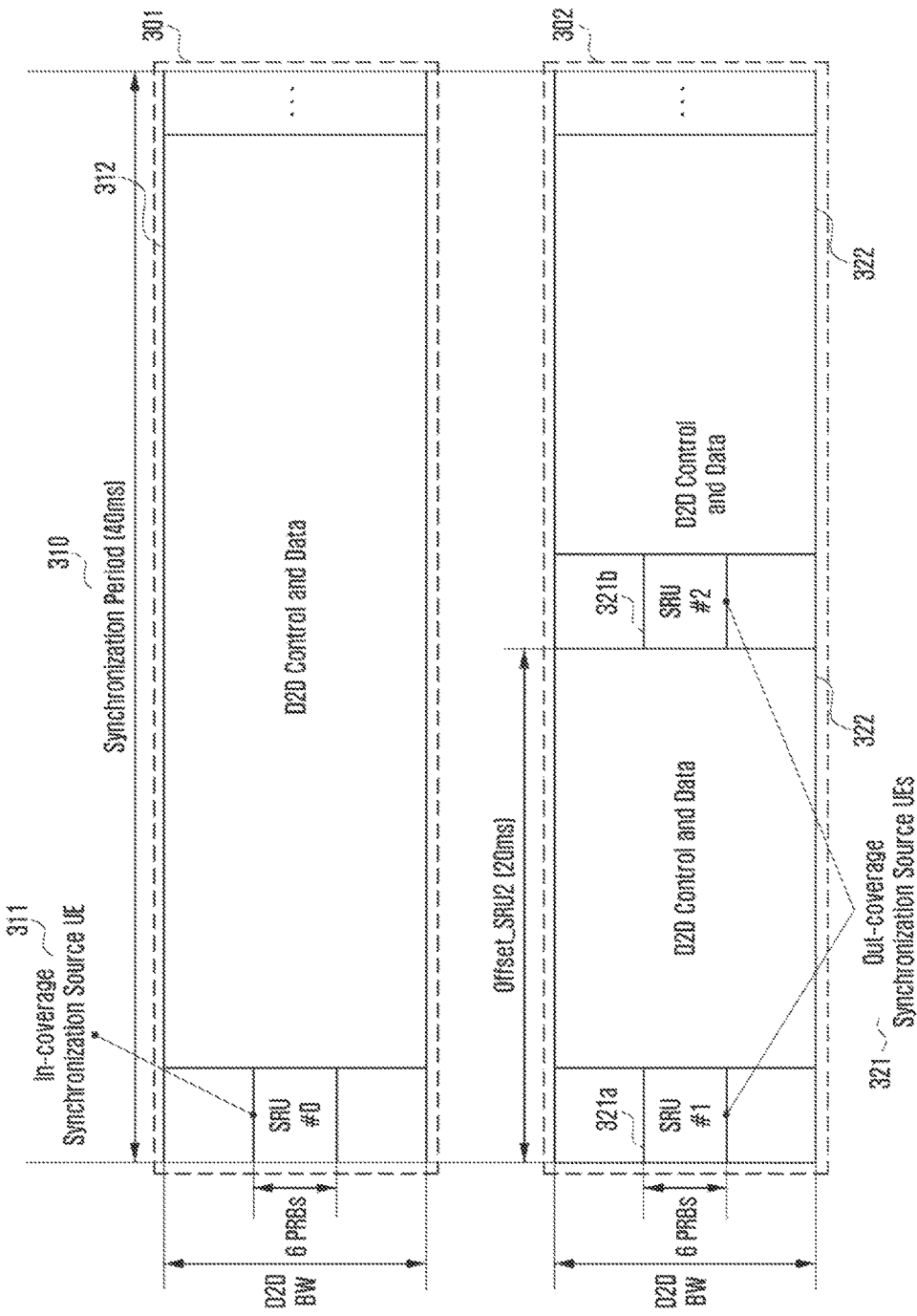

FIGS. 3A and 3B illustrate a resource structure for D2D synchronization according to an embodiment of the present disclosure.

Referring to FIGS. 3A and 3B, a brief description is made of the synchronization signal transmission case and method. Basically, the UE having a Discovery signal or a control/data signal to be transmitted transmits a synchronization signal before transmitting the Discovery signal or the communication control/data signal. Specifically, the Synchronization Source UE starts transmitting the synchronization signal in the synchronization resource between the time point preceding as much as at least one synchronization period from the resource pool for the Discovery signal or Communication Control/data signal and the start point of the resource pool and the synchronization resource within the resource pool. At this time, the synchronization signal transmission is triggered by one of the following conditions.

The eNB commands the UE to transmit a synchronization signal.

A condition configured by the eNB or preconfigured in the UE is fulfilled.

The synchronization resource structure is configured as shown in FIG. 3A such that the IC UE and the OOC UE do not transmit their synchronization signals at the same time.

FIG. 3A is directed to a case where a synchronization period 310 is 40 ms. The synchronization source UEs may transmit the synchronization signals at different timings within the D2D bandwidth (BW) during the synchronization period 310. For example, an IC UE may transmit the synchronization signal at SRU#0 using 6 synchronization PRBs in predetermined duration at the beginning of the synchronization period as denoted by reference number 311. The synchronization signal is followed by the D2D control and data 312. The upper part of FIG. 3A shows an exemplary case where a frame 301 has a length of 40 ms.

In contrast, an OOC UE may transmit the synchronization signal at SRU#1 321a and/or SRU#2 321b using 6 synchronization PRBs in predetermined duration with predetermined time offsets from the start time of the synchronization period. D2D control and data 322 are transmitted in the synchronization period with the exception of the SRU#1 321 and/or SRB#2. The time offsets from the start point of the synchronization period may be set to 10 ms and 30 ms respectively. At this time, the time offsets for transmitting the synchronization signals of the OOC UEs should be set such that the SRU#1 321a and SRU#2 321b do not overlap with the SRU#0 311. In this way, the IC UE is capable of transmitting the signals in the frame format 301 as shown in the upper part of FIG. 3A while the OOC UE is capable of transmitting the signals in the frame format of a frame 302 as shown in the lower part of FIG. 3A.

The synchronization resource structure shown in FIG. 3A is configured such that the IC and OOC UEs do not transmit signals at the same timing. For example, The IC UE transmits the synchronization signal using SRU#0 positioned at the beginning of the synchronization period allocated for IC UEs. In contrast, the OOC UE transmits the synchronization signal using SRU#1 with the offset of 10 ms or SRU#2 with the offset of 30 ms from the beginning of the synchronization period allocated for OOC UEs. According to this structure, the SRU#0 for IC UEs carries the synchronization signal which is transmitted by the OOC UEs or IC UEs served by neighboring eNBs but not by the IC UEs served by the serving eNB. The synchronization signals from the UEs are multiplexed onto one SRU#0, and the synchronization source UEs use the same sequence so as to contribute reception performance improvement.

Since the neighboring synchronization source UEs can receive signals among each other to contribute to maintaining the timing without drifting, the OOC UE uses the two resources, i.e., SRU#1 321a and SRU#2 321b. The OOC UE can select synchronization resource in various ways. After acquiring the transmission timing, the eNB selects explicit or predetermined synchronization resource as follows.

a) Monitor to use certain resource selected from unoccupied resource. In the case that a monitoring period is configured, repeat the above operation in the next period.

b) Monitor the resource allocated for I-SS (e.g., SRU#1) among the synchronization resource to use certain resource selected from unoccupied resource. In the case that non-I-SS UE transmits a synchronization signal (e.g., if the timing of the neighboring synchronization source UE mismatches its timing or, when priority is predetermined, if the synchronization signal of the low priority synchronization source UE mismatches), monitor the resource (e.g., SRU#2) which is not I-SS resource to use some of unoccupied resource.

c) Change the synchronization resource randomly at an interval based on probability p.

In the above methods, the unoccupied resource is determined by comparing the reception power of the received synchronization signal with a threshold predetermined or determined by the eNB.

FIG. 3B is a diagram illustrating a case where the synchronization signal transmission resource are configured such that the IC UE and OCC UE transmit the synchronization signals at the same timing of one synchronization period. In the above methods, the synchronization resources in which the synchronization signal is received is not determined as idle resources.

It should be noted that the same reference numbers are used in FIGS. 3A and 3B. The upper part of FIG. 3B shows a frame format 301 with the synchronization period 310. As described above, the synchronization period 310 is 40 ms during which the IC UE transmits the synchronization signal at SRU#0 using 6 synchronization PRBs in predetermined duration at the beginning of the synchronization period as denoted by reference number 311. The synchronization signal is followed by the D2D control and data 312.

In contrast, an OOC UE may transmit the synchronization signal at SRU#1 321a starting at the beginning of the synchronization period and/or SRU#2 321b defined by a predetermined time offset from the start time of the synchronization period using 6 synchronization PRBs respectively. The D2D control and data 322 are transmitted in the synchronization period with the exception of the SRU#1 321 and/or SRB#2. The time offsets from the start point of the synchronization period may be set to 20 ms respectively.

Suppose that SRU#2 321b is allocated for I-SS UE and SRU#1 321a is allocated for non-I-SS UE based on the condition that the OCC UE becomes the I-SS to transmit the synchronization signal. At this time, the IC UE needs just to receive the synchronization signal of the I-SS. Accordingly, it is possible to reduce the number of the resources on which the IC UE has to receive signals from the OCC UE as compared to the case of FIG. 3A by allowing for transmission of the synchronization signal at the SRU#0 311 as the synchronization resource for IC and the SRU#1 321a for the synchronization source UE which is not the I0SS among the OOC UEs in the same subframe. In the case where the OCC UE which has received the synchronization signal of the IC UE becomes the synchronization source UE in the exemplary case of FIG. 3B, it is obvious to select the SRU#2 321b to avoid collision with the SRU#0 as the transmission resource for the IC UE. An OOC UE which has received the synchronization signal of another OCC UE at the SRU#2 may select the SRU#1 321a to avoid collision.

Synchronization Resource Offset

If the synchronization resource positions of all eNBs or all clusters are identical with each other, it is not necessary to exchange offset information indicating the synchronization resource positions. However, if the eNB wants to control the position of the synchronization resource position or if it is necessary to consider the half-duplex or interference problem of the synchronization source UE on the synchronization resource, it is possible to configure such that synchronization resource has an offset (0~39 ms) in one synchronization period (e.g., 40 ms). For this purpose, the eNB may use the SIB in the BCH, or the synchronization source UE may broadcast the offset using the synchronization channel (or D2D broadcast channel).

The synchronization resource starts from SFN#0 in an eNB or starts with an offset having a value less than one synchronization period under the control of the eNB. Assuming that the synchronization resource starts from SFN#0 in the serving (camped) eNB, the offset for the synchronization position of a neighboring eNB corresponds to the difference between the SFN#0 of the serving eNB and the SFN#0 of the neighboring eNB.

Assuming that the synchronization resource starts with an offset in the serving eNB, the offset for the synchronization resource position of the neighboring eNB corresponds to the difference between the SFN#0 of the serving eNB and the start position of the synchronization resource of the neighboring eNB. For example, it is equal to (difference between serving eNB SFN#0 and neighboring eNB SFN#0)+(difference between neighboring eNB SFN#0 and start position of neighboring eNB synchronization resource). Since there may be an offset of at least one subframe (1 ms) between the non-synchronized eNBs, the offset may be in the range from 0 to 39 under the assumption that the synchronization period is 40 ms.

It the serving eNB may operate differently depending on whether the synchronization resource starts from SFN#0 or starts with an offset. If an offset shorter than the synchronization period is necessary in the serving eNB, this information has to be provided through PD2DSCH (synchronization channel). If this information is received, the UE estimates the SFN of the eNB by subtracting the offset from the D2D frame number (DFN). If the synchronization resource always starts from SFN0 at the serving eNB, the synchronization resource offset with the neighboring eNB is equal to the difference between the SFN0 of the serving eNB and the SFN0 of the neighboring eNB. Accordingly, it is possible to reduce the overhead by expressing the resource region of the neighboring eNB as [synchronization resource offset]+[offset between neighboring eNB SFN0 and start point of resource region]. The resource region of the neighboring UE may be the synchronization resource, discovery resource, control resource for communication, or data resource for communication.

In addition, the resource region may be positioned as follows depending on whether the offset information is used or not:

SFN#0 position when Offset is used

Figure 4A:
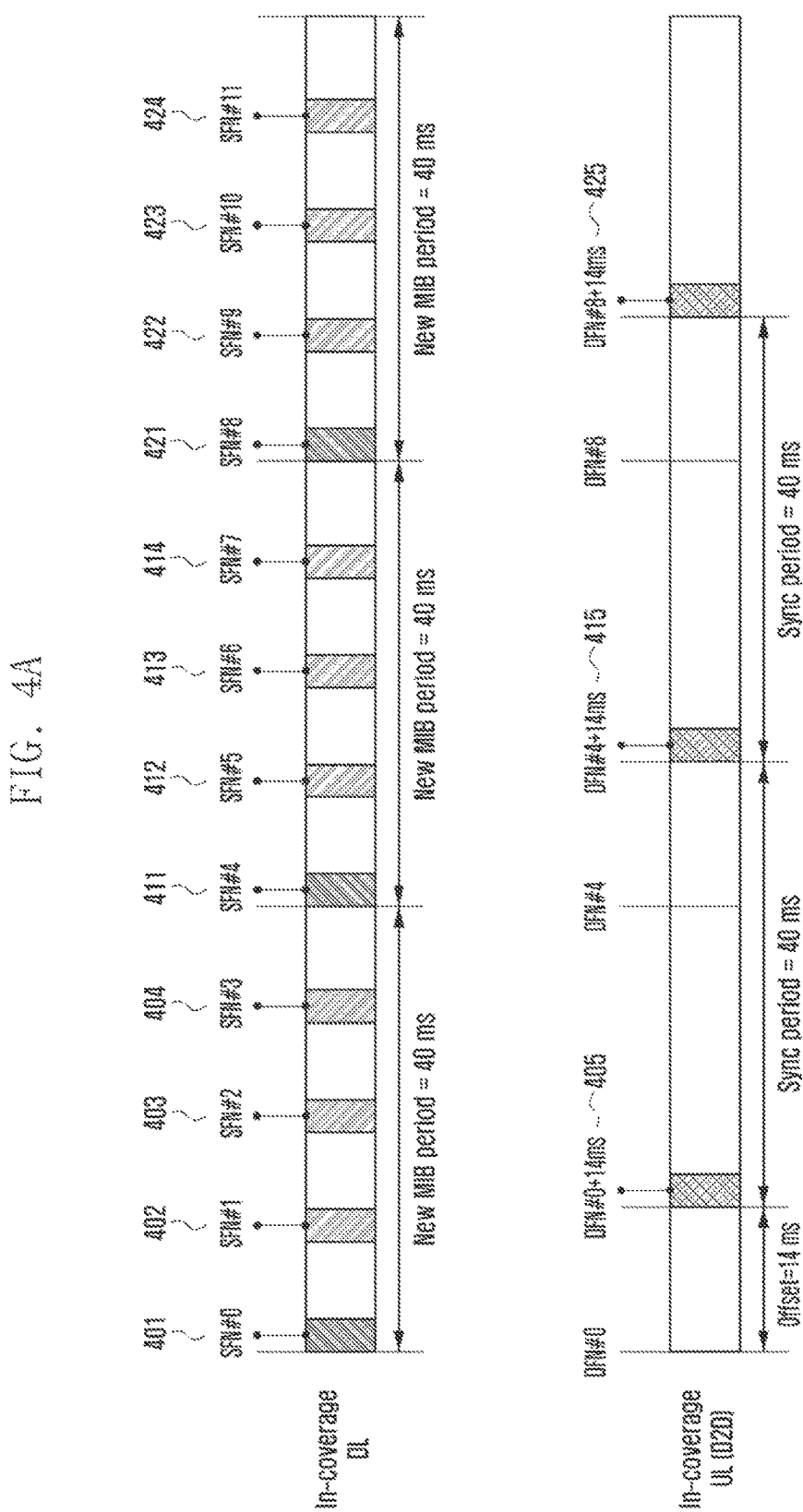
FIG. 4A is a timing diagram illustrating timings of a master system information broadcast in downlink (DL) and system information broadcast for D2D transmission of a UE in uplink (UL) according to an embodiment of the present disclosure.

Synchronization period start point reference resource region position when Offset is used DFN#0 reference resource region position when Offset is not used FIG. 4A is a timing diagram illustrating timings of a master system information broadcast in downlink (DL) and system information broadcast for D2D transmission of the UE in uplink (UL) according to an embodiment of the present disclosure.

Referring to FIG. 4A, the eNB transmits a new master information block (MIB) at an interval of 40 ms according to the legacy normal method. The same MIB is copied and transmitted at an interval of 10 ms between new MIB periods. At this time, 8 bits of the 10-bit SFN is transmitted in the MIB and 4 identical MIBs are transmitted in the period of 40 ms so as to be distinguished from each other using by CRC in the cyclic redundancy check (CRC) masking for the MIB with the 2 bits for identifying 10 ms. The UE which is determined to transmit the synchronization signal transmits the synchronization signal at every 40 ms, the transmission relative to SFN#0 is determined under the control of the serving eNB. For this operation, the eNB broadcasts the SIB to notify all UEs within the eNB coverage area of the offset between the SFN#0 and the first synchronization resource. Since period of the synchronization signal is 40 ms, the offset falls in the range from 0 to 39 ms. Here, it is assumed that one subframe spans 1 ms.

The eNB also notifies information on the position of the resource pool with the offset relative to SFN#0 in the same way. The eNB also may provide the information on the neighbor eNB synchronization resource and discovery/communication resource region. Since the offset relative to the synchronization resource may be sued commonly when notifying the position of the resource regions of the plural neighbor eNBs, the offset of the synchronization resource can be used as the reference point for marking the respective resource regions.

The UE transmits the synchronization channel including the DFN #0 on the synchronization resource appearing first in reference to SFN#0 when transmitting the synchronization channel along with the synchronization sequence. In addition, the UE may transmit the offset from the SFN#0 to the first synchronization resource position on the synchronization channel. FIG. 4 is depicted under the assumption that the UE transmits the offset additionally. How to express the DFN offset for informing of the same timing can be determined in various ways. For example, "DFN#0+14" is identical with "DFN#1+4 ms". This is because the DFN is initialized in units of 10 ms.

A description is made of the relationship between the transmission timings of SFN and DFN and offsets with reference to FIG. 4A.

The upper part of FIG. 4A shows the MIB transmission timing in downlink within a coverage area of a certain eNB. MIBs 401, 411, and 421 which are transmitted at the first transmission occasions of the every MIB transmission period arriving at every 40 ms include different information. MIBs 402, 403, 404, 412, 413, 414, 422, 423, and 424 which are transmitted at the second and subsequent transmission occasions include the same information as the respective MIBs transmitted at the first transmission occasions in the respective MIB transmission periods.

The lower part of FIG. 4A shows the DFN transmission timing when the DFNs 405, 415, and 425 for D2D transmission are transmitted using the uplink resource within a coverage area of a certain eNB. As shown in FIG. 4A, the DFN transmission period may be identical with the MIB transmission period of 40 MS within the coverage area of a certain eNB. The DFNs 405, 415, and 425 which are transmitted at the timings determined based on the offset value carried in the MIB have the offset from the SFN#0 in the range of one period of 40 ms as described above. The lower part of FIG. 4A is directed to an exemplary case where the offset is set to 14 ms.

Figure 4B:
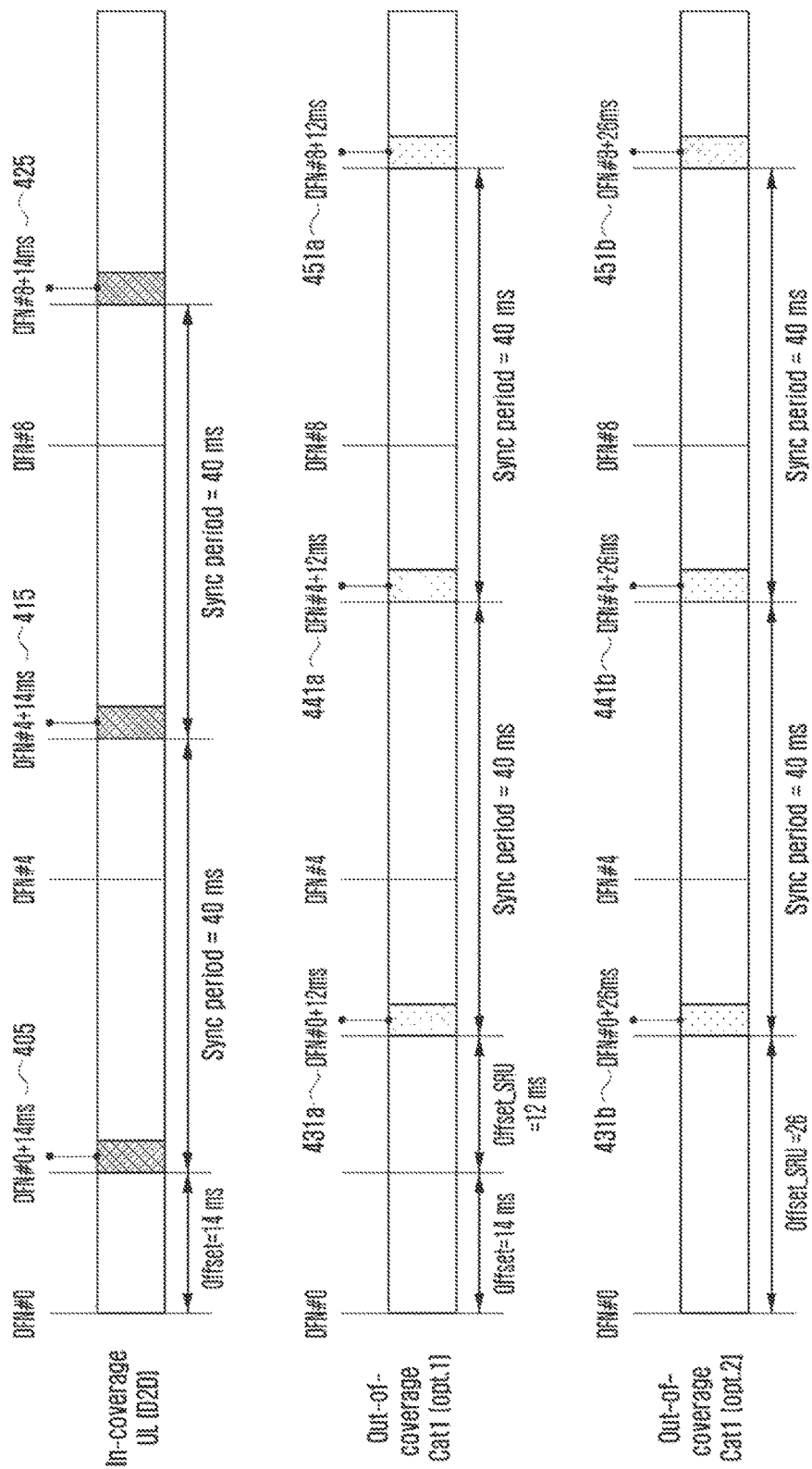
FIGS. 4B and 4C illustrate an offset transmission scheme of an out-of-coverage (OOC) UE when an integrated circuit IC UE transmits a synchronization sequence and synchronization channel to an OOC UE according to an embodiment of the present disclosure.
Figure 4C:
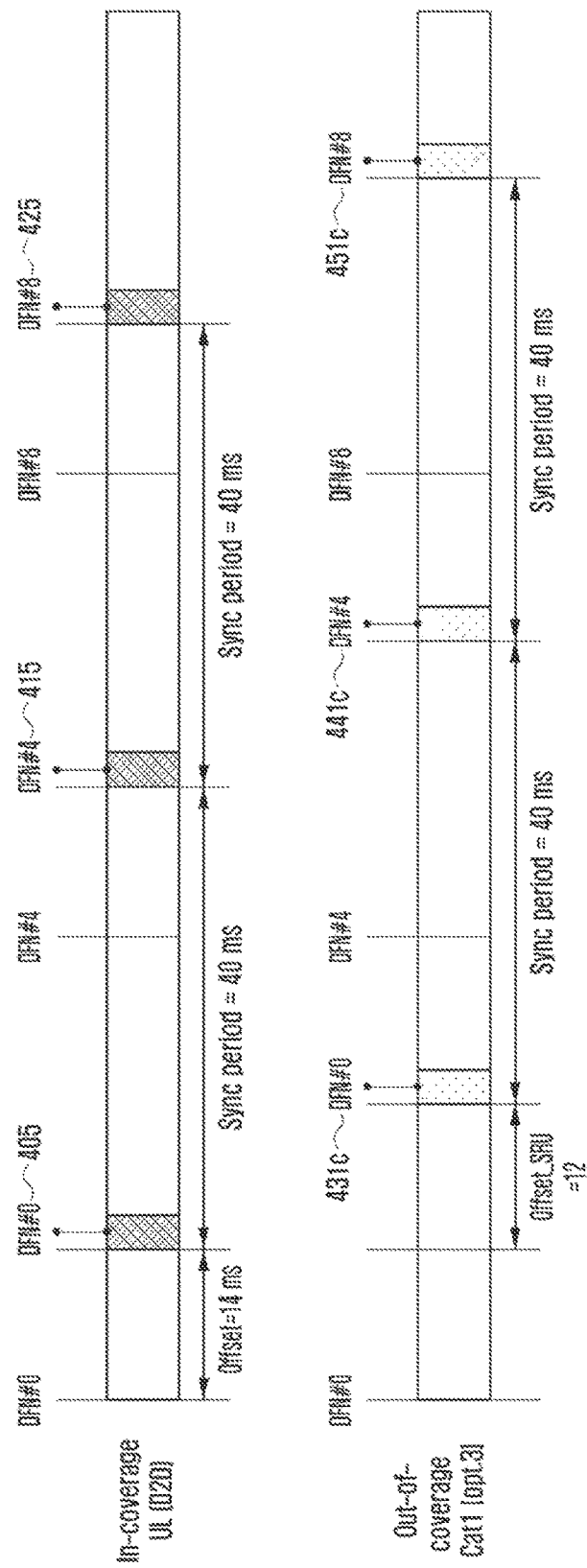

FIGS. 4B and 4C illustrate an offset transmission scheme of an OOC UE when an IC UE transmits a synchronization sequence and synchronization channel to the OOC UE according to an embodiment of the present disclosure.

Referring to FIG. 4B shows a method for the IC UE to transmit the offset along with the DFN value on the synchronization channel. In the embodiment of the present disclosure of FIG. 4B, it is assumed that the IC UE is allocated the synchronization resource with the offset of 14 ms in the DFN#0 from the eNB. If the IC UE transmits the DFN#0 and a value corresponding to 14 ms on the synchronization channel, the OOC UE determines its synchronization resource position based on the corresponding value. If the OOC UE determines the synchronization resource position arbitrarily, the IC UE has to perform the scanning operation frequently to receive the synchronization signal of the OCC UE, resulting in overburden of the IC UE. The various embodiments of the present disclosure of FIGS. 4B and 4C aim to reduce unnecessary reception operation in such a way that the OCC UE transmits the synchronization signal at the position expected by the IC UE. The reception operation can be simplified through two options in the above method.

Option 1: The OOC UE may determine the synchronization resource position according to the offset_SRU from the time when the synchronization signal of the IC UE is received to a predetermined synchronization resources.

Option 2: The OOC UE may determine the synchronization resource position according to the offset_SRU from the DFN#0 calculated based on the offset value transmitted by the IC UE at the time when the synchronization signal of the IC UE is received to a predetermined synchronization resource.

The reason for notifying of the offset as in FIG. 5 is to fulfil the necessity for even the OOC UE to have different offsets between Synchronization Source UEs (e.g., to avoid half-duplex or interference problem) and to match the operations with the IC UE. However, option 1 calculates the offset based on the synchronization resource position of the IC UE under the assumption that the synchronization resource position of the IC UE is the reference timing of the synchronization period (refer to the synchronization resource structure of FIG. 2). Meanwhile, option 2 calculates the offset based on the DFN#0.

FIG. 4B exemplifies a case where an IC UE transmits an OOC UE a synchronization sequence and synchronization channel with the offset of 14 ms. For example, the DFNs 405, 415, and 425 are transmitted with the offset of DFN0+ 14 ms at a period of 40 ms in the same manner as FIG. 4A. In the case where a category 1 OOC UE which receives a reference signal from a UE located with the coverage area of an eNB, two options can be considered.

Referring to FIG. 4B, it is possible to transmit DFNs 431*a*, 441*a*, and 451*a* indicating the offset value of 12 ms based on the DFN#0 transmitted by the IC UE as in option 1, or calculate the offset value of DFN#0 transmitted by the IC UE based on the offset value transmitted by the IC UE and compute the positions of synchronization resources 431*b*, 441*b*, and 451*b* according to the offset_SRUs of predetermined synchronization resources starting from DFN#0.

Meanwhile, it is necessary for the OOC UE to distinguish between at least two synchronization resources of which the timings match, i.e., the UEs synchronized, in order to avoid the half-duplex problem. For this purpose, the synchronization resources may be distinguished from each other based on the DFN value although the synchronization resource index can be used. For example, if DFN value+offset value is received on the synchronization channel, it is possible to remove the offset value and perform a modular operation on the DFN value. For example, the DFN#0 may be the IC UE synchronization resource, the DFN#1 the first OOC UE synchronization resource, and the DFN#3 the second OOC UE synchronization resource depending on the result of the modular 4 operation on the DFN value. The modular 4 operation may be performed on the MSB or LSB 8 bits of the DFN 10 bits. In another method, MSB or LSB N bits of the field notifying of the offset are used. For example, the offset of [0~9] bits may indicate the IC UE synchronization resource, the offset of [10~19] ms the first OOC UE synchronization resource, and the offset of [30~39] ms the second OOC UE synchronization resource. For example, the 6-bit offset of 00** may indicate the IC UE synchronization resource, the 6-bit offset of 01 the first OOC UE synchronization resource, and the 6-bit offset of 10** the second OOC UE synchronization resource.

According to FIG. 4C, by taking notice of the synchronization procedure between OOC UEs which cannot receive the eNB timing, since the offset is meaningless in the situation in which the network cannot control the DFN#0 reference timing, it is assumed that the synchronization position is determined in association with DFN and the relative offset between the synchronization resources are predetermined. In this scenario, although the IC UE transmits the offset, the offset is ignored, and the synchronization is determined considering only the relative offset between the synchronization resources. In this case, it is necessary to indicate the indices corresponding to the synchronization resource positions. The synchronization resource indices (of SRU1 and SRU2) are informed with N bits (e.g., 1 bit) using the CRC masking or the demodulation reference signal (DMRS) on the synchronization channel. If there is no separate index information, the synchronization resource index can be obtained through modular operation on the DFN value.

Referring to FIG. 4C, the IC UE transmits DFN#0 405, DFN#4 415, and DFN#8 425 in accordance with the network reference time along with the offset value, which is transmitted in one of the above described methods. However, the OOC UE may ignore the offset value and configure the offset value based on the DFN received according to a predetermined offset_SRU value (the offset is set to 12 ms in FIG. 4C). In addition, the Index of DFN can be defined as described above. It is possible to calculate the offset value of DFN#0 transmitted by the IC UE based on the offset value transmitted by the IC UE and compute the positions of synchronization resources 431c, 441c, and 451c according to the offset_SRUs of predetermined synchronization resources starting from DFN#0.

In separation from the various embodiments of the present disclosure of FIGS. 4A, 4B, and 4C, the eNB may broadcast the synchronization resource offset configured for an OOC UE. Since the eNB can arrange the OOC UE synchronization resource at an intended position using the additional offset information, it is possible to control the interference and reduce the power consumption of the IC UE by attempting reception at the corresponding positions based on this information.

Table 1 shows which resource pool has to be informed to the recipient UE according to the transmission/reception relationship between UEs.

TABLE 1

|  | Tx Resource Pool | Rx Resource Pool |
|---|---|---|
| Case1: IC UE → OOC UE | 0(configured) or X | 0 (configured) |
| Case2: OOC UE → IC UE | X | 0 (configured or pre-configured) |
| Case3: OOC UE → OOC UE | X | 0 (configured or pre-configured) |
| Case4: IC UE → IC UE | X | 0 (configured) |

In the case that the reception resource region is indicated explicitly, the UE which has received the synchronization signal performs the reception operation at the reception resource region informed through the D2D synchronization channel. In the case that the reception resource region is not indicated explicitly, the UE which has received the synchronization signal performs the reception operation at the corresponding position under the assumption that the transmitting UE operates in the predetermined (preconfigured or fixed) transmission resource region. In the case that the transmission resource region is indicated explicitly, only the situation where the IC UE served by the eNB with a high priority notifies the OOC UE of the reception resource region is considered.

a) The transmission and reception operations are performed in the transmission resource region notified by the IC UE. The reception operation is not performed in all available resources but the corresponding transmission resource region.

b) The transmission and reception operations are performed in the transmission resource region notified by the IC UE, and the reception operation is performed in all available resources but not the corresponding transmission resource region.

c) Only the transmission operation is performed in the transmission resource region notified by the IC, and the reception operation is performed in all available resources but not the corresponding transmission resource region.

d) Only the transmission operation is performed in the transmission resource region notified by the IC UE, and the reception operation is performed in all available resource regions not disturbing the transmission operation.

In order to configure the diverse operation as above, the eNB may transmit a 1-bit information for distinguishing among the cases where the transmission and reception resource regions are identical with and different from each other through the synchronization channel. At this time, if the resource region information is shared, the eNB may be configured to preset the transmission resource region without separate notification.

Descriptions are made of the transmission and reception resource pool configurations summarized in table 1 hereinafter.

Case 1: This is the case where an IC UE transmits a synchronization signal to an OOC UE and thus the OOC UE performs D2D signal transmission operation in the transmission resource region (Tx resource Pool) which the IC UE informs through the D2D synchronization channel (or D2D broadcast channel). Meanwhile, in the case that no transmission resource region is notified, the IC UE may perform the transmission operation at a predetermined resource position (e.g., resource determined based on the D2D frame number).

In order to protect the IC terminal, the eNB may notify the OOC UE of the reception resource region although the eNB does not indicate the transmission resource region. This corresponds to the transmission resource region of the IC UE, and the OOC UE may perform the operation of receiving the IC UE signal in the reception resource region notified from the eNB in a predetermined transmission resource region with priority and the transmission/reception operation with other OOC UEs on other resource.

Case 2: This is the case where the IC UE receives the synchronization signal of the OOC UE and, in this case, the OOC UE cannot configure any transmission or reception resource of the IC UE if it is assumed that the priority of the IC UE is higher. Since the OOC UE is not controlled by the eNB, the OOC UE uses a predetermined resource region. If the synchronization signal of the OOC UE is received, the IC UE performs the reception operation under the assumption that the transmission is to be performed in the predetermined resource region. Meanwhile, in the case of the OOC UE controlled by the eNB indirectly or the OOC UE that can be controlled to use the resource region predetermined per D2D communication group, the OOC UE may perform the reception operation based on the reception resource region included in the synchronization channel received by the IC UE.

Case 3: This is the case where the OOC UE receives the synchronization signal of another OOC terminal and, in this case, the OOC UE may configure the reception resource region and operate in a predetermined reception resource region due to the same reason as described in case 2.

Case 4: This is the case where the UEs served by neighboring eNBs establish synchronization and, in this case, since it is impossible to control the transmission operation of the UE service by the neighboring eNB, the control can be done in the reception resource region.

Considering Cases 1 to 4, the most economical configuration method applicable to various scenarios while using the information of only one resource region is described as follows. Descriptions are made of the two most economical configuration methods hereinafter. The two methods are used selectively.

a) If the IC UE informs of the transmission resource region through the synchronization channel, the OOC UE performs the transmission/reception operation in the corresponding transmission resource region. The OOC UE which has received the synchronization channel of the OOC UE regards the transmission resource region as the reception resource region so as to perform only the reception operation but not the transmission operation on the corresponding reception resource region.

b) If the IC UE informs of the reception resource region through the synchronization channel, the OOC UE performs only the reception operation but no transmission operation in the corresponding reception resource region. Of course, the OOC UE may perform the transmission/reception operation in its transmission resource region.

FIGS. 5A, 5B, 5C, and 5D illustrate various transmission and reception resource pool allocation methods according to an embodiment of the present disclosure.

FIGS. 5A, 5B, 5C, and 5D illustrate the exemplary cases where the above described principles are applied in allocating the D2D transmission and reception resource pool. In FIGS. 5A, 5B, 5C, and 5D, the UEs are categorized into three types.

The IC UE is a UE capable of receiving the synchronization signal of the eNB to connect to the network. The OOC UEs are subcategorized into two types. First, the category 1 OOC UE (OOC UE Cat. 1) is a UE which receives the synchronization signal relayed by the IC UE and follows the reference timing of the eNB. Second, the category 2 OOC UE (OOC UE Cat. 2) is a UE which does not follow the reference timing of the eNB.

Figure 5A:
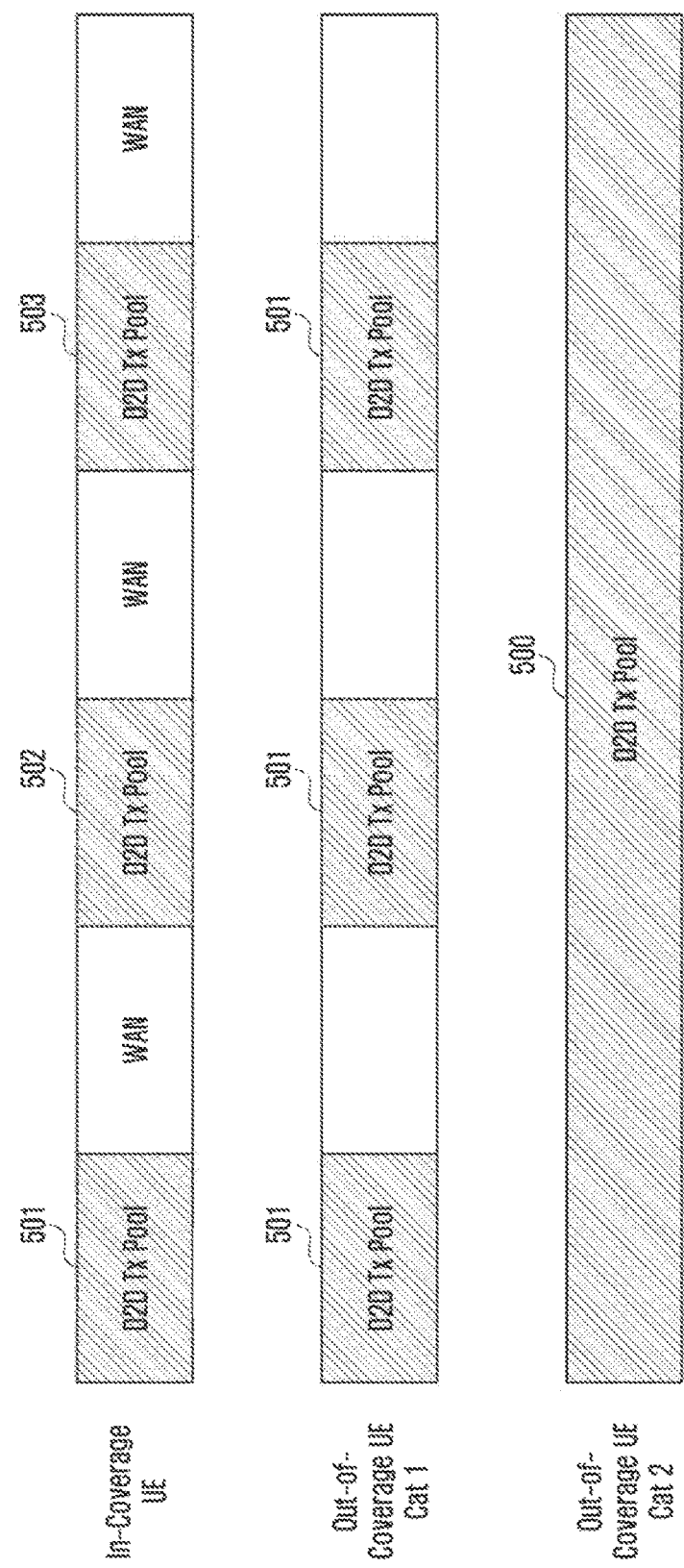
FIGS. 5A, 5B, 5C, and 5D illustrate various transmission and reception resource pool allocation methods according to an embodiment of the present disclosure.

Referring to FIG. 5A, the IC UE is performing the transmission/reception operation in the transmission resource pool indicated from the eNB, and the synchronization source UE, among the IC UEs, relays the transmission resource pool information to the OOC UE. The category 1 OOC UE can transmit/receive signals only in the transmission resource pool indicated from the eNB. Meanwhile, the category 2 OOC UE can transmit/receive signals in the entire preconfigured resource pool.

Referring to FIG. 5A, the IC UE may transmit and receive signals in D2D Tx resource pools 501, 502, and 503 allocated by the eNB. In FIG. 5A, the resource pools 501, 502, and 503 in which the IC UE transmits and receives signals are the D2D Tx resource pools allocated by the eNB. The category 1 OOC UE which receives the synchronization Tx resource pool information from the IC UE transmits/receives signals only in the Tx resource pools 501, 502, and 503 indicated from the IC UE, i.e., indicated from the eNB. However, the category 2 OOC UE may transmit/receive signal in the entire predetermined resource pool, i.e., a D2D Tx pool 500. In FIG. 5, the regions marked by WAN means the resource pool for use in the LTE system.

Figure 5B:
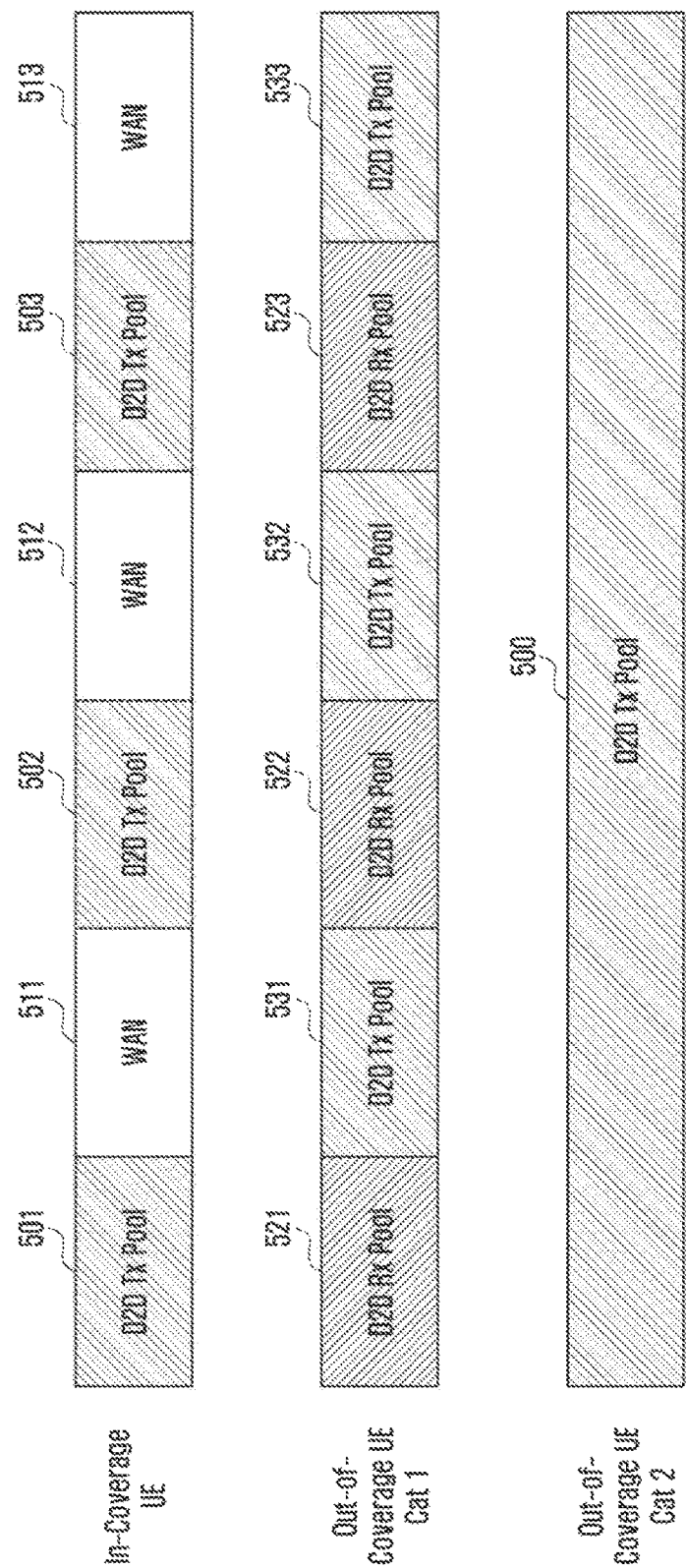

Referring to FIG. 5B, the IC UEs perform the transmission/reception operation in the transmission resource region informed from the eNB, and the Synchronization Source UE among the IC UEs relays the information on the reception resource region identical with the transmission resource region and the transmission resource region for the OOC UE notified from the eNB to the OOC UE. The category 1 OOC UE has to perform only the reception operation in the reception resource region informed from the eNB and can perform the transmission/reception operation in the transmission resource region informed from the eNB. The reason for this configuration is because the inter-D2D UE interference is high on the D2D link used to receive signals in a short distance unlike the tiny interference from the OOC UE on the uplink of WAN. Meanwhile, the category 2 OOC UE may perform the transmission/reception operation over the whole predetermined resource region.

Referring to FIG. 5B, the resource allocated to the IC UE are divided into D2D resource region (i.e., D2D Tx pools 501, 502, and 503) and WAN resource region. At this time, the synchronization Tx UE, among the IC UEs, configures Rx pools 521, 522, and 523 for the category 1 OOC UE at the same timings as its D2D Tx pools 501, 502, and 503 and notifies the category 1 OOC UE about the Rx pools. In this way, the category 1 OOC UE can configure the D2D Tx pools 501, 502, and 503 of the IC UE as its Rx pools. The category 1 OOC UE may also configure all or part of other regions 531, 532, and 533, with the exception of the Rx pools, as D2D Tx pools. The D2D Tx pools 531, 532, and 533 may follows the configuration of the eNB as described above. The category 2 OOC UE may perform transmission/reception in the entire predetermined resource region, i.e., D2D Tx pool 500, as described with reference to FIG. 5A.

Figure 5C:
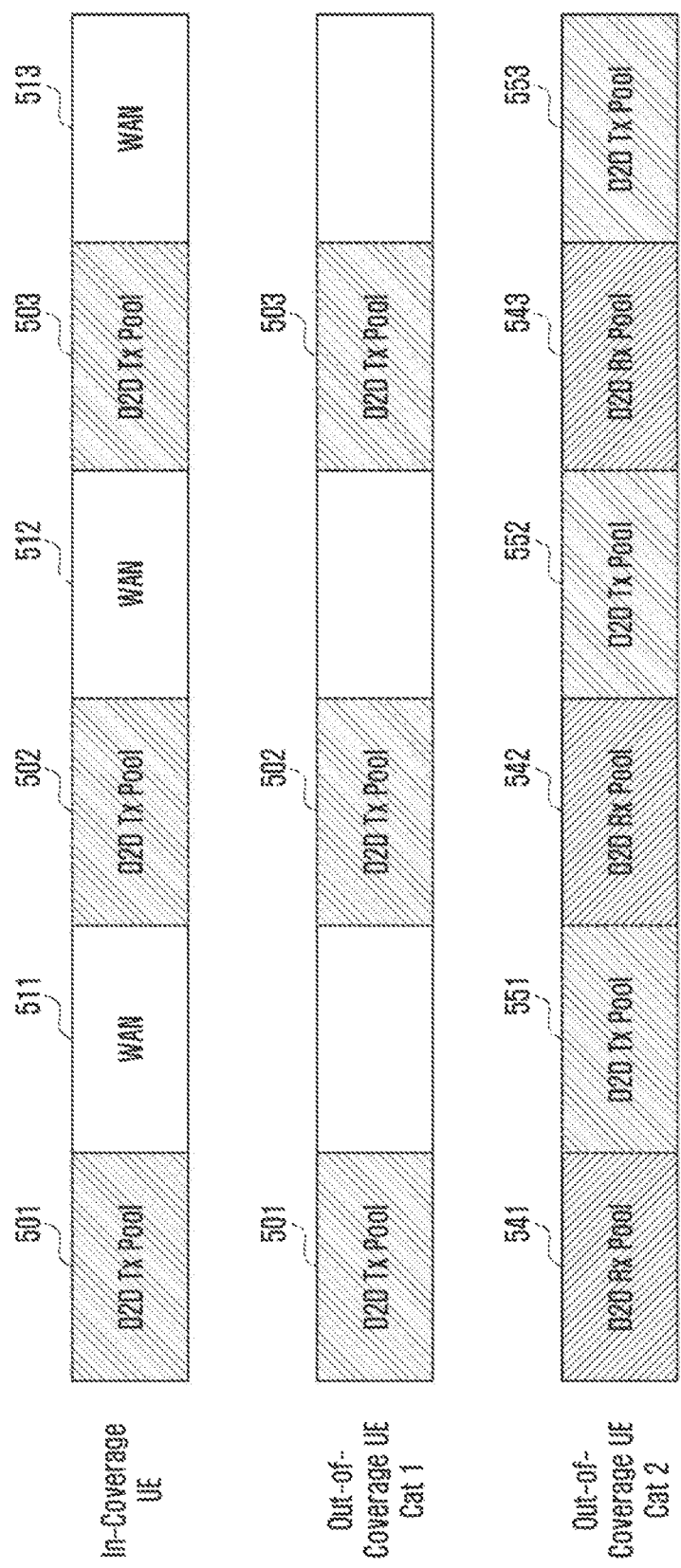
Figure 9:
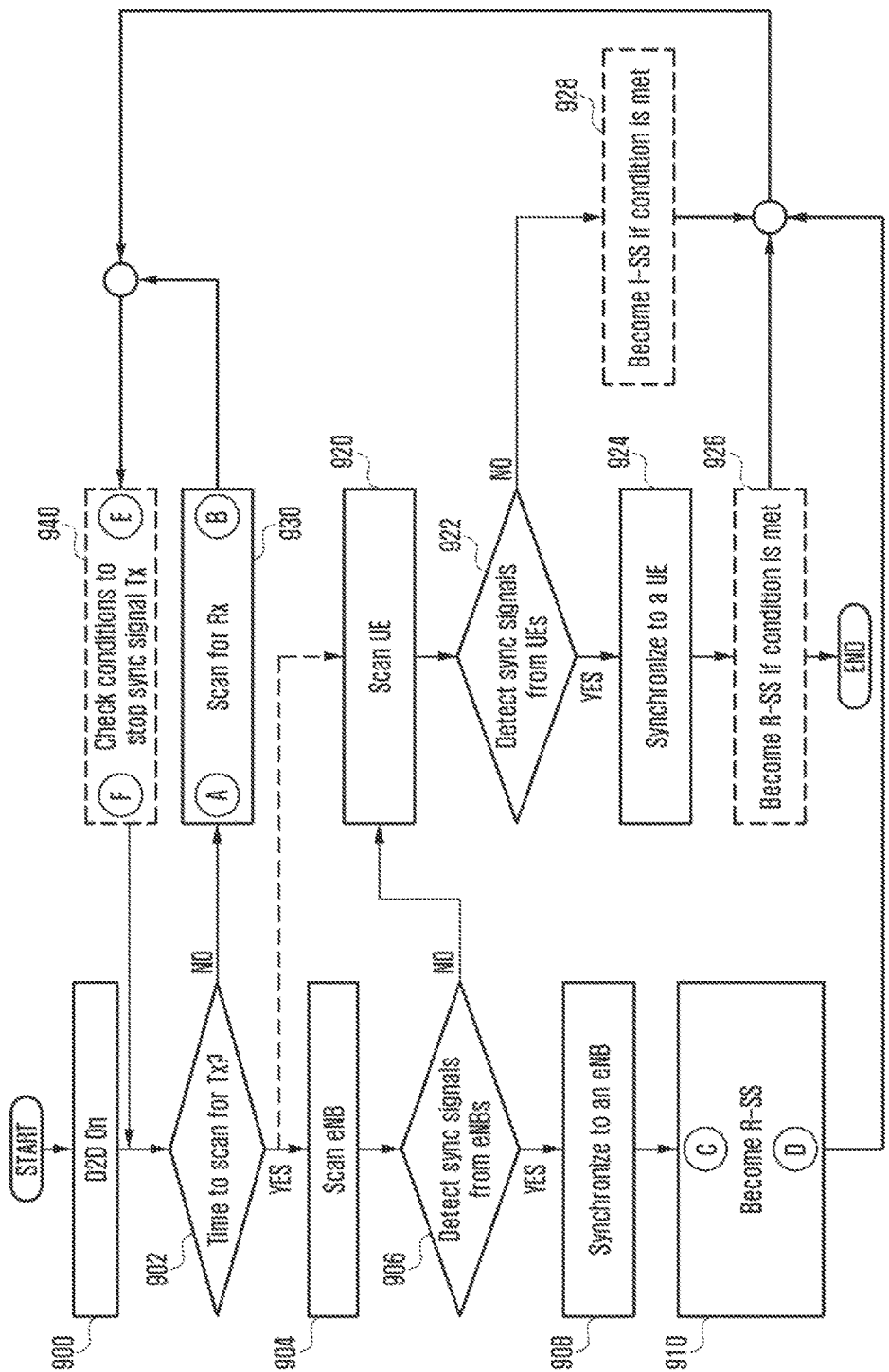
FIG. 9 is a flowchart illustrating a transmission timing synchronization procedure according to an embodiment of the present disclosure.

Referring to FIG. 5C, the IC UEs perform the transmission/reception operation in the transmission resource region informed from the eNB, and the Synchronization Source UE among the IC UEs relays the information on the transmission resource region to the OOC UEs. The category 1 OOC UE has to perform the transmission/reception operation in the transmission resource region informed from the eNB. Meanwhile, the category 2 OOC UE performs only the reception operation in the transmission resource region informed from the eNB in the predetermined resource region and can perform the transmission/reception operation in the rest resource. The reason for the configuration of FIG. 9 is to prevent the IC UE and category 1 OOC UE abiding by the eNB timing from interference.

Referring to FIG. 5C, the resources allocated to the IC UE is divided into the D2D resources (i.e., D2D Tx resource pools 501, 502, and 503) and WAN resources. At this time, the synchronization Tx UE, among the IC UEs, configures its Tx pools 501, 502, and 503 as the Tx pools for the category 1 OOC UE and notifies the category 1 OOC UE about the Tx pools 501, 502, and 503. Accordingly, the category 1 OOC UE can configure the D2D Tx pools 501, 502, and 503 at the same timing as the D2D Tx pools of the IC UE. The category 1 OOC UE also configures its Tx pools 501, 502, and 503 as Rx pools for the category 2 OOC UE and notifies the category 2 OOC UE about the Rx pools. Accordingly, the category 2 OOC UE can configured D2D Rx pools 541, 542, and 543 at the same timing as the D2D Tx pools of the category 1 OOC UE. The reason for this has been described above. Finally, the category 1 OOC UE may configure all or part of other regions 551, 552, and 553, with the exception of the Rx pools of the category 2 OOC UE, as Tx pool. The D2D Tx pools 531, 532, and 533 may follow the configuration from the eNB as described above.

Figure 5D:
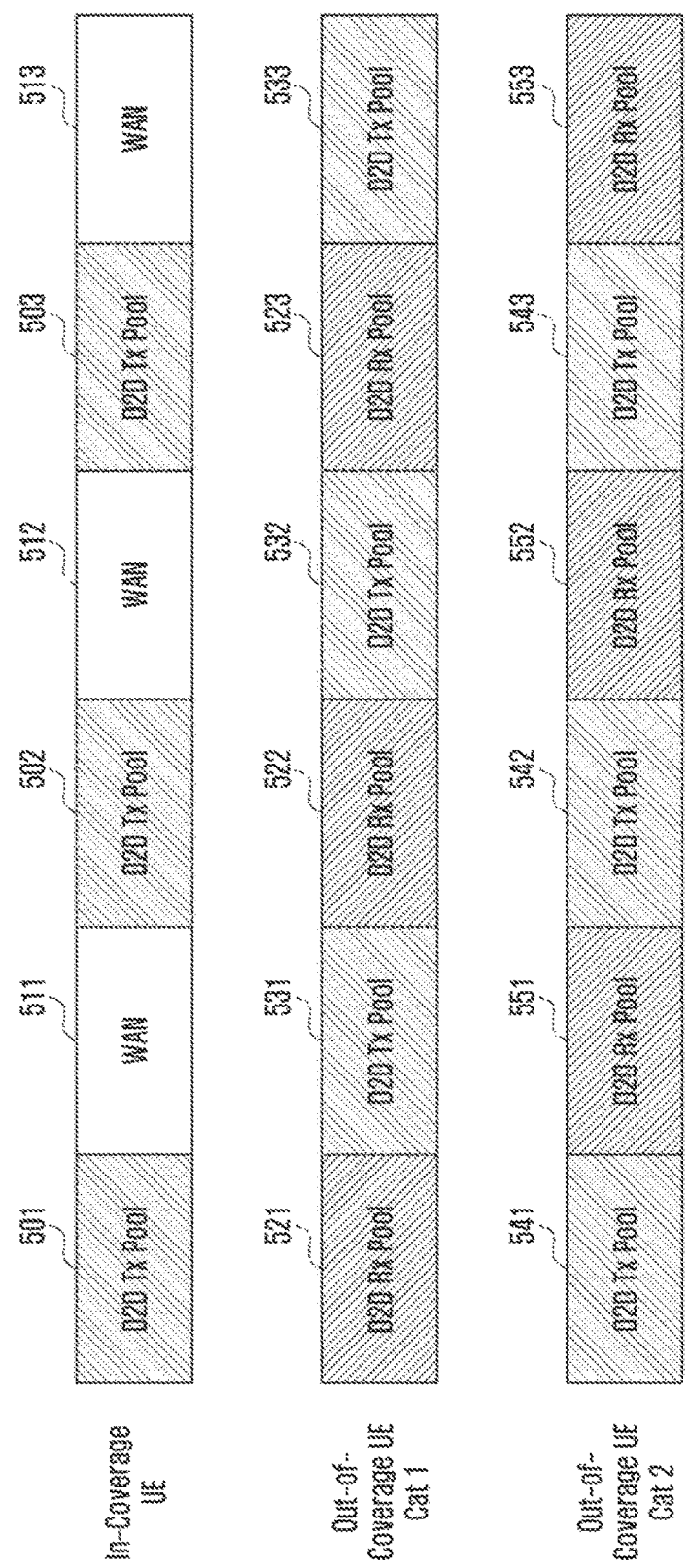

The embodiment of FIG. 5D is similar to the embodiment of FIG. 5B with the exception that the category 2 OOC UE does not use the whole predetermined resource region and performs the reception operation in the reception resource region of the category 1 OOC UE of which information is indicated from the synchronization source UE and transmission/reception operation in the rest resource of the predetermined resource region for the similar reason in FIG. 5C.

Referring to FIG. 5D, the resource allocated to the IC UE are divided into D2D resource region (i.e., D2D Tx pools 501, 502, and 503) and WAN resource region 511, 512, and 513. At this time, the synchronization Tx UE, among the IC UEs, configures the Rx pools 521, 522, and 523 for the category 1 OOC UE at the same timings as its D2D Tx pools 501, 502, and 503 and notifies the category 1 OOC UE about the Rx pools. In this way, the category 1 OOC UE can configure the D2D Tx pools 501, 502, and 503 of the IC UE as its Rx pools. The IC UE also configures the WAN resources as the D2D Tx pools 531, 532, and 533 for the category 1 OOC UE and notifies the category 1 OOC UE about the configured D2D Tx pools. As a consequence, the category 1 OOC UE can configure both the D2D Tx and Rx Pools.

The category 1 OOC UE may configure its D2D Tx and Rx pools to the category 2 OOC UE oppositely, i.e., as D2D Rx and Tx pools. For example, the category 1 OOC UE may configure its Rx pools 521, 522, and 523 as the Tx pools 541, 542, and 543 of the category 2 OOC UE and its Tx pools 531, 532, and 533 as the Rx pools 551, 552, and 553 of the category 2 OOC UE in time and notifies the category 2 OOC UE about the configured D2D Tx and Rx pools.

In the embodiments of FIGS. 5A, 5B, 5C, and 5D, it is assumed that the synchronization timings of the IC UE and category 1 OOC UE match each other. However, the OOC UE may not abide by the timing of the IC UE in a certain system. In order to reduce interference to the IC UE in such environment, the OOC UE may transmits the synchronization signal as follows.

1. Sync resource hopping: The position of the synchronization resource for transmitting the synchronization signal change according to a time variable. For example, the output of the function with the input of the DFN value is the changed resource position information in relation to the resource position in the DFN#0. The changed position of the resource according to the increase of the DFN value by 1 may be predetermined. In the case that a plurality of synchronization resource exist, the same change equation may be applied or resource-specific change equations may be applied.

2. Offset randomization: Although the period of the synchronization resource is fixed, the start position of the synchronization resource can be controlled as much as the offset value in one synchronization period. In this environment, it is possible to apply a new offset value to a predetermined period, scanning period, longer than the synchronization period from the scanning duration. Specifically, when the OOC UE becomes a Synchronization Source UE, it is possible to use an arbitrary synchronization resource offset other than a predetermined synchronization offset. Once the UE becomes the synchronization source, the UE scans the surrounding environment to determine whether to play the role or not and, if the synchronization source UE appears newly or is updated, the offset of the synchronization resource is changed to an arbitrary value in unit of 1 ms, i.e., 1 LTE subframe, within one synchronization period (e.g., 40 ms). At this time, if the offset configured by the neighboring eNB is known, it is possible to change the offset to an arbitrary value among the offsets causing no synchronization resource collision to avoid interference.

As shown in the synchronization resource structure examples of FIGS. 3A and 3B, a plurality of synchronization resource units (SRUs) can be configured in one Synchronization period. In the embodiments of FIGS. 3A and 3B, the SRUs are connected to different types of synchronization source UE, and the SRU positions may be determined according to the number of hops or the role (independent/assistant) of the Synchronization Source UE.

The synchronization signal is transmitted at every SRU, but the synchronization channel may be transmitted according to specific conditions. The conditions for not transmitting the synchronization channel are as follows.

1. when the synchronization channel period is set to a value longer than the synchronization signal period, 2. when the specific resource region designated by the eNB overlaps the SRU position, (e.g., it is configured to use only the synchronization signal (D2DSS) in the discovery resource region which is not controlled by the eNB), 3. when the synchronization channel reception performance drops due to the too may participant UEs as a result of synchronization channel monitoring, the UE may change the synchronization channel period or offset immediately according to the monitoring result or report the monitoring result to the eNB to change the synchronization channel period or offset according to the determination of the eNB. Or, the UE may change the transmission probability of the synchronization channel immediately according to the monitoring result or report the monitoring result to the eNB to change the transmission probability of the synchronization channel according to the determination of the eNB.

FIGS. 6A, 6B, 6C, and 6D illustrate various resource pool structures for D2D Discovery or Communication and positions of synchronization resources according to an embodiment of the present disclosure.

The structures exemplified in FIGS. 6A, 6B, 6C, and 6D are characterized by arrangement in a logical time order, and other resource may be added actually in addition to the displayed regions. For example, in the case of the UE operating in TDD (Time Division Duplex), the D2D resource region is configured in uplink and thus the downlink resource may be positioned in time domain. In view of the D2D UE, however, the resource is configured logically as if consecutive D2D resources exist.

Figure 6A:
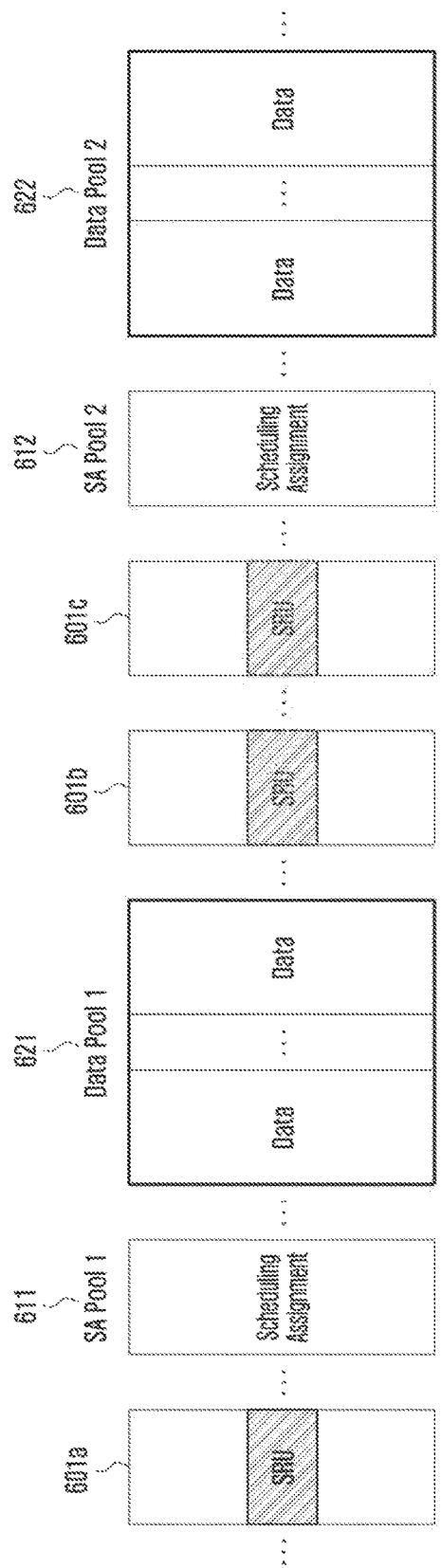
FIGS. 6A, 6B, 6C, and 6D illustrate various resource pool structures for D2D Discovery or Communication and positions of synchronization resources according to an embodiment of the present disclosure.

Referring to FIG. 6A, the resource region, i.e., the structure of Scheduling Assignment (SA) regions (Pools) 611 and 612 and Communication Data resource regions (Data Pools) 621 and 622, and the structure of synchronization resources 601a, 601b, and 601c for notifying the reference timing for the resource region which are notified from the eNB for performing D2D communication are illustrated. In the SA pools 611 and 612, the UE transmits the neighboring UE the SA signal including the information on the data resource allocated or selected in the SA pool 611 and 612 in advance before data transmission. The UE which has received the SA signal in the SA pool 611 and 612 receives the data signal transmitted by the intended transmission UE in subsequent data regions 621 and 622. The IC UE determines the absolute time of the reference frame (SFN0) by receiving the BCH and acquires the relative position information to the resource region expressed based on the reference frame by receiving the SIB.

The UE served by a neighboring eNB or located in the partial-network coverage area or in-network coverage area receives the synchronization signal and synchronization channel transmitted in the SRUs 601a, 601b, and 601c to determine the absolute time of the reference frame (SFN0) first and acquire the relative position information to the resource region indicated based on the reference frame.

The D2D UE may select one synchronization UE according to predetermined priority to synchronize the reference timing for transmission. If there is other synchronization UE with the reference timing different from that of the selected synchronization UE, the transmission reference timing of the selected synchronization UE is used to synchronize the reference timing for receiving the synchronization signal from the other synchronization UE during a predetermined time period. At least one synchronization resource, i.e., an SRU, may be arranged during one synchronization signal period and, if the reference timing for transmission is synchronized, the at least one synchronization resource may operate so as not to transmit the synchronization signal if there is no idle SRU, when inspecting the condition for synchronization signal transmission, such as reception power of the eNB signal or other synchronization UEs and signal detection. For example, although the condition for transmitting the synchronization signal is fulfilled, the UE transmits the synchronization signal using one SRU selected among the idle SRUs only when there are idle SRUs. It may be possible to apply relatively loose idle SRU determination condition. For example, if the number of synchronization signals received at a reception power higher than a predetermined reception power threshold in a synchronization resource (SRU) is less than N, the SRU may be determined as the idle SRU.

Figure 6B:
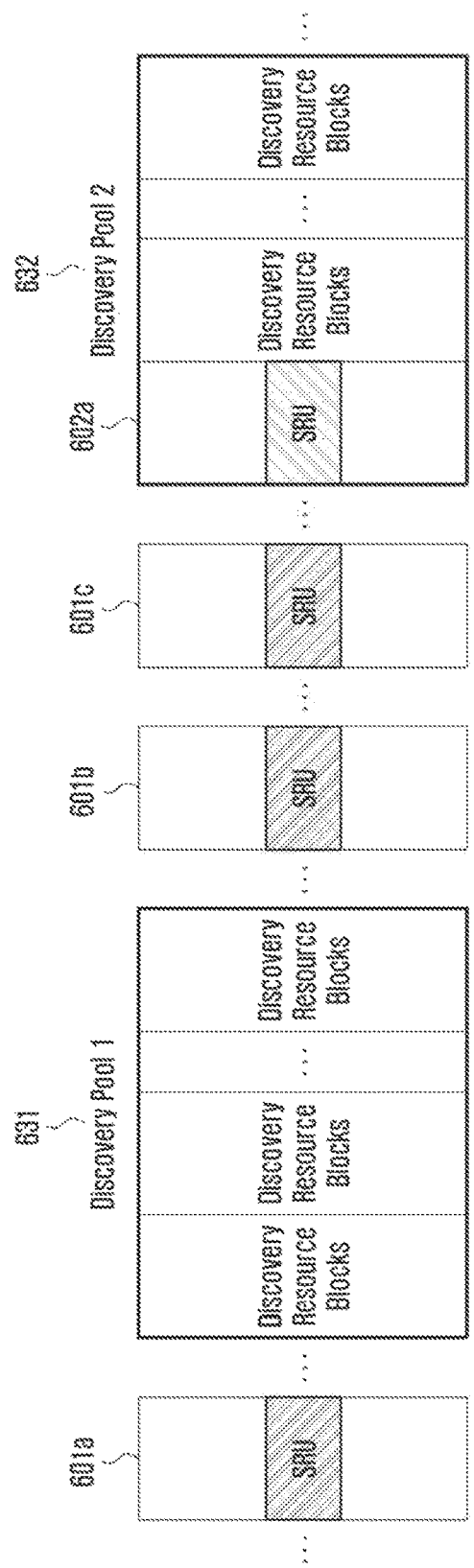

FIG. 6B is a diagram illustrating the resource pool structured with synchronization resources for D2D discovery according to an embodiment of the present disclosure.

Referring to FIG. 6B, the resource region notified from the eNB for performing D2D discovery, i.e., the structure for discovery resource region (Discovery Pool) 631 and 632, and structure of the synchronization resources 601a, 602b, 601c, and 602a to indicate the reference timing for the resource pool is illustrated. Similar to the case of FIG. 6A, a UE receives the BCH from the eNB in the discovery resource region 1 631 to determine the absolute time of the reference frame (SFN0) and acquires the relative position information of the discovery region indicated in relation to the reference frame by receiving the SIB.

The UE served by a neighboring eNB or located in the partial-network coverage area or in-network coverage area receives the synchronization signal and synchronization channel transmitted in the SRUs 601a, 601b, and 601c to determine the absolute time of the reference frame (SFN0) first and acquire the relative position information to the resource region indicated based on the reference frame. For example, if the synchronization channel received from the UE served by a neighboring eNB indicates SFN10, the reference frame SFN#0 is positioned before 10 frames.

Meanwhile, the UE served by the neighboring eNB in the discovery resource region 2 632 receives BCH and SIB from the serving eNB to acquire the information on the position relative to the reference time (SFN0) of the service eNB for the reference resource region 2 632 of at least one other neighboring eNB. When the start point of the resource region of the other eNB arrives, the UE may perform the transmission/reception operation with the WAN and, if the UE is not transmitting the synchronization signal or other D2D signals, the UE receives the synchronization signal and channel expected at the start time of the corresponding resource region.

The synchronization signal is transmitted according to specific condition, but the synchronization channel may not be transmitted. A terminal served by a neighboring eNB receives the synchronization signal so as to acquire accurate reception synchronization reference timing about the start of the corresponding discovery resource region. Such an operation may be applied to the D2D communication resource region without being restricted to this example.

Meanwhile, the discovery resource region 1 631 and discovery resource region 2 632 are used simultaneously, a filed for indicating whether the first duration of the resource region (e.g., a subframe) is used for SRU should be included in the BCH or SIB from the eNB. In the case of the Synchronization Source UE, whether the resource for transmitting the synchronization signal exists should be determined based on the field notifying of the usability of the SRU, and in the case of the receiving UE served by the neighboring eNB, whether to receive the synchronization signal and channel in the corresponding resource region or whether to receive the discovery signal may be determined according to the field notifying of the usability of the SRU. This field is referred to as periodic synchronization transmission field in an embodiment of the present disclosure. In the case of using the periodic SRUs 601a, 601b, and 601c, the eNB turns the periodic synchronization transmission field ON to indicate it through the BCH or SIB. In the case of using the temporary (one-shot) SRU 602a, the periodic synchronization transmission filed is OFF to indicate it through the BCH or SIB.

If an extra SRU 602a is not used in the resource region 2 632, the UE located in a partial network coverage area or out-of-network coverage area receives the synchronization signal and synchronization channel transmitted by the UE in the periodically transmitted SRUs 601a, 601b, and 601c to determine the absolute time of the reference frame (SFN0) and acquires the relative position information on both the resource region 1 631 and resource region 2 632 indicated in comparison to the reference frame. The relative position information can be acquired based on the information relayed by a neighboring eNB as well as the information received from the serving eNB. After acquiring the relative position information of the resource region, the UE may wake up from the idle state at least one synchronization period earlier than the start point of the resource region to receive the synchronization signal at the periodic SRUs 601a, 601b, and 601c to compensate synchronization.

Meanwhile, in the case that extra SRU 602a is used in the resource region 2 632, the UE may receive the periodic SRUs 601a, 601b, and 601c and acquire the relative position information from the reference time (SFN0) of the serving eNB for the resource region of the neighboring eNB and may wake up from the idle state right before the start time of the resource region 2 632 to receive the synchronization signal in the extra SRU 602a to compensate the synchronization. In the case of using only the extra SRU 602a in the resource region 2 632 without periodic SRUs 601a, 601b, and 601c, if the eNB has not provide the information on the start point of the resource region in advance or if the UE is the out-of-coverage UE, the UE may operate inefficiently to perform the synchronization procedure for receiving a non-periodic SRU 602a for a long time.

Figure 6C:
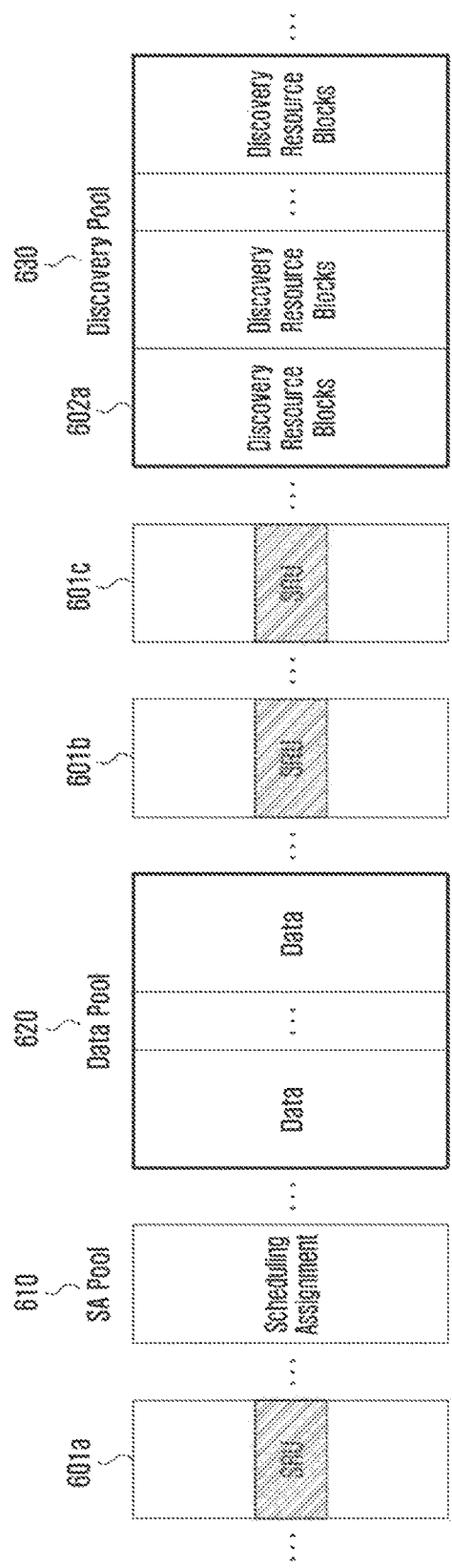
Figure 6D:
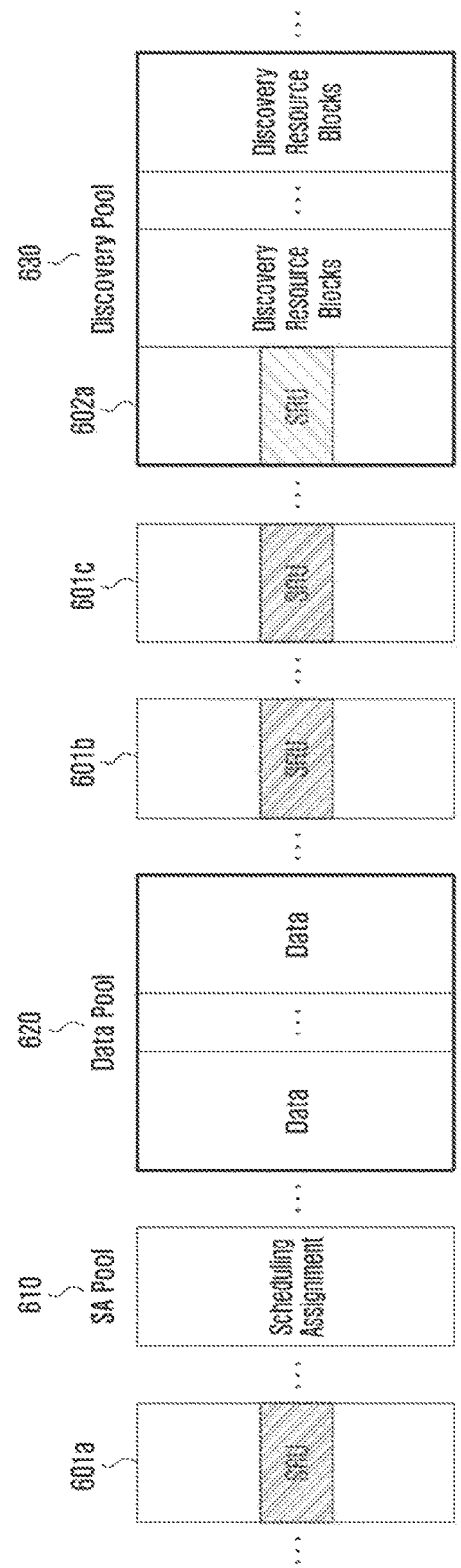

Referring to FIGS. 6C and 6D, FIG. 6C is a diagram illustrating the resource pool structure with synchronization resources for D2D discovery and communication according to an embodiment of the present disclosure, and FIG. 6D is a diagram illustrating the resource pool structure with synchronization resources for D2D discovery and communication according to an embodiment of the present disclosure. The difference between the embodiments of FIGS. 6C and 6D is that an aperiodic SRU 602a is used in the discovery resources in the embodiment of FIG. 6B. The periodic SRUs 601a, 601b, and 601c and the aperiodic SRU 602a of discovery pool 630 are characterized as described with reference to FIGS. 6A and 6B.

The periodic synchronization resources 601a, 601b, and 601c are used in a synchronized transmission mode appropriate for D2D communication. In order to provide a control channel (Scheduling Assignment (SA)) region 610 and data channel (Data) resource region 620 for D2D communication, the UE fulfilling a condition, among the D2D UEs, may become the Synchronization Source UE. If a UE which is not transmitting data becomes the Synchronization source UE, the receiving UE may receive no data even after acquiring synchronization. Accordingly, the presence of data to be transmission is an essential condition for becoming a Synchronization Source UE. The condition of the presence of data to be transmitted can be embodied in various manners. The descriptions thereof are made with reference to FIGS. 7A, 7B, and 7C.

Figure 7A:
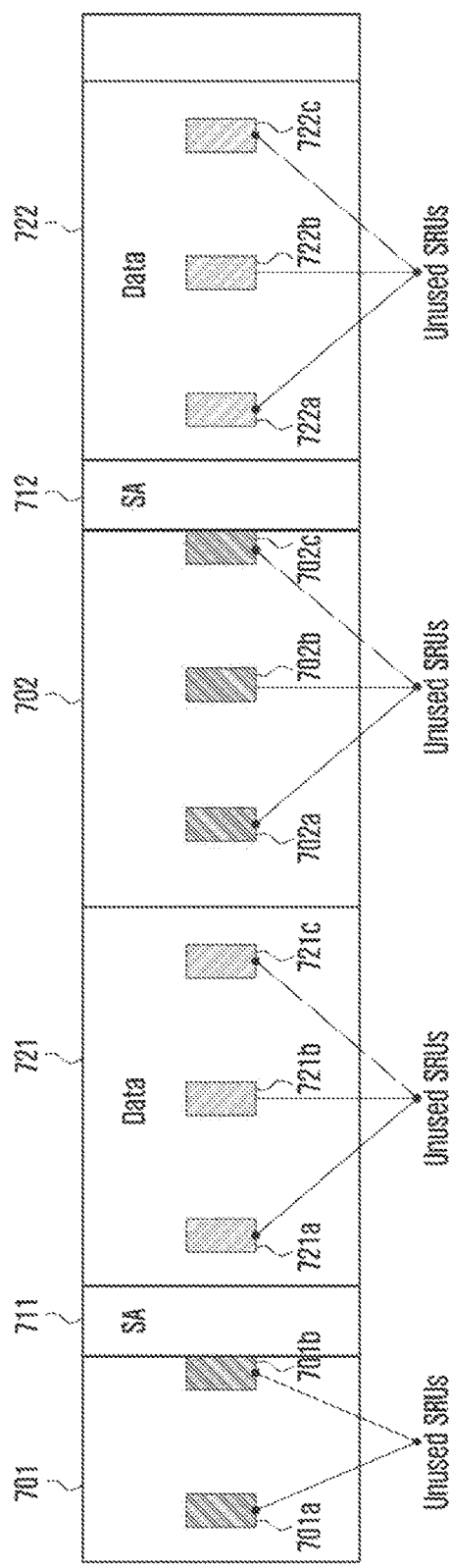
FIGS. 7A, 7B, and 7C illustrate periodic synchronization resource utilization methods according to an embodiment of the present disclosure.
Figure 7B:
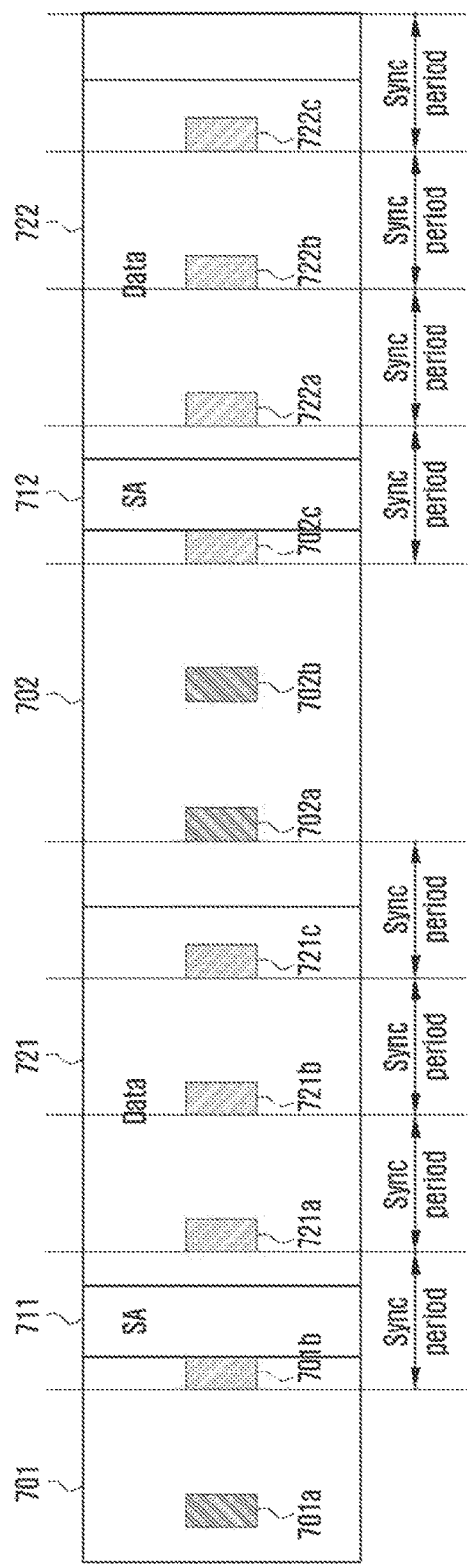
Figure 7C:
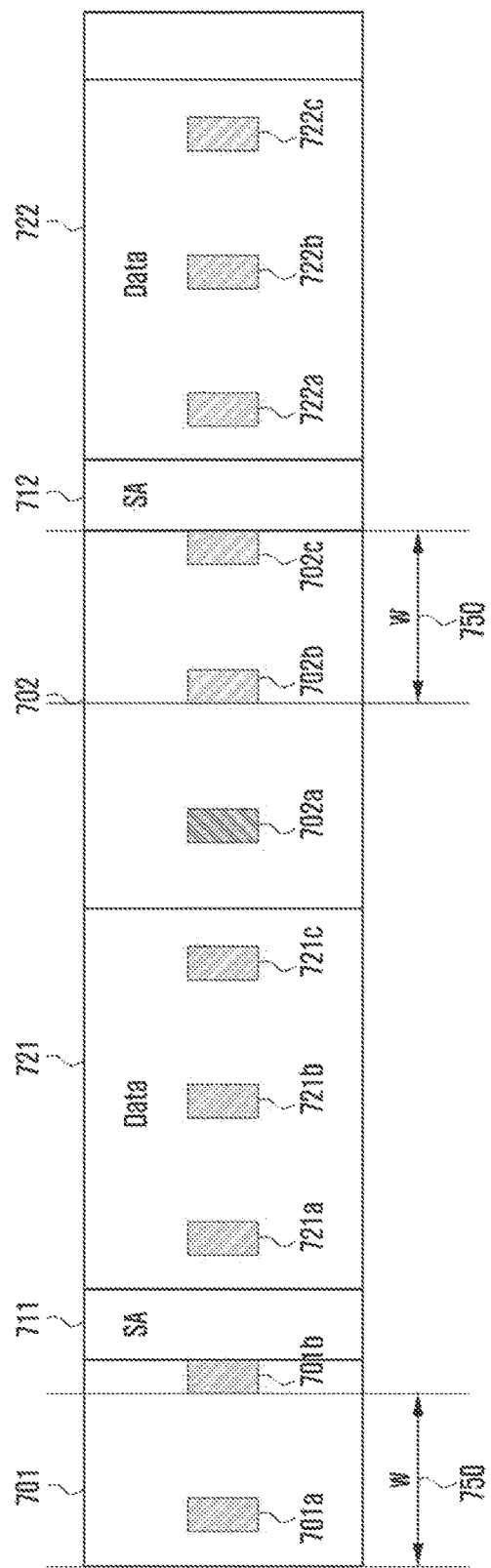

FIGS. 7A, 7B, and 7C illustrate periodic synchronization resource utilization methods according to an embodiment of the present disclosure.

Referring to FIG. 7A, non-D2D communication resources 701 and 702, SA resources 711 and 712, and D2D communication resources 721 and 722 coexist. Since the situation in which such resources coexist have been described above, detailed description thereof is omitted herein. The SRU positions for transmitting synchronization signals may be configured in such resources. FIG. 7A is directed to a method for transmitting the SA signals 711 and 712 and data in synchronization resources 721a, 721b, 721c, 722a, 722b, and 722c included in the SA or data regions 721 and 722. For example, SRUs 701a, 701b, 702a, 702b, and 702c poisoned in the non-D2D communication resource regions 701 and 702 are not used. However, this method has a drawback in that the synchronization resources right before the SA resource regions 711 and 712 cannot be used. Since the synchronization signal is not transmitted at the occasion right before the SA resource region, the Rx UE can receive the synchronization signal after the SA resource region starts.

In order to address this problem, if there is a SA or data resource region between the synchronization resource of which utilization is to be determined and the synchronization resource following a synchronization period, it is allowed for the UE having the SA signal or data to transmit the synchronization signal. For example, the UE can be configured to use the SRUs 701b1 and 702b1 which are not used in the case of FIG. 7A. At this time, the SRUs 701b1 and 702c1 preceding the SA regions 711 and 712 may be the SRUs at the timings different from those of SRUs 701b and 702c of FIG. 7A. For example, since it is required to have the positions configured as long as the preceding synchronization period in match with the synchronization period existing in the data region, the SRUs 701b1 and 702c1 preceding the SA regions 711 and 712 in FIG. 7B may be the SRUs different in timing from the SRUs 701b and 702c of FIG. 7A. Depending on case, the SRUs 701b1 and 702c1 preceding the SA regions 711 and 712 of FIG. 7B may be identical in timing with the SRUs 701b and 702c of FIG. 7A.

Referring to FIG. 7B, the least synchronization operation is possible but it is necessary to receive the synchronization signal for predetermined duration to secure the performance to some extent in real implementation. For example, it is possible to improve the perception performance on the physical layer by receiving the synchronization signal periodically. In order to compensate for the offset of the oscillator controlling the timing, it may be possible to attempt receiving the signal prior to the known period. In order to receive the signal on the resource region of the neighboring cell, it may be possible to attempt receiving in advance based on the gap as much as the timing difference between eNBs.

In order to guarantee the performance in the several scenario, the eNB may control the UE to perform signal reception earlier as much as w than the expected synchronization signal transmission timing by configuring a reception window. This may be applicable for the resource region of the neighboring eNB as well as the serving eNB. The eNB may transmits the parameter was common information through BCH or SIB or using a UE-specific control signal. By taking notice of the UE performing reception operation based on the value of w, the UE operating as a Synchronization source transmits the synchronization signal on the synchronization resource before the timing proceeding the start point t of the predicted resource region as much as w.

Referring to FIG. 7C, the reception window operation may be considered in the discovery and OOC region in addition. In the non-synchronized cell environment, it is possible to identify the synchronization signal for the corresponding resource region considering the offset as much as the reception window size before and after the start time of the D2D resource region (resource pool) of the neighboring eNB. A common window value or UE-specific window values may be used in a specific cell. For the synchronization resource of the serving eNB, it is also possible to identify the synchronization signal for D2D using the window value at the start time of the D2D resource region in the same way. The window values for the serving and neighboring eNBs are provided separately.

For example, if the synchronization signal is identified before the window w 750 as shown in FIG. 7C, it is possible to receive the synchronization signals transmitted at the SRUs 701a, 701b, 702b, and 702c preceding the SA regions 711 and 712. This means that it is possible to receive at least one synchronization signal transmitted in the region 701 and 702 preceding the SRUs 721a, 721b, 721 c, 722a, 722b, and 722c in the data regions 721 and 722 and thus it is possible to acquire the start time points of the SA regions 711 and 712 accurately.

Meanwhile, since the eNB cannot notify the out-of-coverage UE with the start point of the D2D resource, the out-of-coverage UE use a predetermined D2D resource region. The synchronization signal of the synchronization source UE includes the synchronization sequence and synchronization channel, and the D2D frame number is transmitted on the synchronization channel. The position of the D2D resource region may be predetermined based on the D2D frame number. In the out-of-coverage area, the synchronization reception operation may be performed according to a predetermined window value at the start point of the D2D resource region. The resource region-specific window values and the window values of the OOC UE Cat1 and OOC UE Cat2 may differ from each other.

Figure 16:
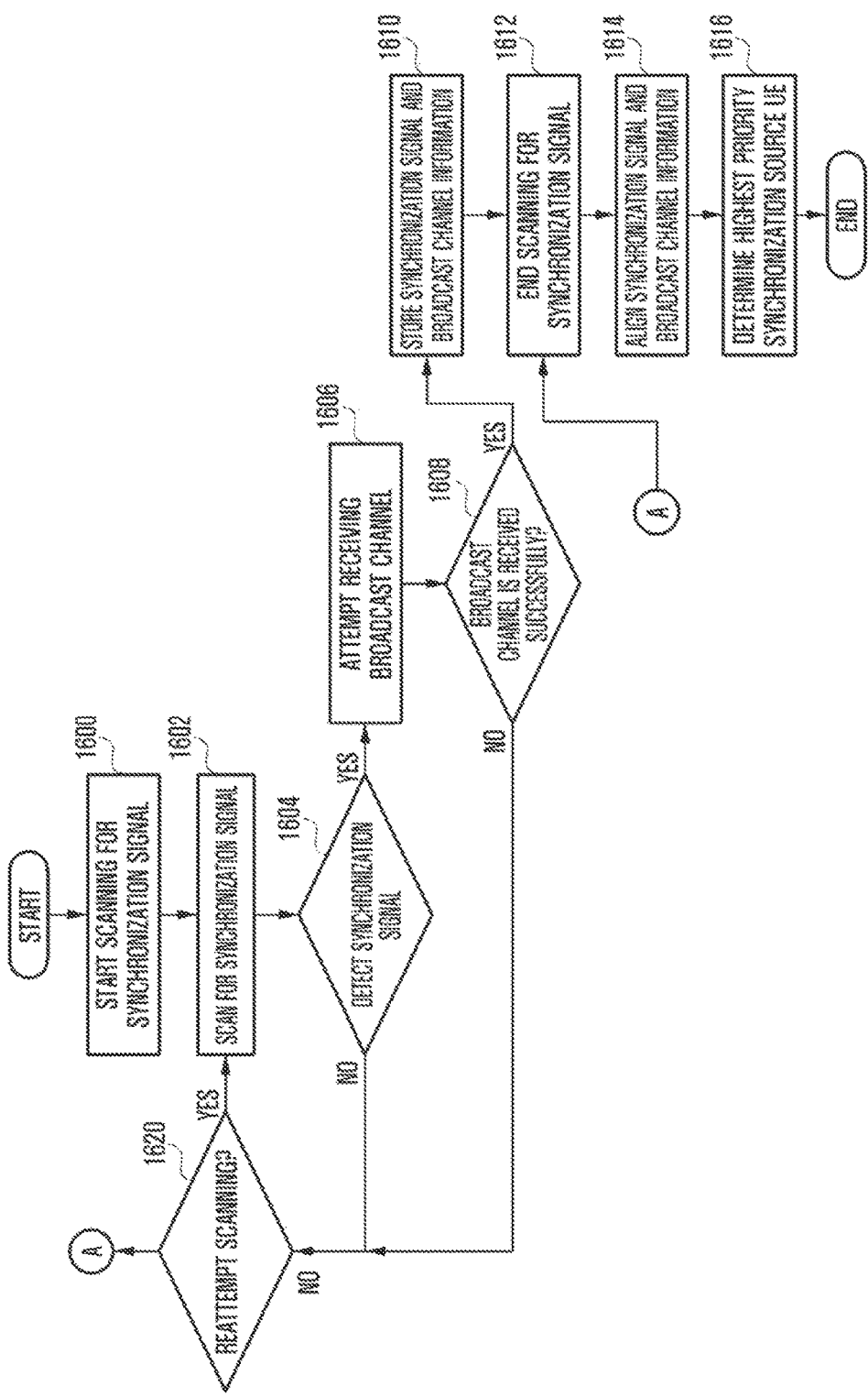
FIG. 16 is a flowchart illustrating a procedure of aligning and selecting synchronization information based on an absolute time according to an embodiment of the present disclosure.
Figure 17:
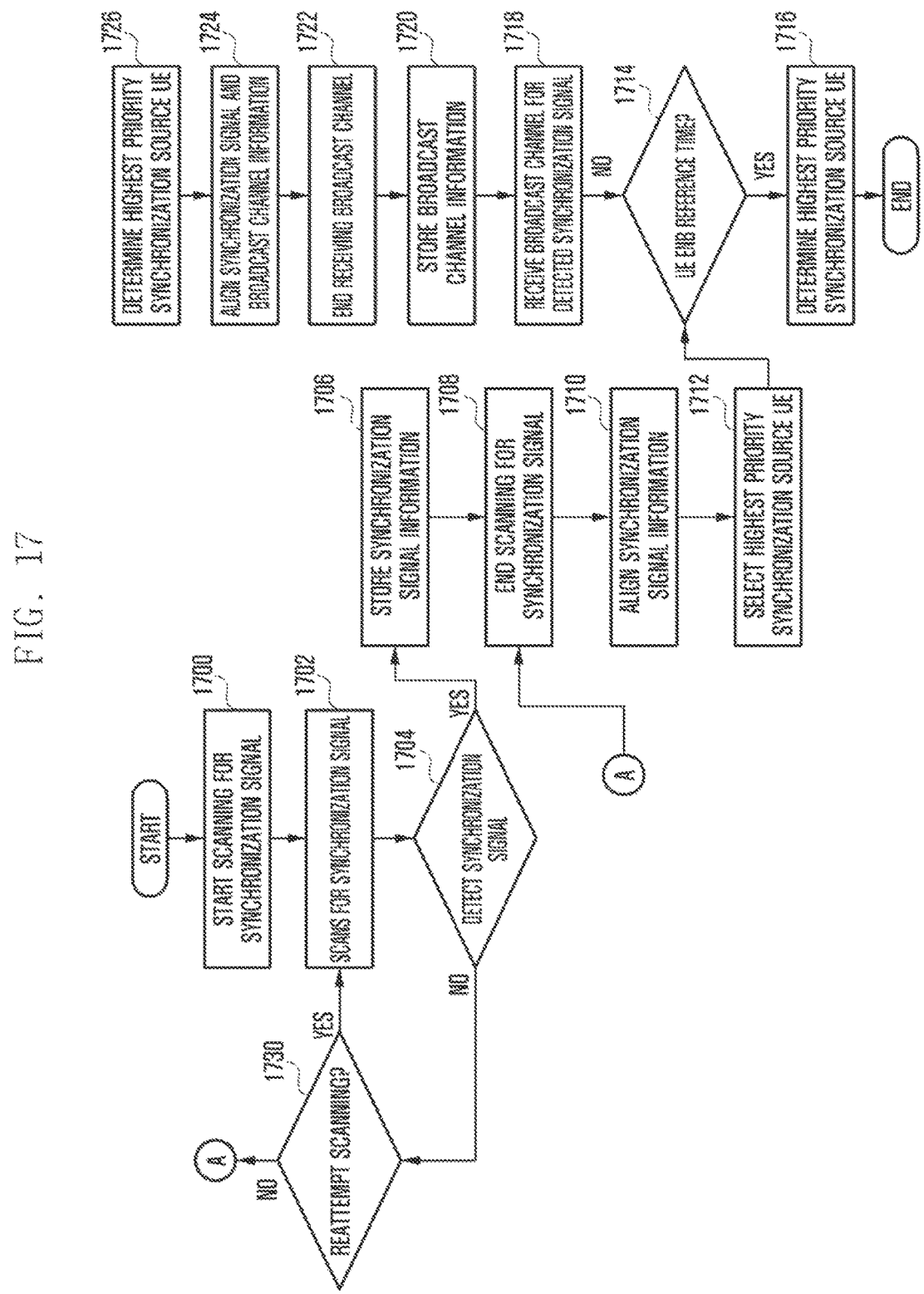
FIG. 17 is a flowchart illustrating a procedure of aligning and selecting synchronization information without consideration of an absolute time according to an embodiment of the present disclosure.

Although FIGS. 7A, 7B, and 7C do not show any case where the synchronization and SA resource regions are overlapped, the SA resource region and the synchronization resource may overlap in the same subframe under the control of the eNB. Since the SA resource region is small in comparison to the data resource region (e.g., data resource region consists of 64 subframes while the SA resource region consists of 2), using the synchronization resource overlapping the SA resource region may decrease the SA resource utilization efficiency significantly. Exceptionally, it is configured that the synchronization signal is not transmitted on the synchronization resource overlapping the SA resource region. Instead, as shown in FIGS. 16 and 17, it is required to apply a method capable of transmitting the synchronization signal before the SA resource region.

Synchronization Sequence Selection Method

If it necessary for the UE which has received the synchronization signal to determine its transmission timing based on the timing derived from the received synchronization signal and, if a condition for becoming a synchronization source UE is fulfilled, determine the synchronization sequence to use for transmitting the synchronization signal in advance. The operation to be considered is, when operates as a synchronization source UE with the timing of a sequence as transmission reference, whether to use the synchronization sequence or another sequence. It is assumed that the synchronization sequence transmitted by the IC UE differs from the synchronization sequence transmitted by the OOC UE.

Figure 8B:
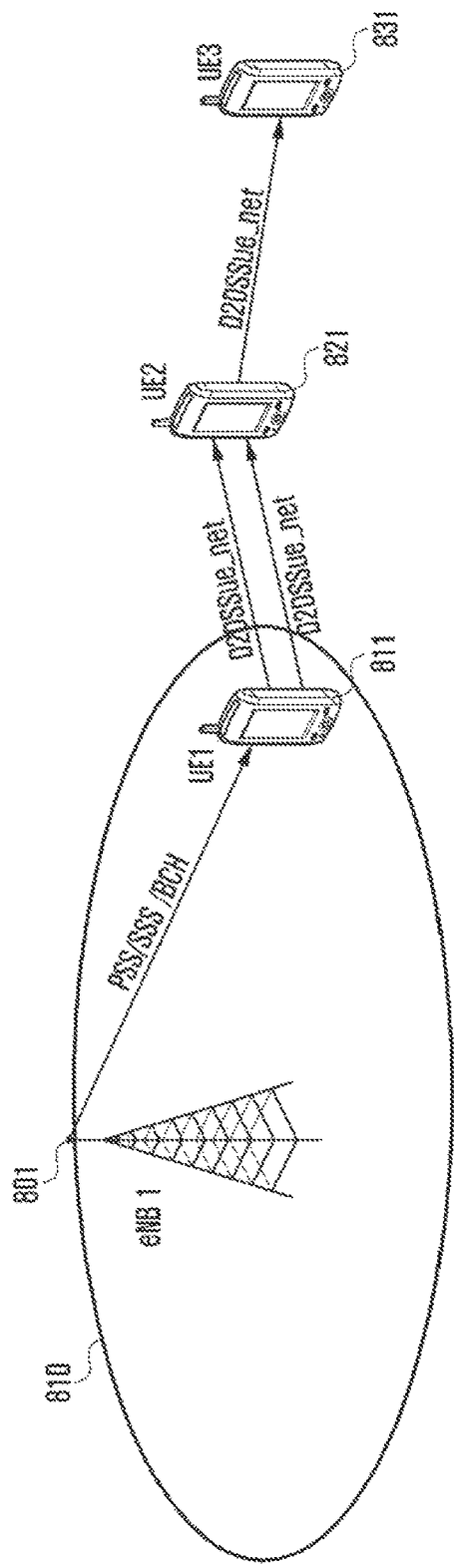

FIGS. 8A and 8B illustrate scenarios for selecting a synchronization sequence between an IC and OOC UEs according to an embodiment of the present disclosure.

Referring to FIGS. 8A and 8B, an eNB 801 has a predetermined coverage area 810 in which an IC UE 811 is located. In addition, the second UE 321 is an category 1 OOC UE which receives signals from the IC UE 811, and a third UE 831 is an category 2 OOC UE which cannot receive signals from the second UE 821 and the network.

In FIG. 8A, when an OOC UE (UE2) 821 receives the synchronization signal transmitted by the IC UE (UE1) 811, since the UE served by the serving eNB has a high priority, the UE 2 821 changes its transmission timing to the timing received from the UE1. In the case that the condition for the UE2 821 to be a synchronization source UE, e.g., if transmission data occurs, the UE2 821 selects a resource among the OCC synchronization resources based on the timing received from the UE1 811 to transmit the OOC synchronization sequence (D2DSSue_00n). In this case, the timing of the eNB is restricted to the range of receiving the IC synchronization sequence (D2DSSue_net). The UE3 831 which receives the OOC synchronization sequence from the UE2 821 determines whether to abide by the timing of the UE2 821 according to the determination condition it has. Such a determination condition may be based on the synchronization signal reception power and variables included in the synchronization channel (D2D Frame Number, time remained to the scanning period, age of the synchronization signal, expiry of the synchronization source due, a number of delay hops, and the like).

In FIG. 8B, when the OOC UE (UE2) 821 receives the synchronization signal transmitted by the IC UE (UE1) 811, since the UE served by the eNB has a high priority, the UE2 821 changes its transmission timing to the timing received from the UE1 811. In the case that the condition for the UE2 821 to be a synchronization source UE, e.g., if transmission data occurs, the UE2 821 selects a resource among the OCC synchronization resources based on the timing received from the UE1 811 to transmit the IC synchronization sequence. In this case, the timing of the eNB may be extended infinitely for receiving the IC synchronization sequence (D2DSSue_net). Accordingly, it may be possible to determine whether relay the IC synchronization sequence based on the variable included in the synchronization channel (i.e., a number of relay hops, synchronization signal accuracy, and the like) to restrict the relay in a predetermined range.

In the case of transmitting/receiving the synchronization signals between OOC UEs, there are advantages and disadvantageous depending on the sequence matches the synchronization sequence of the synchronization signal supposed to abide by. If a sequence identical with the sequence of the synchronization signal abiding by the reference timing is used for transmitting the synchronization signal, since the synchronized UEs use the same sequence while the non-synchronized UEs use different sequences, if different sequences are detected in the scanning process, it is easy to recognize the synchronization mismatch. However, there is a drawback in that when the synchronized UEs rejoin after being dispersed it is impossible to correct the timing offset occurring due to the clock drift.

It is also possible for the synchronization source UEs to UE different synchronization sequences in different ways and, in this case, if even the synchronized UEs use different synchronization sequences, it is difficult to detect the non-synchronized situation due to the synchronization sequence mismatch and thus it is advantageous to match all of the synchronization resource positions among each other. For example, the UEs cannot listen to each other in the same resource due to the half-duplex problem and thus, if there is a synchronization signal received at a time point with the exception of the synchronization transmission timing, it is possible to judge that the signal is received from the non-synchronized UE.

In order to address the above shortcomings, the following methods can be considered.

In the case of receiving the synchronization sequence transmitted by the IC UE, the OOC UE transmits one of the synchronization sequences for OOC or the sequence in use. If the OOC UE has received the synchronization signal of the OOC UE and synchronized Tx timing, the OOC UE transmits the signal with the same sequence as the received synchronization sequence. However, since there can be a synchronization offset even between the UEs synchronized in the dynamic environment, the synchronization sequence may change periodically. For example, in order to perform scanning in the scanning period, the previous synchronization sequence may be changed. Although the scanning periods of the synchronized UEs match each other (e.g., the scanning period is configured based on the DFN), if the UEs synchronized in the scanning period use different sequences, it is possible to determine the synchronization offset only based on the sequence difference without calculating the timing offset. The above operation may be performed with the ID of the synchronization source UE instead of the synchronization sequence.

Similar to the method of changing eh sequence or synchronization source UE ID at every scanning period, if it becomes a new I-SS after scanning (because there is nobody around), the following operations can be performed while maintaining the timing of the D2DSS, i.e., symbol and frame boundary timing.

1) If the scanning timing is determined based on the D2D frame number, the DFN is changed.

2) If there is a control signal notifying of an additional scanning timing (Time-to-Scan, TTS), the DFN is maintained, but TTS value is changed.

Synchronization Signal Measurement Method

When a synchronization signal is received, a D2D UE may measure other synchronization signals to determine whether it becomes a Synchronization Source UE or to report to the eNB according to its connection state of the UE. Meanwhile, the synchronization measurement method may change depending on case in the situation where the resource region requiring periodic synchronization signal and the resource region enough with the one-shot synchronization signal are split. The synchronized UEs determined under the control of the eNB or according to a predetermined condition have to transmit the one-shot synchronization signal using the same SRU.

At this time, the synchronization signal transmission is restricted to a method of transmitting the same signal on the same resource in a way of Single Frequency Network. At this time, since one or more synchronization signals are received in an overlapped manner, the received signal power may be high in comparison to the case where one synchronization UE transmit the synchronization signal and the synchronization signal may propagate farther the data. In the case that the eNB has allocate the resource for periodic synchronization signal, the synchronization UEs determined under the control of the eNB or according to a predetermined condition selects the idle synchronization resource to transmit the synchronization signal. At this time, since the synchronization signals from the synchronization UEs as small as possible in number are overlapped, the received signal power at the receiving UE is relatively low in comparison to the case of the one-shot synchronization signal transmission and its propagation distance is not long as compared to the data propagation distance.

Due to such environmental differences, it is problematic to use the one-shot synchronization signal transmission as the measurement target for selecting the Synchronization Relaying UE for out-of-coverage UE. Accordingly, it is natural to choose only the periodic synchronization signal as the measurement target for selecting the Synchronization relaying UE. For this purpose, the synchronization UE located in the eNB coverage area has to notify of the synchronization resource position, i.e., an SRU period and offset information, through the synchronization signal and synchronization channel first. The synchronization UE also may relay the information on the resource region not used as periodic synchronization resource (i.e., an offset, a bitmap, and the like).

The UE which has received the synchronization signal and synchronization channel from the synchronization UE measures the synchronization signal from the neighboring synchronization UE first to become a Synchronization Relaying UE. The synchronization signal received from the UE served by the eNB in the corresponding resource region which is acquired from the information on the resource region not being used as the periodic synchronization resource may be ignored based on the information on the resource region other than the periodic synchronization resource region (this can be determined based on the synchronization signal transmitted by the synchronization signal and the ID included in the synchronization signal and synchronization channel). For example, the UE measures the synchronization signals transmitted by only IC and category 1 OOC UEs served by the neighboring eNB or category 2 OOC UEs without being served by any eNB in this embodiment of the present disclosure.

In another example, the synchronization UE may relay the information on the resource region for periodic synchronization resource (i.e., an offset, a bitmap, and the like). The UE which has received the synchronization signal and synchronization channel from the synchronization UE measures the synchronization signal from the neighboring synchronization UEs first to become a Synchronization Relaying UE. Only the synchronization signals received from the UEs served by the same eNB in the corresponding resource region from the information on the resource region using the periodic synchronization resource are used for measurement (this can be determined based on the ID included in the synchronization sequence and synchronization channel).

Meanwhile, it is possible to determine to transmit the synchronization signal periodically in the resource region using no periodic synchronization resource, nevertheless, based on the information on the resource region using the periodic synchronization resource and the opposite resource region and the number of relay hops from the eNB. For example, in the case that the number of relay hops is 2, i.e., an eNB (0 hop)→UE1 (1 hop)→UE2 (2 hops), the UE 2 may refrain from the synchronization transmission in order to avoid the influence by the signal transmission, such as interference when other UEs served by the eNB operate in the resource region using no periodic synchronization resource. However, in the case that the number of relay hops is 3, i.e., an eNB (0 hop)→UE1 (1 hop)→UE2 (2 hops) →UE3 (3 hops), the signal of the UE 3 does not reach the in-coverage UE and thus cannot transmit the synchronization signal in the resource region in which the periodic synchronization resource is not used.

Meanwhile, in the out-of-coverage operation, if the synchronization resource is divided into I-SS resource and V-SS resource or the resource for the UE with data and the resource for the UE without data, the synchronization signal measurement is restricted to the resource for the I-SS or the resource for the UE with data. Accordingly, when a UE measures the received signal power of the synchronization signal to determine the condition for becoming a synchronization source UE, if the received signal power strength of the synchronization signal from the I-SS or the UE with data is greater than a predetermined X dBm, the UE cannot become a Synchronization source UE. According to this method, although a UE receives the synchronization from a neighboring V-SS or UE without data, no synchronization signal (equal to or greater than X dBm) is received because there is no closely-located V-SS or UE with data, the UE may become a synchronization source UE.

Sync for Tx

A description is made of the synchronization procedure for D2D discovery and communication hereinafter. The synchronization procedure consists of a transmission synchronization procedure for reference timing of signal transmission and a reception synchronization procedure for reference timing of signal reception. This aims to allow receiving D2D discovery or communication signal in accordance with another synchronization signal although a reference timing for default transmission under the assumption that perfect synchronization is impossible out of the network coverage area. Accordingly, the whole procedure consists of a process of transmission synchronization acquisition and role determination procedure after scanning for acquiring periodic transmission synchronization and a process of reception synchronization acquisition after scanning for acquiring reception synchronization simultaneously. A description thereof is made with reference to FIG. 9.

FIG. 9 is a flowchart illustrating a transmission timing synchronization procedure according to an embodiment of the present disclosure.

Referring to FIG. 9, the UE turns on, i.e., the D2D mode is enabled, at operation 900, and starts scanning for eNBs. This operation may be performed by the radio communication unit 201 or mode 203 of FIG. 2 under the control of the control unit 205. If the UE is in the state of being turned, operation 900 may be omitted. It should be noted that the UE operates under the control of the control unit 205 in the procedure of FIG. 9.

The UE determines whether the current time is the timing of scanning for transmission at operation 902. The scanning may be performed to search for eNBs and UEs or only eNBs. The UE first scans to search for eNBs at operation 904. In the case of scanning to search for UEs, however, operation 904 of scanning to search for eNBs may be omitted and jumps to operation 920 of scanning to search for UEs. As a result of the scanning operation at operation 904, at least one eNB synchronization signal (PSS/SSS) is detected, the control unit 205 selects the synchronization signal of the at least one eNB to acquire synchronization with the eNB at operation 908 and determines whether to operate as a relaying synchronization source (R-SS) at operation 910. The operation of selecting one of the at least one eNB synchronization signal can be performed typically based on the received signal power strength as specified in the legacy LTE standard. The procedure of becoming the R-SS is described below with reference to accompanying drawings. After determining to become the R-SS, the control unit 205 returns the procedure to operation 902 to scan for eNBs periodically.

If no eNB synchronization signal is detected at operation 906, the UE scans to search for UE synchronization signals transmitted by other synchronization source UE at operation 920. After finding the UE synchronization signal, the control unit 205 determines whether at least one UE synchronization signal (D2DSS) or UE broadcast/synchronization channel is detected at operation 922. If at least one D2DSS or D2DBCH/D2DSCH is detected, the control unit 905 selects one of the at least one D2DSS to acquire synchronization with the corresponding UE at operation 924 and determines whether to become a Synchronization Relaying UE at operation 926. The operation of selecting one of the at least one UE synchronization signal may be performed based on at least one of received signal power strength, D2D Frame Number, number of relay hops, synchronization UE validity duration, age of synchronization UE, and synchronization phase information of device. At this time, if neither eNB synchronization signal nor D2DSS is detected at operation 906 and 922, the UE which has the discovery signal, communication control signal, and communication data signal becomes an Independent Synchronization Source (I-SS) autonomously.

Unlike the UE synchronized with the eNB, the UE synchronized with the synchronization source UE has to perform the scanning operation periodically. This is because the UE is mobile so as to be likely to change network frequently unlike the eNB. The synchronization source UE has to always determine the condition for stopping synchronization signal transmission. The synchronization signal transmission stop procedure is described below with reference to accompanying drawings.

The UE determines whether it is Time to Scan for Transmission at operation 940 and, if so, returns the procedure to operation 902 to scan for eNBs or UEs again. If it is not Time to Scan for Transmission, the UE determines whether it is Time to Scan for Reception at operation 930. The procedure of scanning for reception is described below with reference to accompanying drawings.

The scanning for transmission and the scanning for reception may differ in transmission scheme from each other in view of the synchronization source UE. The scanning for transmission is performed predicting change of synchronization afterward, but the transmission timing is maintained even after the scanning for reception. Accordingly, the synchronization source UE stops synchronization signal transmission during the scanning for transmission but continues transmitting the synchronization signal during the scanning for reception.

Sync for Rx

Figure 10A:
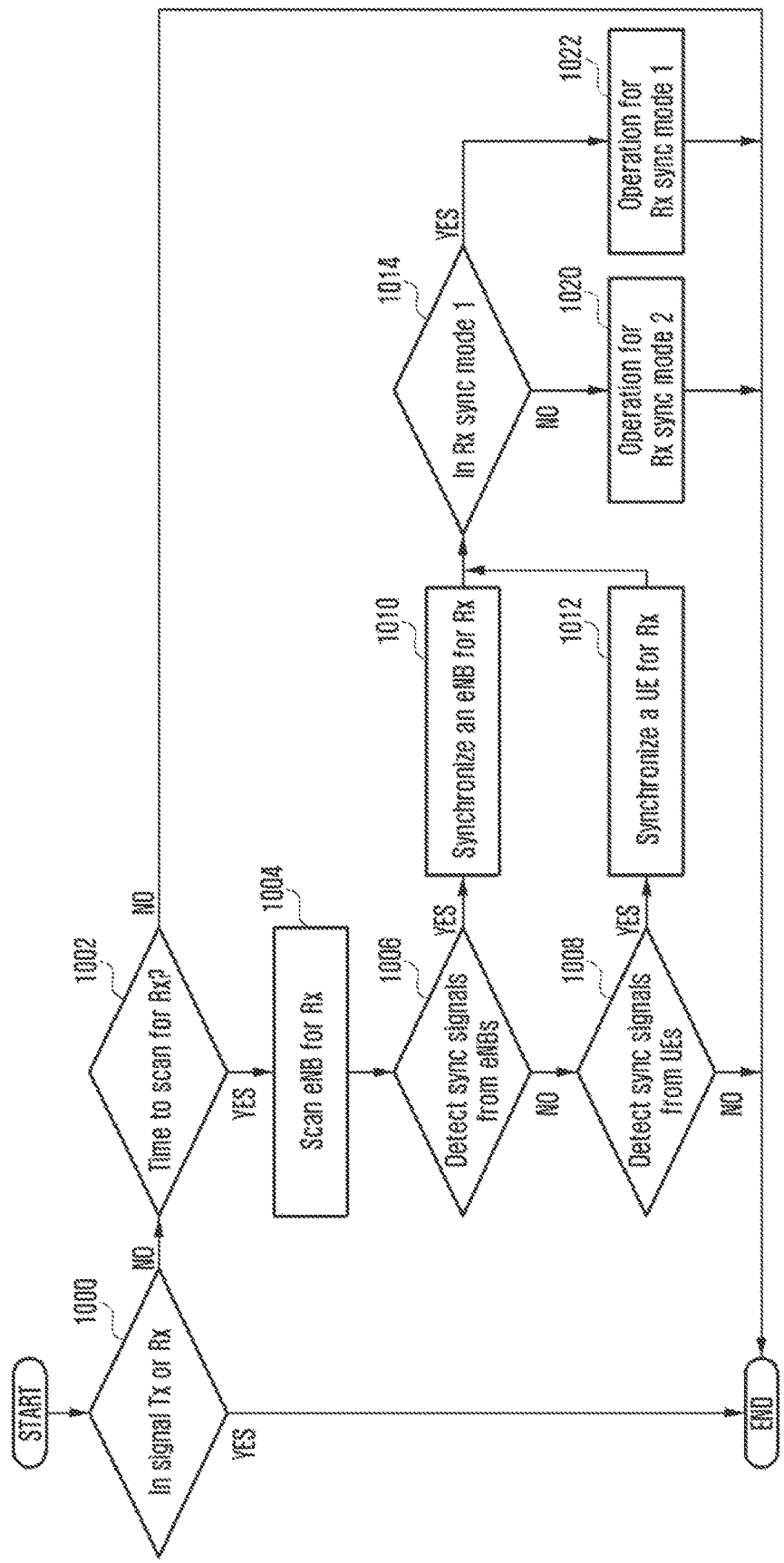
FIGS. 10A, 10B, and 10C are flowcharts illustrating a scanning procedure for reception according to an embodiment of the present disclosure.
Figure 10B:
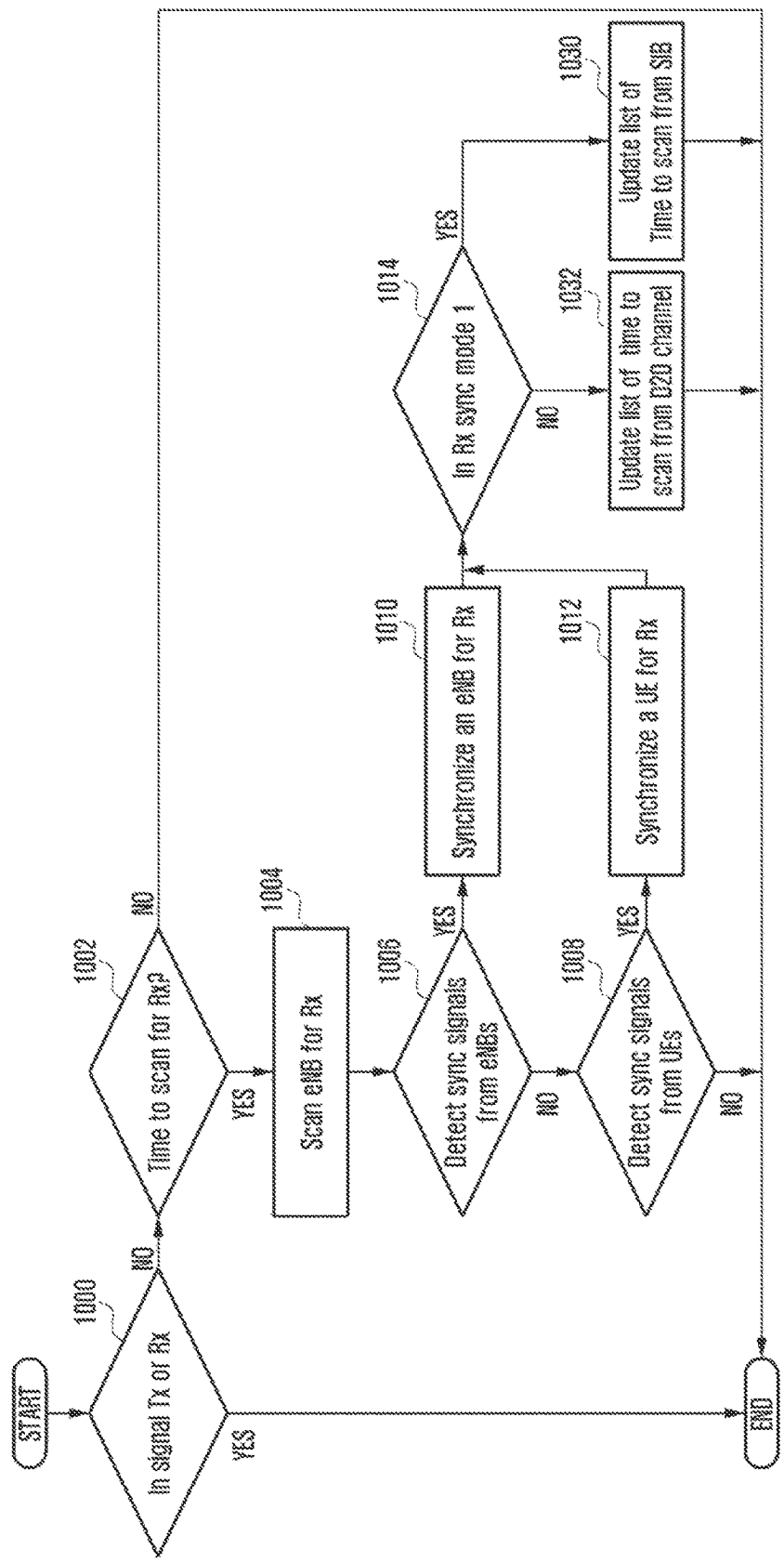
Figure 10C:
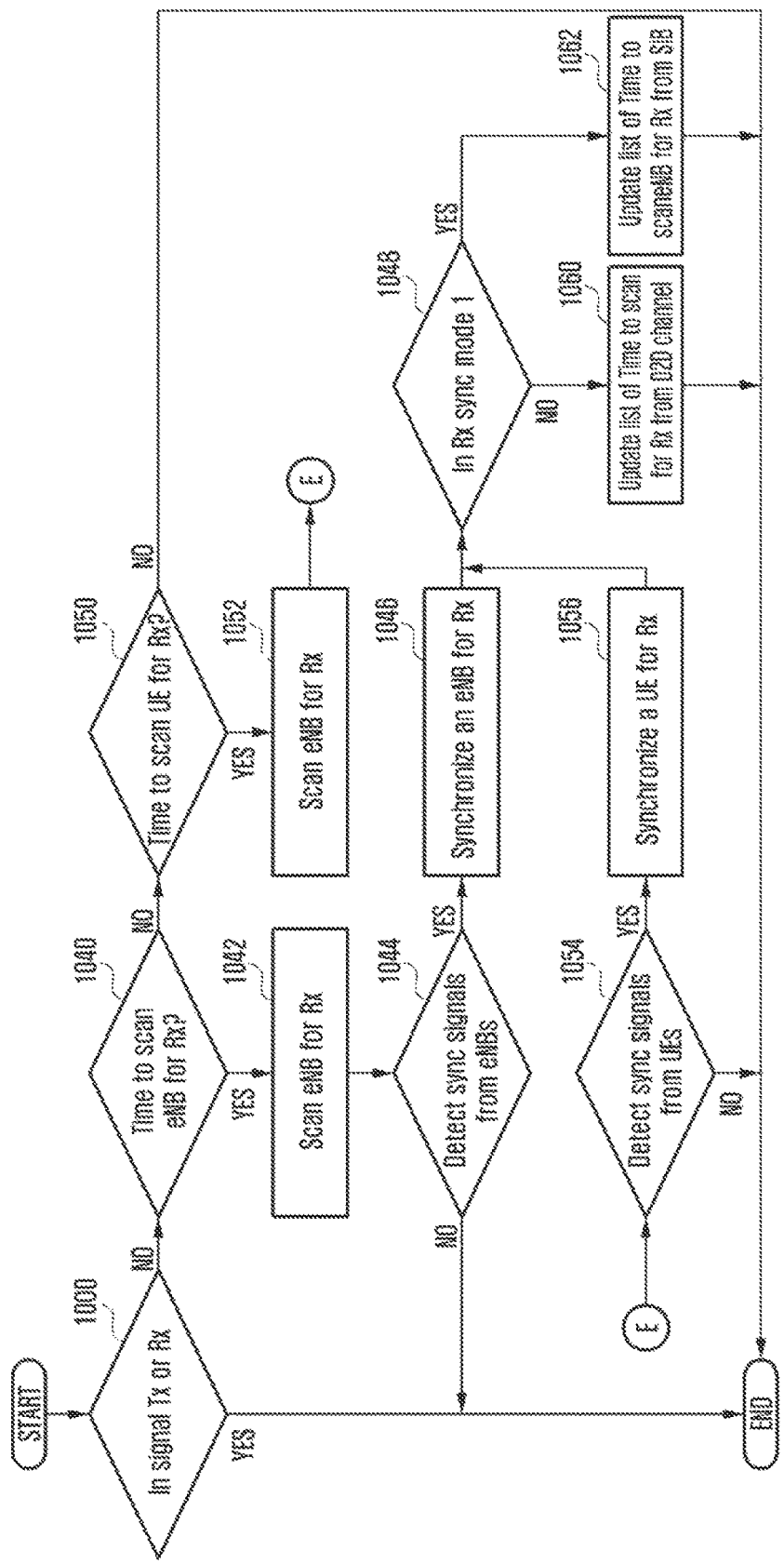

FIGS. 10A, 10B, and 10C are flowcharts illustrating a scanning procedure for reception according to an embodiment of the present disclosure.

Referring to FIG. 10A, it should be noted that the UE operates under the control of the control unit 205 in the procedure of FIGS. 10A, 10B, and 10C, and the terms 'LIE' and 'control unit 205' may be used interchangeably. If necessary, the block diagram of FIG. 2 is referred to describe the operation.

The UE determines whether it is transmitting or receiving D2D signals at operation 1000. For example, if the UE is transmitting a control or data signal for Discovery or Communication, it may be difficult to receive other synchronization signals before the Tx/Rx operations is completed. If the UE is transmitting/receiving D2D signals, the control unit 205 determines whether it is Time to Scan for Reception at operation 1002. If it is configured to perform scanning for reception always, this operation may be omitted. If it is Time to Scan for Reception, the control unit 205 performs scanning for eNB synchronization signals at operation 1004 and determines whether any eNB synchronization signal is listened, i.e., whether any eNB synchronization is received, at operation 1006. If any eNB synchronization signal is received at operation 1006, the control unit 205 establishes synchronization with the eNB at operation 1010 and determines whether it operates in the D2D signal reception mode at operation 1014. If it is determined in operation 1014 that the operation is in the D2D signal reception mode, the operation proceeds to operation 1022 and performs operation for signal reception mode 1. Otherwise, if it is determined in operation 1014 that the operation is not in the D2D signal reception mode, the operation proceeds to operation 1020 and performs operation for signal reception mode 2.

Otherwise, if no eNB synchronization signal is listened at operation 1006, the control unit 205 determines whether any D2DSS is listened at operation 1008. If no synchronization signal is listened at operation 1008, the control unit 205 ends the routine of FIG. 10A. Otherwise, if any UE synchronization signal is listened at operation 1008. The control unit 205 configures the Rx reference time at operation 1012 and determines whether the UE is operating in the D2D signal reception mode at operation 1014.

As described with reference to FIG. 10A, the D2D signal may be received in one of the first reception synchronization mode (Rx sync mode 1) and the second reception synchronization mode (Rx sync mode 2). Since it is possible to use the Tx timing for the reception operation in the resource region of the serving cell in the Rx mode, detailed description thereof is omitted herein.

A description is made of the difference between Rx sync mode 1 and Rx sync mode 2 hereinafter.

Rx sync mode 1: It is assume that the serving eNB notifies of the resource region information, such as offset with a neighboring eNB using the offset from the reference frame timing (e.g., SFN0). Accordingly, the UE performs D2D reception in the notified resource region and, if a synchronization signal from a UE served by the neighboring eNB is detected, acquires the symbol and frame boundaries to perform a predetermined D2D operation.

The out-of-coverage UE which acquires the eNB reference timing from the synchronization signal relayed by another UE may perform the reception operation based on the offset from the neighing eNB's and the resource region information of the neighboring eNB that are relayed by the synchronization UE through the synchronization channel as if it is served by the eNB. At this time, the reception UE has to determine the ID of the eNB which the synchronization UE is associated with or camped on through the synchronization signal of the synchronization UE.

For the out-of-coverage UE which acquires Independent reference timing not derived from the reception network, it is not easy to use the Rx sync mode 1. This is the case that the synchronization UE appears independently because there is not synchronization relaying UE served by an eNB. If complexity does not matter, the following method can be used. A UE served by the eNB receives the reference timing of the independent out-of-coverage UE and reports the reference timing of the independent out-of-coverage UE to the eNB, the eNB may notify the UEs the eNB serves of the offset from the independent out-of-coverage UE's based on the reports from at least one UE. However, the complexity does matter, the Rx sync mode 2 seems to be more efficiently.

Rx sync mode 2: It is assumed that a neighboring eNB or a synchronization UE served by the neighboring eNB notifies of the resource region information, such as the offset from the neighboring eNB (cell) based on the reference timing of the corresponding neighboring eNB (e.g., SFN0). The resource region information may include the information on the synchronization resource as well as the discovery resource, communication control resource, and communication data resource. Accordingly, the UE has to receive every synchronization signal and channel to acquire symbol and frame boundaries from the synchronization signal and the current SFN and position of the resource region from the synchronization channel. If the current timing matches the determined D2D resource region, the UE performs D2D operation in the resource region and, otherwise, may stay in the idle state until the D2D resource region arrives if no operation associated with WAN as well as D2D operation.

In the Rx sync mode 2, the out-of-coverage UE acquired the eNB reference timing based on the synchronization signal relayed by a UE or not may perform the D2D reception operation by receiving the SFN and resource region information of the neighboring eNB which the synchronization UE transmits the synchronization channel.

Referring FIG. 10B, in comparison to FIG. 10A, operations in Rx sync mode 1 and Rx sync mode 2 are illustrated. In the Rx sync mode 1, i.e., at operation 1030, the UE acquires the information on the start point of the resource region of the neighboring eNB based on the SIB received from the eNB and updates the information list for determining the start point of scanning for receiving signals based thereon. In the Rx sync mode 2, i.e., at operation 1032, the UE acquires the information on the start points of the resource regions of the synchronization source UE as well as the neighboring eNB through D2DBCH or D2DSCH and updates the information list for determining the start point of scanning for receiving signals based thereon.

In comparison to FIG. 10B, FIG. 10C is a flowchart for explaining a method of managing the scanning periods for reception from the eNB and UE separately.

Referring to FIG. 10C, the control unit 205 determines whether it is transmitting or receiving D2D signals at operation 1000. If it is neither transmitting nor receiving any D2D signal, the control unit 205 determines whether it is Time to Scan for Reception from an eNB at operation 1040. If it is configured to scan for reception always, this operation may be omitted. If it is Time to Scan eNBs for Reception, the eNB 205 scans for eNB synchronization signals at operation 1042 and determines whether any eNB synchronization is listened, i.e., any eNB synchronization signal is received. If any eNB synchronization signal is received at operation 1044, the UE acquires synchronization with the eNB for reception at operation 1046 and determines whether the UE is operating in the D2D Sync mode 1 at operation 1048.

If it is not Time to Scan eNBs for Reception at operation 1040, the control unit 205 determines whether it is Time to Scan UEs for Reception at operation 1050. If it is Time to Scan UEs for Reception at operation 1050, the UE performs scanning UEs for reception at operation 1052 and determines whether any synchronization signal is received from at least one UE at operation 1054. If any synchronization signal is detected at operation 1054, the control unit 205 acquires synchronization with the UE for reception at operation 1056. The control unit 205 determines whether it is operating in the Rx sync mode 1 at operation 1048 and, if so, the procedure goes to operation 1060 and, otherwise, operation 1062.

At operation 1060, the control unit 205 updates the scanning time list for receiving signals through the D2D channel in the Rx sync mode 2 and, at operation 1062, updates the scanning time list for receiving signals through an SIB in the Rx sync mode 1.

In FIG. 10C, a plurality of reception timings are managed in the form of a list at operations 1060 and 1062, but it is impossible to manage all reception timings due to the communication chip performance and memory constraints. Accordingly, the reception operation has to be performed with a predetermined number of reception timings. For example, if it is required to select 5 reception timings among the reception timings acquired from the 30 received synchronization signals, there is a need of conditions for determining priorities for selection. For example, when tracking N Rx syncs, N synchronization signals are selected based on their priorities.

The reception operation is performed based on the synchronization signal of the serving eNB or synchronization source UE, i.e., its own transmission timing, with priority and in the order of the serving eNB transmission timing, in-coverage UE transmission timing, and out-of-coverage UE transmission timing. At this time, if N is 1, the order is exceptionally adjusted such that the transmission timing of the eNB has the highest priority. In another example, the transmission timing of the eNB has the highest priority and is followed by its own transmission timing, in-coverage UE transmission timing, and out-of-coverage UE transmission timing. In the case of the system using the absolute time, such as a GPS time, the transmission timing of the UE using the absolute time based on GPS may be positioned between the in-coverage UE transmission timing and the out-of-coverage UE transmission timing. In the above example, if the priorities are equal to each other, the priority is determined based on the received signal power of the synchronization signal or D2D Frame Number.

In case that the synchronization resource for use by the UE having the discovery signal, communication control signal, and communication data signal to be transmitted and the synchronization resource for use by the UE which transmits the synchronization signal, although the UE has not signal to transmit, for supporting the synchronization procedure, the synchronization resource of the synchronization source UE supported by the synchronization targets being tracked may be ruled out. Although the synchronization signals are not distinct from each other, if the synchronization signals of the UE transmitting and the UE not transmitting the discovery/communication signal are distinguished from each other, the synchronization signal of the supporting UE may be excluded too in selecting the reception synchronization targets being tracked.

If an appropriate synchronization procedure is not provided in the out-of-coverage environment, a cluster of synchronization source UEs may exist. In this environment, it is difficult that the transmission/reception regions of the neighboring clusters match, it is necessary to perform the transmission/reception operations simultaneously in the neighboring clusters. Since it is difficult to transmit signal at the timing of the neighboring cluster in the inter-cluster synchronization mismatch situation, transmission is performed at the timing of the synchronization source UE while reception is performed according to the plural timings of the neighboring synchronization source UEs as described above. In order to perform the D2D discovery and communication at plural reception timings with the same priorities, e.g., of OCC UEs, the list may be created based on collision of the resource regions as follows.

a) The UE determines the position of the resource region which is acquired from the reception timing at the top of the reception timing list.

b) The reception timing list colliding with the positions of the determined resource region in time is marked with no use or deleted.

The above procedure may be applied differently depending on the type of the resource region and, specifically, the colliding reception timing is not used for the communication control resource region, but collision is allowed in the communication data resource region.

Along with the problem of collision between the synchronization timing and resource region, it is necessary to consider the problem of collision between different resource regions. When tracking a plurality of timings and acquiring resource region information from the synchronization channel, there may be a conflict between operations in one or more resource regions. For example, the data resource regions received from the IC UE and the OOC UE may be configured in the same time. In order to avoid complication, the UE may operate according to the following principles.

If the control resource region and data resource region for D2D communication exist in the same subframe, the priority is given to the control resource region. If the resource region indicated from the IC UE and the OOC UE exist in the same subframe, the priority is given to the reception resource region indicated from the IC UE. In the situation where the problem is not addressed with the two principles, the priority is given to the resource region indicated from the UE with the high received signal power of the synchronization signal.

Figure 11:
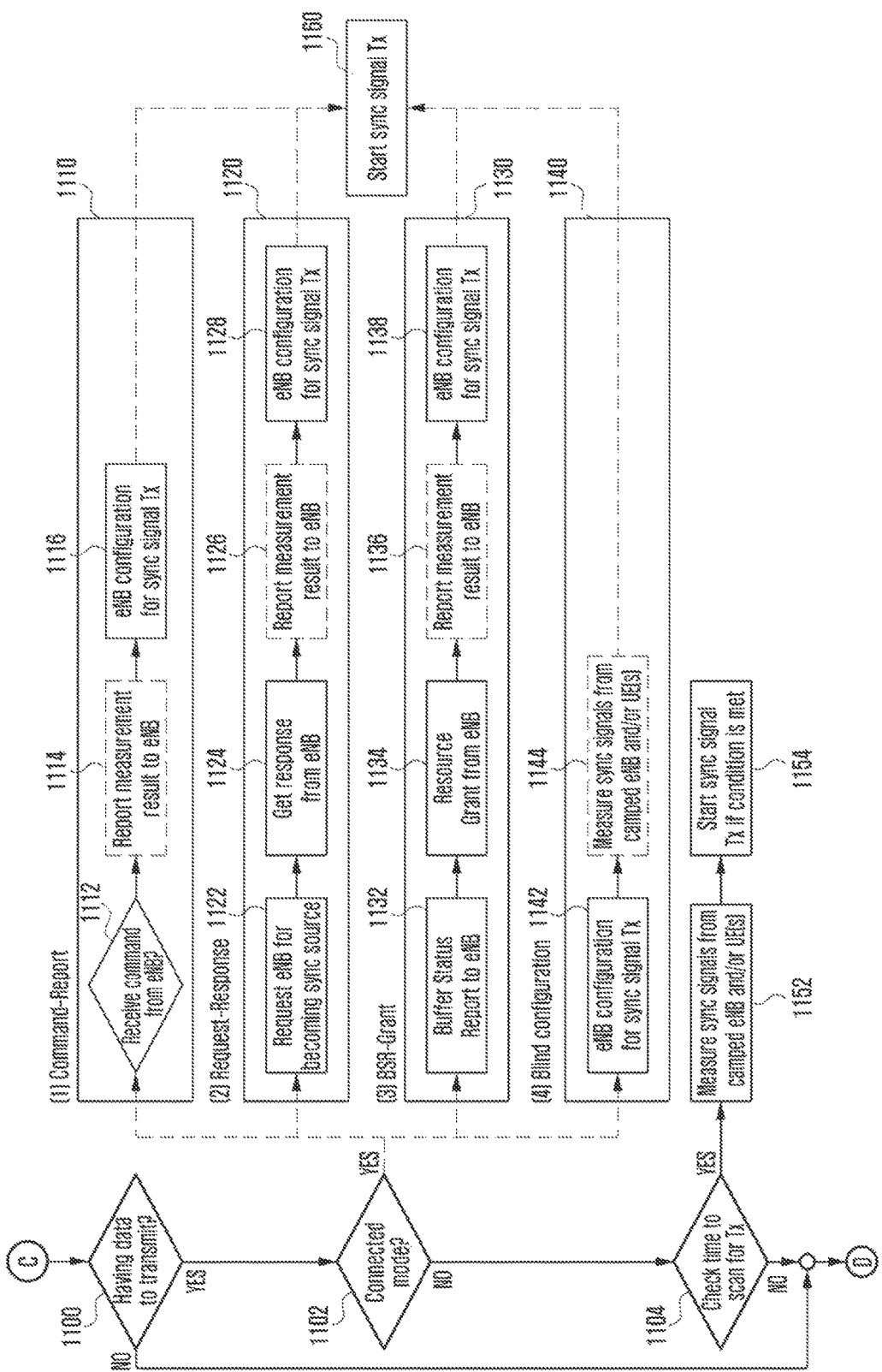
FIG. 11 is a flowchart illustrating a procedure of determining a condition to become a Synchronization Relaying UE according to an embodiment of the present disclosure.

FIG. 11 is a flowchart illustrating a procedure of determining a condition to become a Synchronization Relaying UE according to an embodiment of the present disclosure. The flowchart of FIG. 11 shows the detailed operation of UE at operation 910 of FIG. 9.

Referring to FIG. 11, the control unit 205 determines whether the UE has a discovery/control/data signal to be transmitted at operation 1100. In an embodiment of the present disclosure, the control unit of the UE in the connected mode may not determine whether the control unit of the UE has a discovery/control/data signal to be transmitted. If it is determined that the UE has a discovery/control/data signal to be transmitted at operation 1100, the control unit 205 determines whether the UE is in the connected at operation 1102 and whether it is time to scan for transmission at operation 1104.

If it is determined that the UE is in the connected mode at operation 1102, the control unit 205 becomes a Synchronization Relaying UE under the control of the eNB in one of the four methods as follows.

The first method is to use a Command-Report process 1110 in which the control unit 205 determines whether the UE has received a synchronization signal measurement command from the eNB at operation 1112, performs, when the synchronization signal measurement command is received, measurement at operation 1114, and reports the measurement result to the eNB at operation 1116 and starts synchronization signal transmission at operation 1160. The eNB controls the UE to operate as a relay UE based on the measurement result or other information.

The second method is to use a Request-Response process 1120 in which the UE requests the eNB for being a synchronization source (relay) UE at operation 1122 and receives a response message from the eNB in reply to the request at operation 1124. The UE may transmit the eNB an extra measurement result at operation 1126. If the response message include the information indicating to become a Synchronization Relaying UE, the UE becomes the Synchronization Relaying UE at operation 1128. In the case that the measurement result is transmitted to the eNB, the eNB transmits the UE a control signal to control the UE to operate as the Synchronization Relaying UE.

The third method is to use a BSR-Grant process 1130 in which the UE transmits a Buffer Status Report (BSR) to request for resource allocation for data transmission at operation 1132 and receives the resource grant from the eNB at operation 1134. The eNB may transmit the UE the information indicating acceptance/rejection of being a Synchronization Relaying UE along with the resource grant. The UE may further report the measurement result to the eNB at operation 1136. Depending on case, the eNB may request the UE for additional measurement. If the eNB allows the UE to operate as a Synchronization Relaying UE, the UE becomes a relay synchronization source (R-SS) at operation 1138.

The fourth method is to use Blind configuration process 1140 in which the eNB controls the UE to operation as a synchronization relaying UE without any information. However, if the UE becomes a synchronization relaying UE unconditionally, the UE performs synchronization signal transmission operation unnecessarily. Thus, if the UE operates under the control of the eNB at operation 1142, the UE measures the synchronization signals to acquire the received signal powers from the eNBs and other UEs and determines whether the UE has a discovery/control/data signal to be transmitted so as to become an R-SS or not based thereon at operation 1144.

The UE may measure the synchronization signals of the UEs served by the same eNB or the synchronization signals of the OOC UEs. If the synchronization signal of the UE served by the same eNB is lower in received signal power than the synchronization signal of the OOC UE, the UE may determine that there is no close synchronization source UE and transmit a synchronization signal. If the synchronization signal of an OOC UE is higher in received signal power than a predetermined value, it is necessary to transmit the timing of the eNB to mitigate interference caused by the discovery/control/data signal transmitted subsequently, and thus transmits the synchronization signal even though the IC UE has no discovery/control/data signal to transmit.

The UE in the idle mode determines the scanning period for transmission to determine whether the UE can become a synchronization source UE autonomously (this may be omitted if no scanning period is configured) at operation 1104. If the UE is in the scanning period, the UE measures the synchronization signals from the serving eNB and the neighboring synchronization source UEs at operation 1152. If a predetermined condition is fulfilled, the UE operates as a Synchronization Relaying UE at operation 1154. For example, the UE determines at least one of whether the received signal power from the eNB is less than X dBm, whether the received signal power of the synchronization signal from the neighboring Synchronization Relaying UE is less than Y dBm, whether received signal power from the I-SS among neighboring OOC UEs is greater than Z dBm, where there is any discovery/control/data signal to transmit, to become the Synchronization Relaying UE or not. If the synchronization signal of the UE served by the same eNB is higher in received signal power than a predetermined value, the UE determines that there is no close synchronization source UE and thus transmits the synchronization signal. If the synchronization signal of the I-SS UE among the OOC UEs is greater in received signal power than a predetermined value, it is necessary to transmit the timing of the eNB to mitigate interference caused by the discovery/control/data signal transmitted subsequently and thus the UE may transmit the synchronization signal even though the IC UE is the UE having no discovery/control/data signal to transmit.

Condition for Becoming Synchronization Relaying or Supporting UE in OOC

According to the procedure of being a Synchronization Relaying UE in IC or OOC, the UE becomes a Synchronization source UE when it is necessary to transmit the discovery signal, control signal for communication, and data signal. This is for synchronizing the transmission regions of the synchronization signal and control and data signals as far as possible. However, there may be a condition for becoming the synchronization source UE without transmission of discovery/control/data signal, with the exception of the synchronization signal to transmit the synchronization signal for delivery of the synchronization signal to the out-of-coverage UE or delivery of the synchronization signal to the non-synchronization source UE. Since the reception operation requiring no distinction between the UE with the discovery/control/data signal and UE without the discovery/control/data signal, it is advantageous in terms of the receiving UE. For explanation convenience, the UE which has the discovery/control/data signal and transmits the synchronization signal is referred to as synchronization reference UE (I-SS), and the UE which has no discovery/control/data signal but transmits the synchronization single if necessary is referred to as a synchronization relaying/supporting (R-SS/V-SS) UE. The conditions for being an I-SS at operation 928 of FIG. 9 and R-SS at operation 926 of FIG. 9 based on this categorization are described hereinafter.

a) Condition for becoming I-SS: If a discovery/control/data signal to be transmitted occurs, the UE may determine whether to transmit a synchronization signal based on at least one of a received power of the synchronization signal transmitted by a neighboring I-SS and priority value of the synchronization channel before the receiving UE transmits the synchronization signal at the time point preceding as much as a specific window in comparison to the start point of the resource region. For example, if the received signal power of the synchronization signal is greater than a predetermined value due to a close neighboring I-SS, the UE does not become a synchronization source UE. If the neighboring I-SS has a high priority (e.g., DFN) and it is required to follow the timing, the UE does not become a synchronization source UE (i.e., if the neighboring I-SS has a low priority value, the UE operates as a synchronization source UE. In addition, if the neighboring I-SS has a high priority and located close and thus the received signal power of the synchronization is high, the UE does not become a synchronization source UE (i.e., if the neighboring I-SS has a low priority or located far away and thus the received signal power of the synchronization signal is low, the UE operates as a synchronization source UE).

b) Condition for becoming R-SS/V-SS: If a plurality of I-SSs (including the I-SS it belongs to) are found in the scanning process, the UE may become a synchronization source UE, when it belongs to an I-SS in addition, if there is no other neighboring I-SS of which the priority is equal to or higher than that of the serving I-SS (i.e., there is only I-SSs of which priority is lower than that of the serving I-SS), even though the UE has no discovery/control/data signal to transmit.

Since it is not necessary to perform unnecessary reception operation requiring distinction between the synchronization reference UE with a discovery/control/data signal and the synchronization relaying/supporting UE without such signals, it is advantageous in terms of the receiving UE. The UE can distinguish between the synchronization reference UE and the synchronization relaying/supporting UE in various ways as follows.

a) The synchronization reference UE and synchronization relaying/supporting UE configure synchronization sequences or synchronization source UE IDs independently. For example, it is possible to allocate a specific sequence or a sequence set for the synchronization relaying/supporting UE. In addition, it is possible to allocate part of the synchronization source UE ID range for synchronization relaying/supporting UEs.

b) The synchronization reference UE and synchronization relaying/supporting UE are configured to use distinct synchronization resources. For example, the synchronization resource at the first position is used by the synchronization reference UE, and the synchronization resource at the second position is used by the synchronization relaying/supporting UE. For this distinction, it is necessary to notify of the synchronization resource index of the synchronization channel.

c) The synchronization reference UE and the synchronization relaying/supporting UE match with distinct D2D Frame Numbers (DFNs). For example, the synchronization reference UE is matched to DFN#0, DFN#4, DFN#8, and the like and the synchronization relaying/supporting UE is matched to DFN#2, DFN#6, DFN#10, and the like. Accordingly, if the modular 4 operation on the received NF results in 0, this means a synchronization reference UE, if the modular 4 operation on the received DNF results in 2, this means a synchronization relaying/supporting UE.

The receiving UE distinguishes between the synchronization reference UE and synchronization relaying/supporting UE based on at least one of methods a), b), and c) and, if the UE is not a synchronization reference UE, the UE regards only the synchronization signal from the synchronization reference UE as the synchronization source UE. If the UE is a synchronization reference UE, the UE regards all synchronization source UEs as reception target synchronization source UEs without distinction between the synchronization reference UE and synchronization relaying/supporting UE.

The distinction method is described hereinafter. For example, the synchronization reference UE uses one synchronization sequence selected among the sequences for OOC while the synchronization relaying/supporting UE may be distinguished from the synchronization reference UE in various methods. The first method is characterized in that the synchronization relaying/supporting UE may use a separate common synchronization sequence (or sequence set). The second method is characterized in that the synchronization relaying/supporting UE can transmit the information indicating that the UE uses the same sequence as the serving synchronization reference UE and is the synchronization relaying/supporting UE through the synchronization channel. The information indicating the synchronization supporting UE may be a synchronization source UE-role information indicating the type of the synchronization UE (1 bit), a synchronization resource index/position information (1~2 bits), or a D2D Frame Number (8~14 bits).

In the case of the information indicating the synchronization index/position, the role for the position of the synchronization resource should be predetermined. For example, the first position synchronization resource of one synchronization period may be used by the synchronization reference UE, and the second position synchronization resource may be used by the synchronization relaying/supporting UE. In the case of using the D2D Frame Number, the role (synchronization reference and relaying/supporting) should be predetermined in association with the D2D frame number. For example, the odd numbered D2D frame number may be used by the synchronization reference UE, even-numbered D2D frame number may be used by the synchronization relaying/supporting UE. By distinguishing between the synchronization reference UE and synchronization relaying/supporting UE, it is possible to expect various effects. For example, it is necessary to consider only the synchronization signal transmitted by neighboring synchronization reference UEs for controlling the reception timing. In addition, the synchronization reference UE may consider only the synchronization signal transmitted by the synchronization relaying/supporting UE to determine the transmission timing. For example, if two synchronization reference UEs enter the state of a specific received signal power range, the synchronization reference UE with low priority depends on the synchronization reference UE with high priority.

Although the operation of scanning synchronization signals transmitted by the neighboring synchronization reference UEs may be always performed to control the reception timing, the synchronization signal scanning operation may per perform periodically or may not be performed any more after determining and storing a predetermined number of reception timings. In the case of counting the number of reception timings, a synchronization source UE served by the eNB and relaying the eNB timing may be further included. The operation of scanning for the synchronization signals transmitted by the neighboring synchronization relaying/supporting UEs may be performed always or at an interval determined by the synchronization reference UE or at a predetermined interval. The UE may set the period of scanning for the synchronization signals transmitted by the neighboring reference UEs to a value greater than the period of scanning for the synchronization signal transmitted by neighboring synchronization relaying/supporting UEs, or such a relationship may be predetermined.

Procedure for Stopping Transmission of Synchronization Signal

Figure 12A:
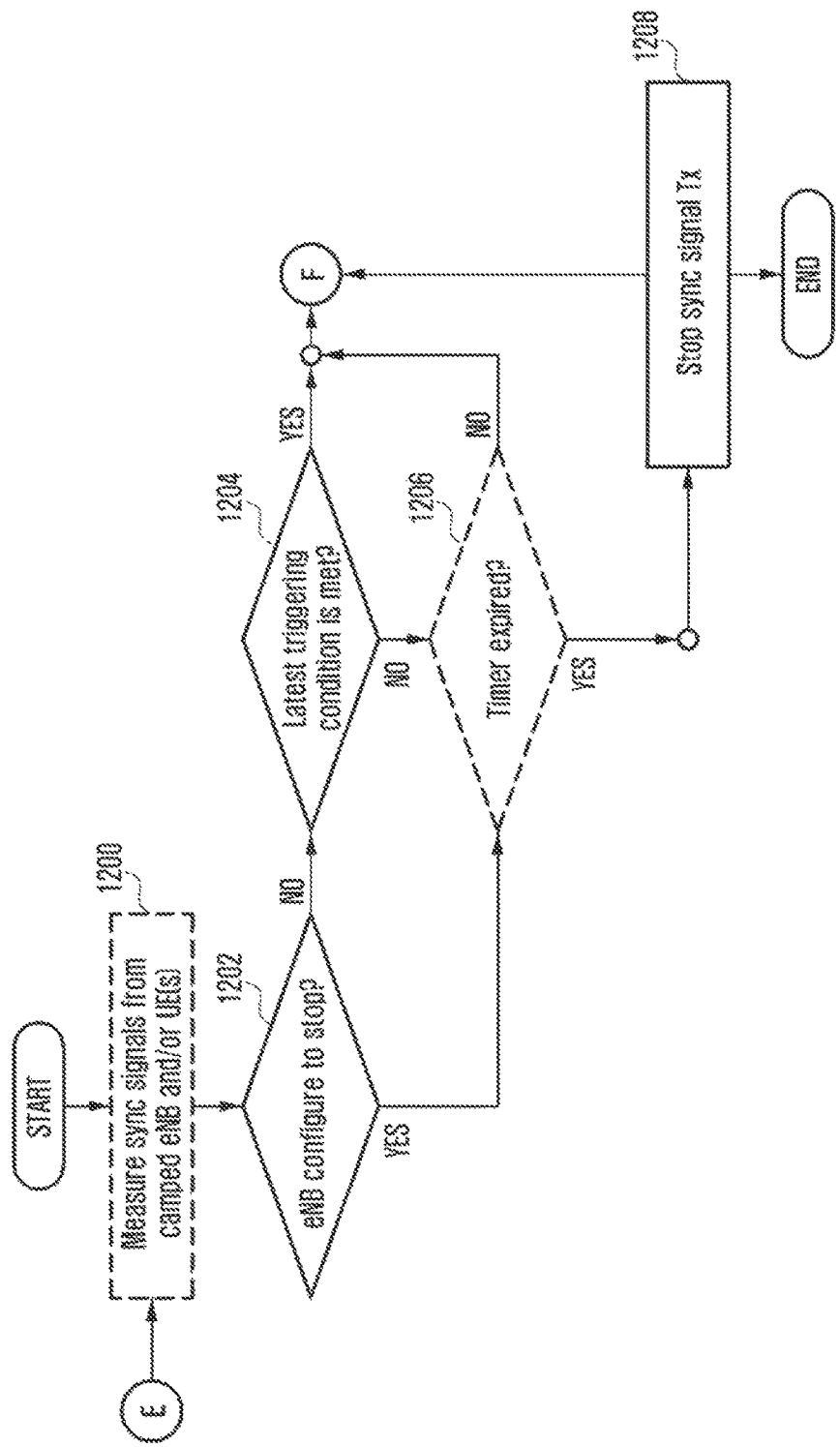
FIGS. 12A and 12B are flowcharts illustrating a UE procedure for stopping synchronization signal transmission according to an embodiment of the present disclosure.
Figure 12B:
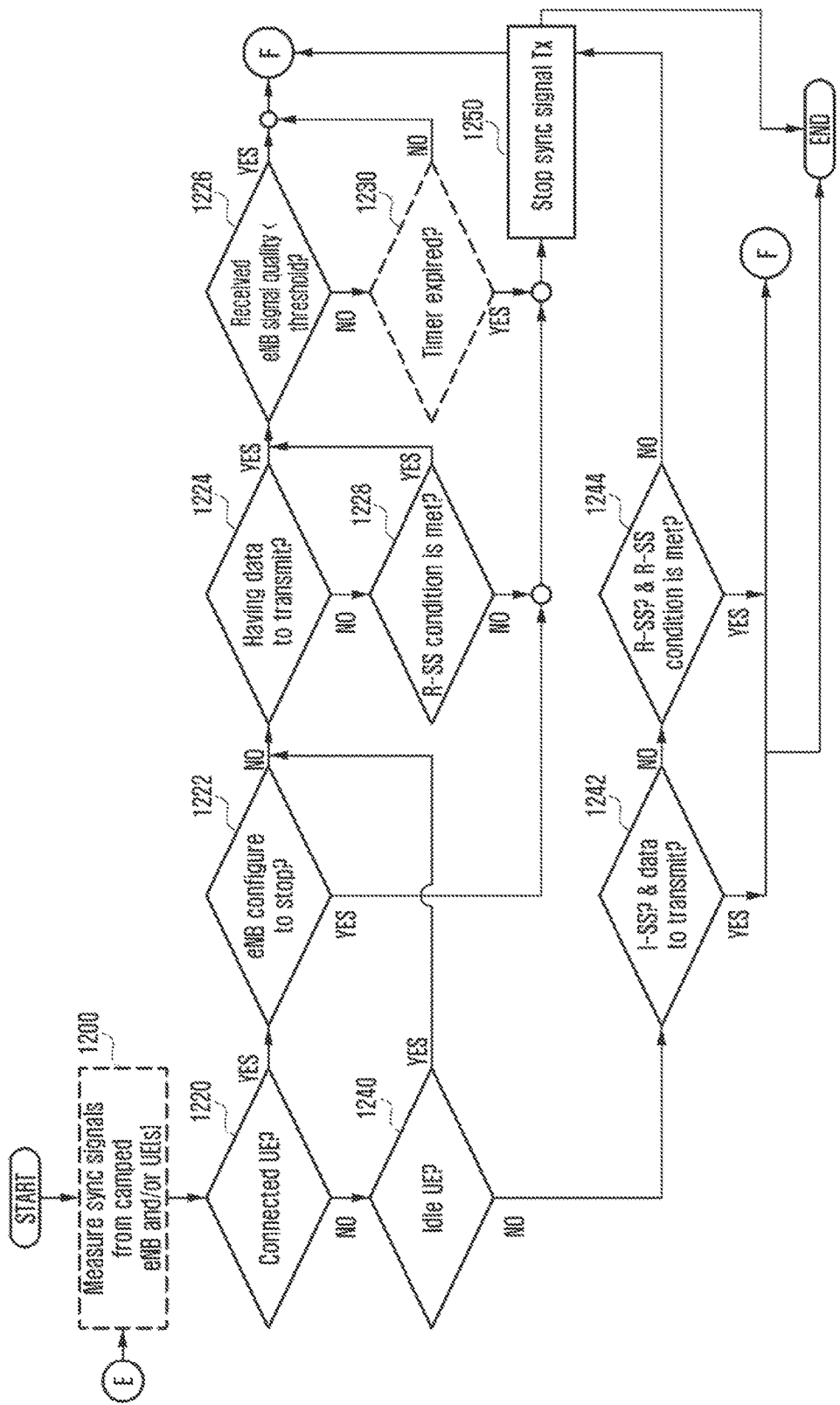

FIGS. 12A and 12B are flowcharts illustrating a UE procedure for stopping synchronization signal transmission according to an embodiment of the present disclosure.

Referring to FIG. 12A, if there is no synchronization signal measurement value logged previously, the synchronization source UE measures synchronization signals of the serving eNB and/or a neighboring UE at operation 1200. The synchronization source UE determines whether a synchronization signal transmission stop command is received from the eNB at operation 1202. If it is determined that a synchronization signal transmission stop command is received at operation 1202, the UE determines whether a timer has expired immediately at operation 1206 to give up the role as the synchronization source UE or not.

If it is determined that no synchronization signal transmission stop command is received at operation 1202 (e.g., an Idle mode UE), the synchronization source UE determines whether the latest condition triggered the UE to become the synchronization source UE successfully is maintained at operation 1204. If so, the UE continues transmitting the synchronization signal and, otherwise, stops transmitting the synchronization signal at operation 1208 immediately or when the condition of operation 1206 is fulfilled. Although the condition is not fulfilled any more, the UE may stop transmitting the synchronization signal under the control of the eNB or when the time duration in which the UE has operated as the synchronization source UE is greater than the timer value.

Unlike the procedure of FIG. 12A, if the latest condition to become the synchronization source UE is not used, it is possible to determine whether to operate as the synchronization source UE or not by determining the conditions in sequence as shown in the procedure of FIG. 12B.

Referring to FIG. 12B, if there is no synchronization signal measurement value logged previously, the synchronization source UE measures the synchronization signals from the serving eNB and/or a neighboring UE at operation 1200. The synchronization source UE determines whether the synchronization source UE is in the connected state with the eNB at operation 1220. If so, the synchronization source UE determines whether a synchronization signal transmission stop command is received from the eNB at operation

1222. If the synchronization signal transmission stop command is received, the UE stops transmitting the synchronization signal immediately at operation 1250. Otherwise, if no synchronization signal transmission stop command is not received from the eNB at operation 1222, the synchronization source UE determines whether it has data to be transmitted at operation 1224. If the synchronization source UE has the data to be transmitted at operation 1224, the UE compares the received signal quality from the eNB and a predetermined threshold value at operation 1226. If the received signal quality from the eNB is less than the predetermined threshold, the synchronization source UE stops transmitting the synchronization signal at operation 1250 immediately or based on the timer expiry determination result at operation 1230. Otherwise, if the receives signal quality from the eNB is equal to or greater than the predetermined threshold value, the synchronization source UE continues transmitting the synchronization signal.

If the synchronization source UE has no data to be transmitted at operation 1224, the synchronization source UE determines whether it fulfils a condition to become a synchronization relay UE (R-SS) at operation 1228. If the condition to become an R-SS is fulfilled, the procedure goes to operation 1226 and, otherwise, operation 1250 to stop transmitting the synchronization signal immediately.

If it is determined that the synchronization source UE operates in the idle state at operation 1240, the procedure goes to operation 1224 and, otherwise, determines whether the UE is an synchronization reference UE (I-SS) and has no data to be transmitted at operation 1242. If both the two conditions are fulfilled, the synchronization source UE continues transmitting the synchronization signal. Otherwise, if at least one of the two conditions is not fulfilled, the synchronization source UE determines whether it is an R-SS and the R-SS condition is fulfilled at operation 1244. If it is determined that the UE is an R-SS and fulfills the R-SS condition at operation 1244, the UE continue transmitting the synchronization signal and, otherwise, if at least one condition is not fulfilled, stops transmitting the synchronization signal at operation 1250.

Relationship Between eNB ID and UE Synchronization Signal

The receiving UE has to have the capability of determining the ID of the eNB serving the synchronization UE through the synchronization signal (including synchronization channel in a broad sense) of the synchronization UE. For this purpose, the eNB ID is transmitted as it is through the synchronization signal, or the UE synchronization signal ID or UE synchronization signal set ID which has a predetermined relationship with the eNB ID is transmitted. If the UE which has receive this synchronization signal can determine the ID of the eNB which serves the UE transmitted the synchronization signal or on which the UE has camped on. In an embodiment of the present disclosure, it is possible to transmit the ID of the set of eNBs on the synchronization signal transmitted by the UE.

D2D Frame Number Priority

Figure 13A:
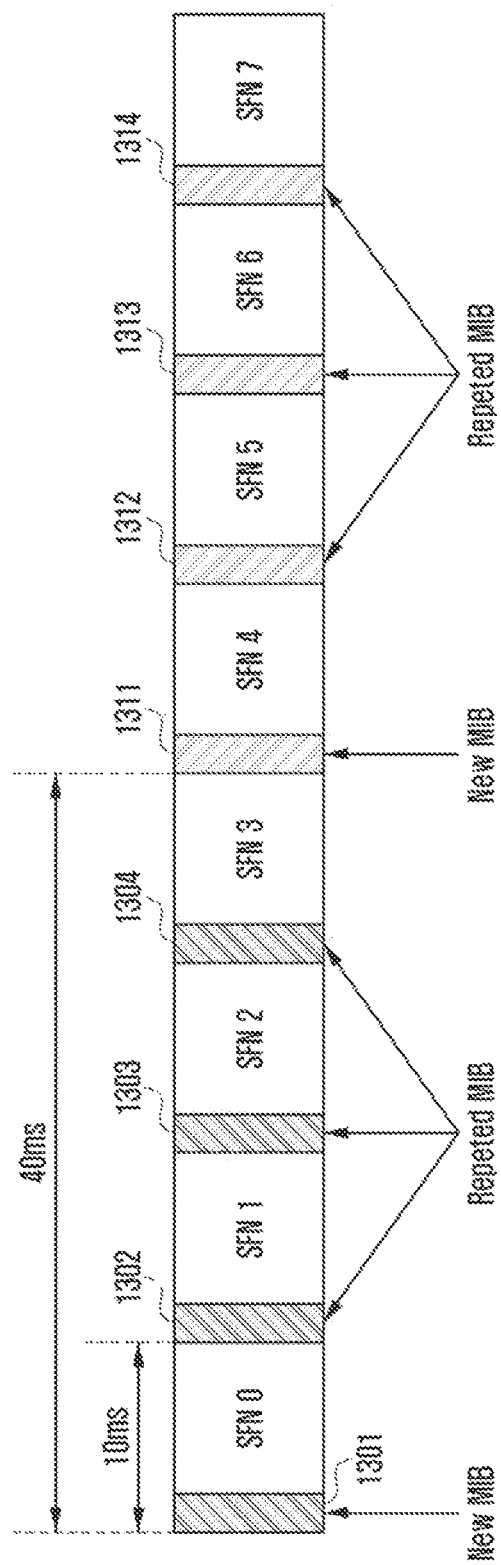

The D2D Frame Number is assigned in the synchronization procedure for communication, because it is necessary to know the frames in which the respective devices mapped when necessary to define the operation procedures at respective subframes differently although the frame boundary synchronization has been completed based on the received synchronization signal. Accordingly, a communication system is designed such that the frames are allocated (system or) frame numbers or indices for distinction therebetween. For example, in the LTE system, the SFN is notified to the device through master information blocks (MIBs) 1301, 1302, 1303, 1311, 1312, and 1313 transmitted through the BCH as shown in the example of FIG. 13A. The SFN may be interchangeably referred to as Radio Frame Number.

FIGS. 13A, 13B, 13C, and 13D illustrate transmissions of frame numbers and master information block (MIB) or synchronization resource in an LTE system according to an embodiment of the present disclosure.

Referring to FIGS. 13A, 13B, 13C, and 13D, examples of a frame structure of the LTE system in which MIBs 1301, 1302, 1303, 1311, 1312, and 1313 are transmitted at the first subframe (SFN0) 505 of a frame, e.g., 4 identical MIBs are transmitted over the period 503 of 10 ms, are illustrated. In the LTE system, the SFN is 10-bit information which can express the system frame numbers 0 to 1023. The BCH is masked with 2-bit check CRC and thus, if the BCH is received, it is possible to determine the 20 bit information. The MIB transmitted through BCH includes partial SFN information of 8 bits. By combining the 2-bit information received through BCH and the 8-bit partial SFN information of the MIB, it is possible to obtaining the original 10-bit SNF. Since one frame spans 10 ms, the SFN can indicate the time of up to 10 seconds. For example, assuming that the broadcast period for D2D discovery needs to appear every 10 seconds, the eNB can notify of the information by transmitting the SIB over the BCH as the control broadcast channel using SFN0 indicating D2D broadcast frame.

FIGS. 13A, 13B, 13C, and 13D illustrate a frame structure of the LTE system in which the MIBs 1301, 1302, 1303, 1311, 1312, and 1313 are transmitted at the first subframe (SFN0) of a frame, e.g., 4 identical MIBs are transmitted over the period 503 of 10 ms. In the LTE system, the SFN is 10-bit information which can express the system frame numbers 0 to 1023. The BCH is masked with 2-bit check CRC and thus, if the BCH is received, it is possible to determine the 20 bit information. The MIB transmitted through BCH includes partial SFN information of 8 bits. By combining the 2-bit information received through BCH and the 8-bit partial SFN information of the MIB, it is possible to obtaining the original 10-bit SNF. Since one frame spans 10 ms, the SFN can indicate the time of up to 10 seconds. For example, assuming that the broadcast period for D2D discovery needs to appear every 10 seconds, the eNB can notify of the information by transmitting the SIB over the BCH as the control broadcast channel using SFN0 indicating D2D broadcast frame.

The D2D Frame Number is the Frame Number used in the D2D communication and corresponds to the System Frame Number of the eNB. In the case that the D2D synchronization resource is allocated at every 10 ms as shown in FIG. 29, it is possible for one synchronization source UE to transmit a signal at every 10 ms like as the eNB transmits BCH. However, since the transmission distance of one synchronization source UE is short in comparison to that of the eNB, it is not preferred for a synchronization source UE to use every synchronization resource by taking notice of the synchronization relay or distributed synchronization scheme.

Figure 13C:
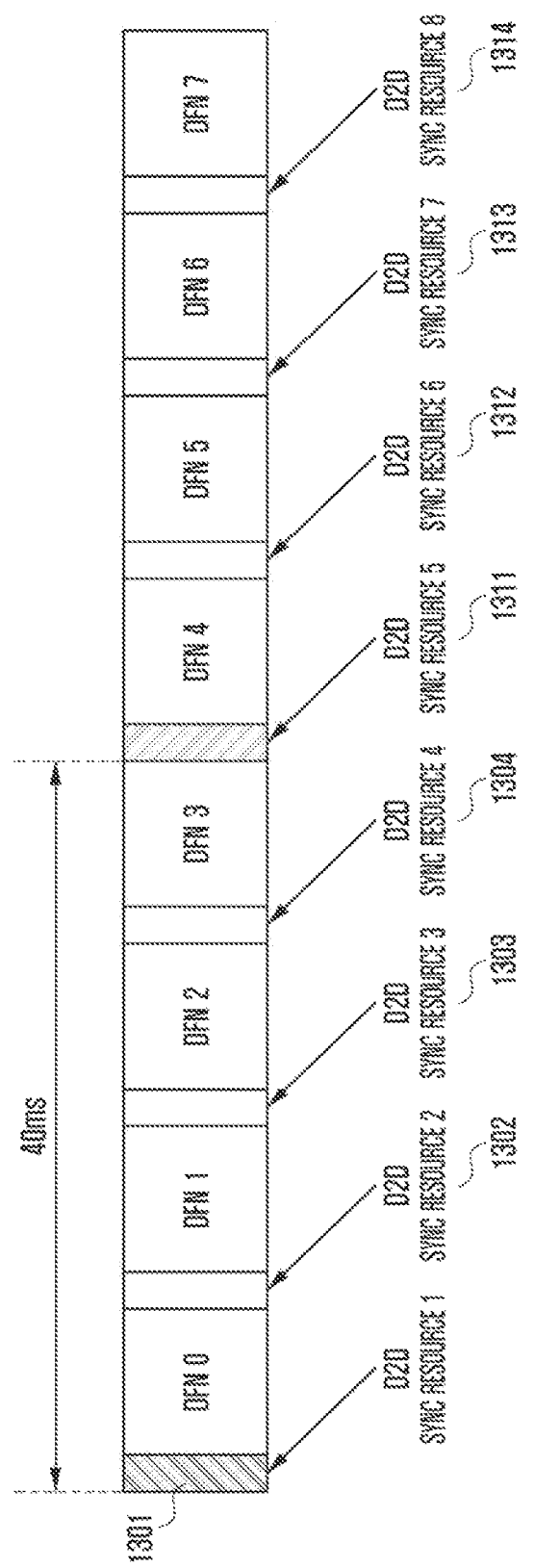

Accordingly, it is preferred to increase the synchronization period from 10 ms to 40 ms and use the remaining synchronization resources 1302, 1303, 1304, 1312, 1313, and 1314 as shown in FIG. 13C in view of D2D Discovery and Communication operations and application diversity. For example, it may be possible to configure such that the D2D synchronization signal is transmitted only at the first frames 1301 and 1311 of the respective synchronization periods of 40 ms.

Since the UE is mobile unlike the eNB, plural UE may transmit the synchronization signal in a certain area. At this time, if there is only one synchronization resource, the signals transmitted by the synchronization source UEs interfere to each other, and when the synchronization source UEs attempt receiving the synchronization signals, they cannot receive any signal in the state of transmitting signals on the same resource due to the half-duplex problem. Accordingly, it is advantageous for the neighboring synchronization source UEs to use the resources split in time in view of performance.

Figure 13D:
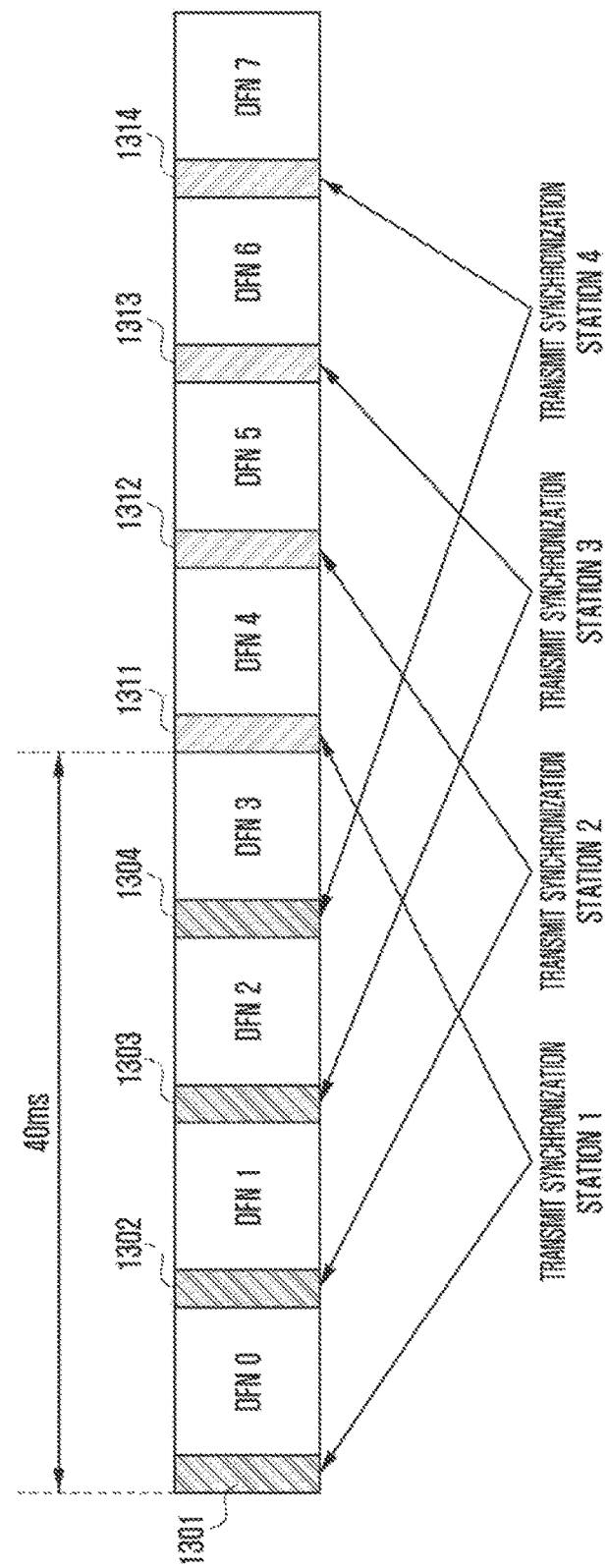

As shown in FIG. 13D, it is possible to configure such that 4 synchronization source UEs transmit the synchronization signals with different offsets from the reference timing (DFN0). As shown in FIG. 13D, the synchronization source UE1 transmits the synchronization signal in the first synchronization resources 1301 and 1311 of the reference timing (DFN0), the synchronization source UE2 transmits the synchronization signal in the second synchronization resources 1302 and 1312 of the reference timing (DFN0), the synchronization source UE3 transmits the synchronization signal in the third synchronization resources 1303 and 1313 of the reference timing (DFN0), and the synchronization source UE4 transmits the synchronization signal in the fourth synchronization resources 1304 and 1314 of the reference timing (DFN0).

The synchronization source UEs may be the synchronization relaying UEs located in 1-hop, 2-hop, 3-hop, and 4-hop distance from the eNB (0 hop) respectively according to the number of relaying hops. In another example, each synchronization source UE may determine whether there is available synchronization resource and selects the available synchronization resource to transmit the synchronization signal. In another example, the synchronization source UE 1 is an IC UE while the synchronization source UEs 2, 3, and 4 are OOC UEs. In another example, the synchronization source UEs 1 and 2 are in-coverage UEs while the synchronization source UEs 3 and 4 are out-of-coverage UEs. In an embodiment of the present disclosure, the synchronization source UE 1 is a synchronization reference source as a Cluster Head while the synchronization source UEs 2, 3, and 4 are Volunteering Synchronization Sources assisting synchronization between cluster heads.

According to the allocation methods assumed in the respective examples, the DFN may provide the role of the synchronization source UE. In the case of selecting the synchronization resource according to the number of hops, modular 4 operation is performed on the DFN received through the synchronization channel and, if DFN|mod 4 is 0, this means that the signal is transmitted by a 1-hop synchronization source UE. In the same way, if DFN|mod 4 is 3, the means that the resource is used by a 3-hop synchronization source UE. In another example, if DFN|mod 4 is 0, this means that the synchronization signal is transmitted by an in-coverage UE, and if DFN|mod 4 is 2, this means the signal is transmitted on the second resource of the resources for out-of-coverage UEs. In another example, if DFN|mod 4 is 1, this means that the signal is transmitted on the second resource of the resources for in-coverage UEs, and if DFN|mod 4 is 2, this means that the signal is transmitted on the first resource of the resources for out-of-coverage UEs. In another example, if DFN|mod 4 is 0, this means that the synchronization signal is transmitted by a cluster head, and if DFN|mod 4 is 2, this means that the signal is transmitted on the second resource of the resources for synchronization supporting UEs. Although the descriptions are directed to the case where modular 4 operation is performed for four resources, other modular operations can be applied depending on the number of synchronization resources. In the case that synchronization resource is not allocated periodically, other types of operations can be applied.

FIG. 14 is a diagram illustrating D2D frame number determination operations in an In-coverage and Out-of-coverage network scenarios according to an embodiment of the present disclosure.

Referring to FIG. 14, an eNB1 1401 has its coverage area 1400, and an eNB2 1411 has its coverage area 1410. A UE1 1431 is located in the overlapping area of the coverage area 1400 of the eNB1 1401 and the coverage area 1410 of the eNB2 1411. There are a plurality of synchronization source UEs, i.e., a synchronization source UE1 (SSUE1) 1441 located in the coverage area 1400 of the eNB1 1401, a synchronization source UE2 (SSUE2) 1442 located in the coverage area 1410 of the eNB2 1411, a synchronization source UE3 (SSUE3) 1443 which generates and transmits the synchronization signal autonomously, and a synchronization source UE4 (SSUE4) 1444 which receives absolute time from a satellite and transmits the synchronization signal based thereon. In addition, there are the UEs having no serving UE, i.e., a UE2 1432, a UE3 1433, and a UE4 1434.

In FIG. 14, UE1 1431 receives the eNB synchronization signal (PSS/SSS) and eNB BCH form the eNB 1 1401 and eNB2 1411 and the UE synchronization signal (D2DDSS) and UE broadcast channel (D2DBCH) (or UE synchronization channel ((PD2DSCH)) from the synchronization source UE 2 (SSUE2) 1442. Typically, since the priority of the eNB synchronization signal is higher than that of the UE synchronization signal, the D2DSS and D2DBCH from the SSUE2 1442 are ignored. The UE1 1431 selects an eNB based on the received signal powers of the PSS/SSS from the eNB 1 1401 and eNB 2 1411. In a certain environment, if the UE1 served by the eNB 2 1411 fails receiving PSS/SS and receives the D2DSS from the synchronization source UE2 1442, it may abide by the UE synchronization signal from the synchronization source UE2 1442 other than any eNB signal exceptionally.

In FIG. 14, the UE3 1433 receives the UE synchronization signal and UE broadcast channel from the synchronization source UE 1 1441 and UE 2 1442. Ruling out the exceptional condition, UE3 1433 selects one of the plural UE synchronization signals according to a priority rule for UE synchronization signals and receives the UE broadcast channel at the position determined by the selected UE synchronization signal. If the UE broadcast channel is received successfully, the UE acquires the DFN and abides by it. In the above example, in the case that the information on the eNB being synchronized with the absolute time (e.g., a GPS time) is notified, if there is an eNB using the absolute time after the receipt of the UE broadcast channel along with the UE synchronization signal, the UE abides by the reference signal of the corresponding eNB and, otherwise, if there is not eNB using the absolute time, the eNB abides by reference time of the selected UE synchronization signal according to the priority rule and the DFN of the UE broadcast channel.

In FIG. 14, the UE2 1432 receives the UE synchronization signal and UE broadcast channel from the in-coverage synchronization source UE1 1441 and out-of-coverage synchronization source UE3 1443. The synchronization signal or synchronization channel should include the information indicating whether the UE is an in-coverage UE or out-of-coverage UE in order for the UE to discern. The UE3 1433 selects the in-coverage synchronization source UE with priority in comparison to the out-of-coverage synchronization source UE. If there are multiple in-coverage synchronization source UEs, the UE operates in the same way as the UE2 1442 selecting the in-coverage synchronization source UE. In FIG. 14, the UE4 1434 is similar to the UE3 1433, but the out-of-coverage synchronization source UE has the absolute time. Basically, 2 rules may be applied.

1) The absolute time has the highest priority.
2) The eNB has the highest priority.

However, the two rules may have problems respectively. If the absolute time has the highest priority, the UE4 has to abide by the absolute time always. However, the signal transmitted by the UE4 which is not synchronized with the eNB may cause interference to the in-coverage UEs. Meanwhile, if the eNB has the highest priority, the UE4 has to abide by the reference time of the synchronized source UE2 always. If so, the UE4 may receive interference from the UE abiding by the absolute time and cause interference to the UE abiding by the absolute time. Although the eNB may transmit additional priority rule information to use these two rules freely, the eNB is also possible to use the information on whether to use the absolute time to indicate the two rules for use of the legacy signal.

For example, if the eNB uses the absolute time, it may be possible to configure to use the absolute time with priority. Otherwise, if the eNB does not use the absolute time, it may be possible to configure to use the eNB with priority. For example, when the synchronization signal and synchronization channel are received from the out-of-coverage UE and the in-coverage UE having the absolute time, the UE determines the synchronization source UE of which the transmission time reference is to be used based on the information on whether to use the absolute time received when the UE has connected to/camped on the eNB. If the value indicating whether to use the absolute time is not received or expired, the UE operates according to a predetermined determination rule.

Figure 15:
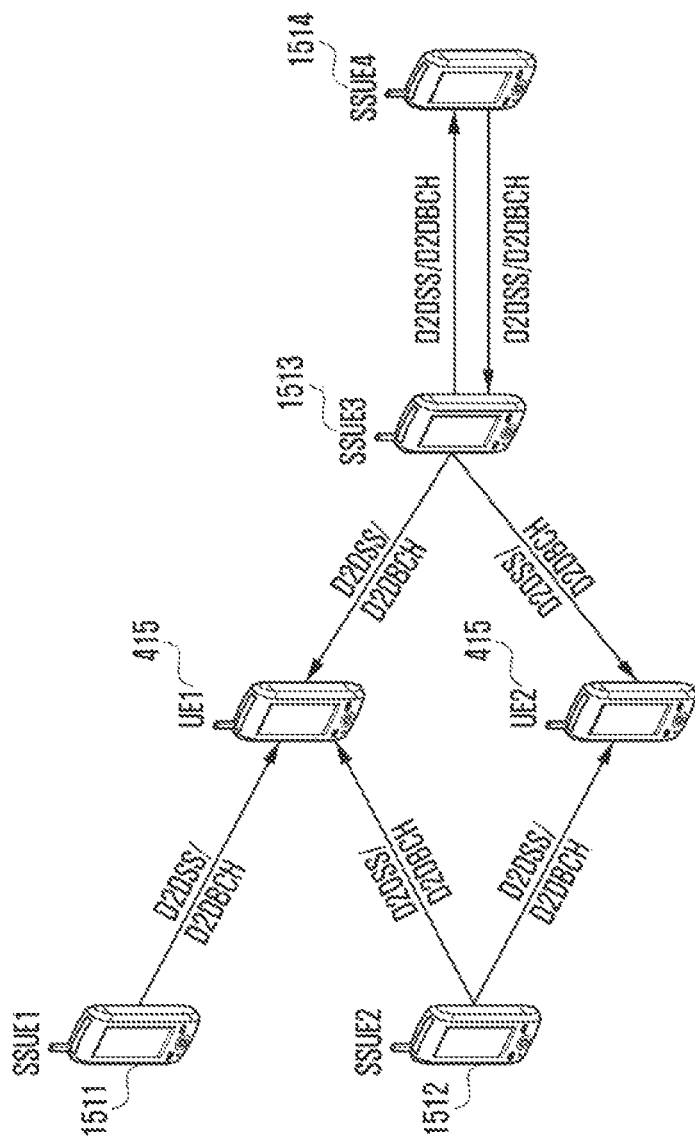
FIG. 15 illustrates a D2D frame number determination in an OOC scenario according to an embodiment of the present disclosure.

FIG. 15 illustrates a D2D frame number determination in an OOC scenario according to an embodiment of the present disclosure.

Referring to FIG. 15, a UE1 1501 receives the synchronization signals and synchronization channels from out-of-coverage synchronization source UEs 1, 2, and 3 1511, 1512, and 1513. Unlike the scenario in which an in-coverage synchronization source UE exists, the priority of the in-coverage synchronization source UE is ruled out in this scenario. Accordingly, the synchronization source UE having the absolute time has the highest priority. The UE1 1501 abides by the reference time and DFN from the synchronization source UE1 1511 having the absolute time. Meanwhile, the UE2 1502 which has receive the UE synchronization signal and UE broadcast channel from the synchronization source UE 2 1512 and synchronization source UE 3 1513 can select one of the two synchronization source UEs by comparing various parameter values. For example, the UE2 1502 may compare the synchronization source UE IDs, valid time, age, and numbers of hops of the synchronization source UEs for selection. Since the exemplified parameters require additional information, the simplest parameter is the DFN value used by the UE currently. For example, it is possible to select a synchronization source UE by comparing the D2D Frame Numbers. Since the UE uses the DFN values already for determining the position of the resource region, the synchronization source UE transmits this DFN through the UE broadcast channel. In FIG. 15, if the UEs exchange the synchronization signal and synchronization channel to each other like the synchronization source UE 3 1513 and synchronization source UE 4 1514, the UE determines the priorities of the synchronization source UEs which have transmitted the DFN by comparing the received DFN and the retained DFN. If the DFN values are used by the synchronization UEs (including the current UE), there is no need of changing the synchronization source UE.

From the embodiments of FIGS. 14 and 15, the operation may be configured for two different cases: One case considering the absolute time in the system and the other case considering no absolute time. In the case of considering the absolute time in the system, the absolute time use information should be transmitted through the eNB BCH or the UE broadcast channel (D2DBCH or PD2DSCH). Under this assumption, the UE can determine to use the absolute time after receiving the plurality eNB/UE synchronization signals and eNB/UE broadcast channels.

FIG. 16 is a flowchart illustrating a procedure of aligning and selecting synchronization information based on an absolute time according to an embodiment of the present disclosure.

Referring to FIG. 16, the UE starts scanning at operation 1600 and scans for synchronization signals at operation 1602. Here, starting scanning is the operation of turning on the radio communication unit 201 and modem 203 to receive synchronization signal, and the control unit 205 controls the radio communication unit 201 and the modem 203 to receive the broadcast channel for the at least one detected synchronization signal. The UE scans for synchronization signals at operation 1602 and determines whether any synchronization signal is detected at operation 1604. If any synchronization signal is detected, the procedure goes to operation 1606 and, otherwise, operation 1620 at which the UE determines whether it is necessary to reattempt scanning. If it is necessary to reattempt scanning, the procedure goes to operation 1602 and, otherwise, operation 1612.

If the procedure goes from operation 1604 to operation 1606, the UE attempts receiving a broadcast channel and determines whether a broadcast channel is received successfully at operation 1608. If the UE fails to receive a broadcast channel at operation 1608, the procedure goes to operation 1620 and, the UE succeeds in receiving the broadcast channel, the UE receives the synchronization signal and broadcast channel and stores the information acquired therefrom at operation 1610. Afterward, the UE stops scanning for synchronization signals at operation 1612 and aligns the acquired synchronization signal and broadcast channel information at operation 1614. The information alignment is made in the order of the information on whether absolute time is used, information on whether eNB reference time is used, DFN value, (number of relay hops), and received signal power strength. If the alignment is completed, the UE makes the final determination to use the reference time and DFN of the highest priority synchronization source UE at operation 1616.

FIG. 17 is a flowchart illustrating a procedure of aligning and selecting synchronization information without consideration of an absolute time according to an embodiment of the present disclosure.

Referring to FIG. 17, the UE starts scanning at operation 1700 and scans for synchronization signals at operation 1702. Here, starting scanning is the operation of turning on the radio communication unit 201 and modem 203 to receive synchronization signal, and the control unit 205 controls the radio communication unit 201 and the modem 203 to receive the broadcast channel for the at least one detected synchronization signal. The UE scans for synchronization signals at operation 1702 and determines whether any synchronization signal is detected at operation 1704. If any synchronization signal is detected, the procedure goes to operation 1706 and, otherwise, operation 1730 at which the UE determines whether it is necessary to reattempt scanning. If it is necessary to reattempt scanning, the procedure goes to operation 1702 and, otherwise, operation 1708.

If the procedure goes from operation 1704 to operation 1706, the UE stores the synchronization information and stops scanning for synchronization signals at operation 1708. Afterward, the UE aligns the synchronization signal information at operation 1710. The information alignment is made in the order of the information on whether absolute time is used, (number of relay hops), and received signal power strength. The UE selects the highest synchronization source UE at operation 1712 and determines whether the highest synchronization source UE uses the eNB reference time at operation 1714. If it is determined that the UE does not use the eNB reference time at operation 1714, the procedure goes to operation 1718 and, otherwise to operation 1716 at which the UE makes the final determination to operate as the highest synchronization source UE.

At operation 1718, the UE attempts receiving broadcast channel for all detected synchronization signals or some with high priorities among the detected synchronization signals. The UE stores the information on the successfully received broadcast channel at operation 1720, and stops receiving broadcast channels at operation 1722 when the scanning period ends. The UE aligns the received synchronization signals and broadcast channel information at operation 1724. The information alignment is made in the order of DFN, (number of relay hops), and received signal power strength. If the alignment is completed, the UE makes the final determination to use the reference time and DFN of the highest priority synchronization source UE at operation 1726.

Transmission Period and Resource Selection Control Method for Type1 Discovery

The basic procedure for D2D discovery operation is as follows. The UE determines the discovery resource region configured by the eNB and the discovery mode at the discovery resource region. Type1 discovery mode is characterized in that the UE selects resource autonomously, and Type2 discovery mode is characterized in that the UE requests the eNB for resource selection. The description will be restricted to the case where the resource region corresponding to the Type1 discovery mode. The discovery resource region is allocated at every 10 seconds periodically. It is assumed that one UE can selection one discovery resource block in one period.

The UE selects n arbitrary resources in N discovery resource blocks within the discovery region to perform detecting thereon, determines, if there is no resource block of which the energy level is equal to or greater than X dBm, this as the congestion situation, and increases the discovery signal transmission period in the current resource block (or decreases transmission probability). If there is any resource block of which the energy level is equal to or greater than X dBm, the UE determines this as idle resource, selects one of idle resource blocks to transmit signal, and decreases the discovery signal transmission period (or increase transmission probability). The threshold value X dBm for determining the reception energy amount can be controlled by the eNB and, if the X dBm is very large value (infinite), this means that an arbitrary resource block is selected among all resource blocks and thus identical with the arbitrary resource selection method. The discovery signal transmission period may increase from the initial minimum period value to the maximum period value. The minimum period value is equal to the period of the discovery resource region (e.g., 10 seconds). The minimum period value may not be the period of the real discovery resource region but increases logically in the order of 1, 2, 3, 4 . . . up to the greatest multiple (e.g., 10). In the case of adjusting the transmission rate based on the transmission probability, if the probability is low, this may causes excess of the maximum period value, transmission may be performed immediately regardless of the transmission probability in the situation of transmission failure till the maximum period to avoid it. If it may be possible that there are plural UEs which failed transmission till the maximum period, it is configured that, in another example, the transmission probability increases to a ($p<a<1$) when it reaches X % of the maximum period and to b ($p<a<b<1$) when it reaches Y % of the maximum period. In an example, if the UE fails transmission till the maximum period, it may request the eNB to adjust the transmission probability. The UE may transmit the discovery signal more frequently based on the transmission probability increased according to the transmission probability readjustment of the eNB. Although the above example is directed to the discovery signal, the method can be applied to the communication control region or data transmission/reception region. In this case, the maximum period may be the maximum latency constraint of the corresponding traffic.

There can be various examples of the determination condition for the above operation.

1) Case where there is any resource block with energy equal to or less than X dBm 2) Case where there is any resource block with energy equal to or less than X dBm except for subframes having resource blocks with energy equal to or less than Y dBm 3) Case where there resource blocks with reception power lower than minimum reception power+alpha×(maximum reception power−minimum reception power) is below A %

It may be appreciated that the above described UE operations are performed under the control of the control unit 205. Although the control unit 205, radio communication unit 201, and modem 203 are configured as independent components in the above description, it is obvious to those skilled in the art that the corresponding components can be integrated into a component e.g., a signal chip.

The above described operations of the eNB or UE can be realized with a memory device storing the corresponding program codes at a part of the eNB or UE. For example, the controller of the eNB or the UE can execute the above described operations in such a way of reading out the program codes stored in the memory device by means of a processor or central processing unit (CPU).

The various components and modules constituting the entities, eNBs, and UEs as described in the specification can operate with the hardware circuit, such as complementary metal oxide semiconductor-based logical circuit, firmware, software and/or combination of hardware and firmware and/or software stored in a machine-readable medium. For example, the various electrical structure and methods can be implemented with the electric circuits, such as transistors, logic gates, Application Specific Integrated Circuit, and the like.

[2] D2D Discovery and Communication Operations

The second embodiment of the present disclosure is directed to the D2D Discovery and Communication operations.

Synchronization Resource Structure

The synchronization resource may include synchronization resource units (SRUs) capable of carrying the synchronization signal and channel. An SRU is a set of resources for synchronization signal (D2DSS) and synchronization channel (PD2DSCH) transmitted by a synchronized UE. The length of a synchronization resource unit may be equal to that of an LTE subframe (1 ms). In order to transmit the synchronization signal or the synchronization channel, at least one physical symbol unit is required. Since the synchronization channel is a message, it is possible to insert a pilot pattern for use by the receiver in assessing the physical channel quality into the synchronization channel resource.

In 3GPP, DMRS is used for data demodulation, and existing DMRS patterns or modified versions thereof may be used. Sequence patterns, symbol-level shifted versions of base sequences or scrambled versions of base sequences may be used as DMRS patterns. Based on a situation where multiple synchronization sources transmit the same message, UEs at the same logical location may use the same DMRS pattern. For example, a synchronization source at n hops away from the eNB may use a DMRS pattern corresponding to n hops. In this case, there is no need to transmit information on the number of hops via a synchronization signal or synchronization channel. In an embodiment of the present disclosure, in addition to the information on the DMRS pattern corresponding to the hop count, information regarding UE support of an absolute reference timing device, such as a GPS receiver, use of time division duplex/frequency division duplex (TDD/FDD), required transmission distance level, power level, the number of retransmissions and battery level may be delivered.

Figure 18:
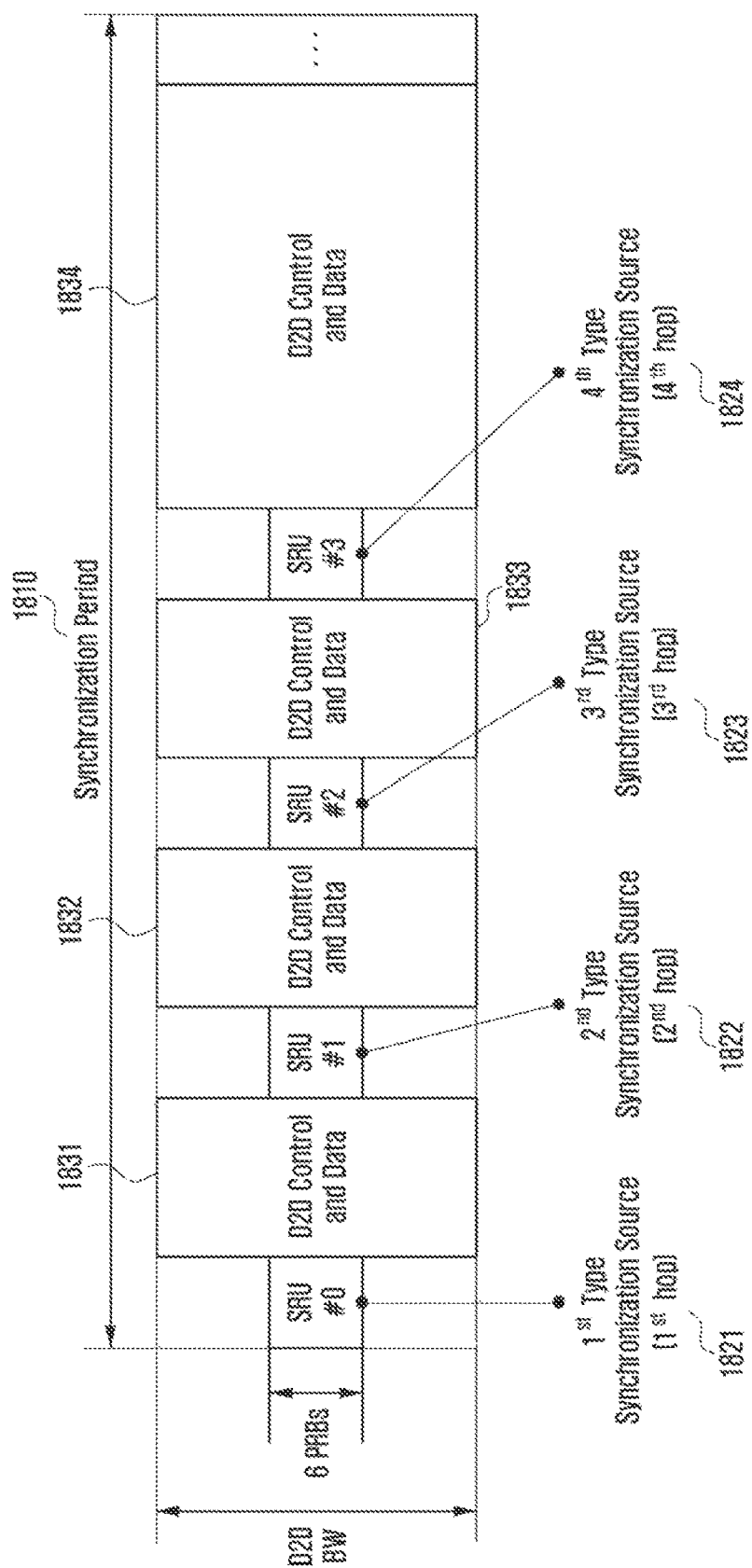
FIG. 18 is a diagram illustrating a synchronization resource structure according to an embodiment of the present disclosure.

FIG. 18 is a diagram illustrating a synchronization resource structure according to an embodiment of the present disclosure.

Referring to FIG. 18, synchronization resources 1821, 1822, 1823, and 1824 are distributed in a synchronization period 1810 without overlapping D2D control and data resources 1831, 1832, 1833, and 1834. As shown in FIG. 18, a plurality of SRUs 1821, 1822, 1823, and 1824 are configured in the Synchronization Period 1810. The SRUs are linked to different types of synchronization source UEs, and the positions of the SRUs may be determined according to the number of relaying hops.

The synchronization signal is transmitted at every SRU, but the synchronization channel may be transmitted according to specific conditions. The conditions for not transmitting the synchronization channel are described as follows.

a) when the synchronization channel period is set to a value longer than the synchronization signal period, b) when the specific resource region designated by the eNB is overlaps the SRU position, (e.g., it is configured to use only the synchronization signal (D2DSS) in the discovery resource region which is not controlled by the eNB), c) when the synchronization channel reception performance drops due to the too many participant UEs as a result of synchronization channel monitoring, the UE may change the synchronization channel period and offset immediately according to the monitoring result or report the monitoring result to the eNB to change the synchronization period and offset according to the determination of the eNB. Or, the UE may change the transmission probability of the synchronization channel immediately according to the monitoring result or report the monitoring result to the eNB to change the transmission probability of the synchronization channel according to the determination of the eNB.

FIGS. 19A, 19B, 19C, and 19D illustrate a resource pool structure with synchronization resources for D2D Discovery and D2D Communication according to an embodiment of the present disclosure.

Referring to FIGS. 19A, 19B, 19C, and 19D, the resource structures in which the synchronization resources are arranged and other resources may be added. For example, in the case of the UE operating in TDD (Time Division Duplex), the D2D resource region is configured in uplink and thus the downlink resource may be positioned in time domain. In view of the D2D UE, however, the resource is configured logically as if consecutive D2D resources exist.

Figure 19A:
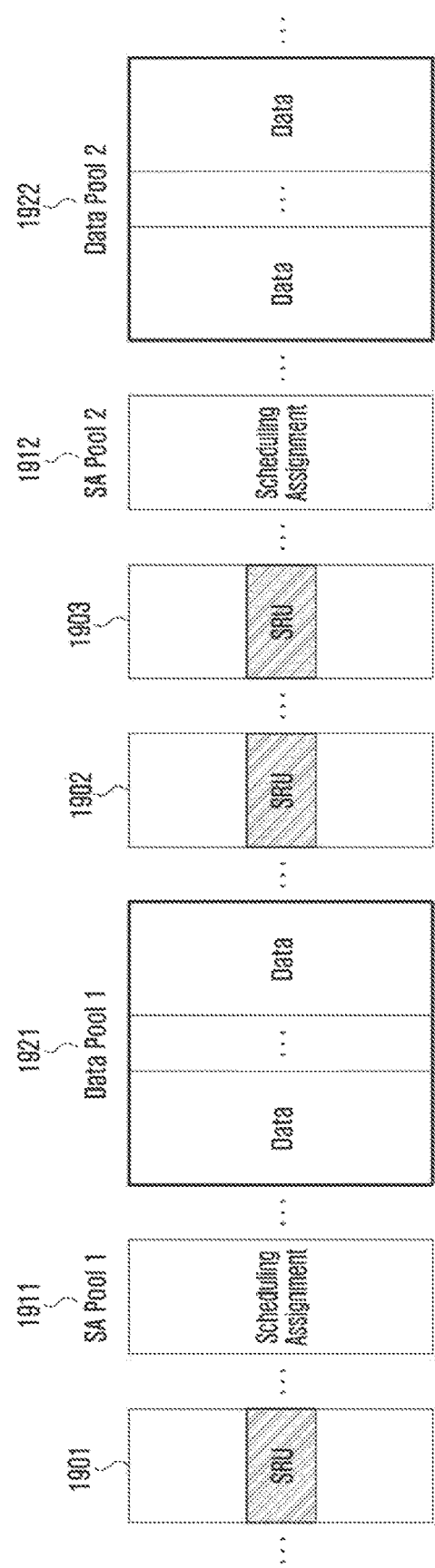
FIGS. 19A, 19B, 19C, and 19D illustrate a resource pool structure with synchronization resources for D2D Discovery and D2D Communication according to an embodiment of the present disclosure.

FIG. 19A shows the resource region, i.e., the structure of the Scheduling Assignment (S) region (Pool) (1911, 1912) and Communication Data resource region (Data Pool) (1921, 1922), and the structure of the synchronization resources (1901, 1902, 1903) for notifying the reference timing for the resource region which is notified from the eNB for performing D2D communication. In the SA region, the UE transmits the neighboring UE the SA signal including the information on the data resource allocated or selected in the SA region in advance before data transmission. The UE which has received the SA signal in the SA region receives the data signal transmitted from the intended transmission UE in the subsequent data region. The IC UE determines the absolute time of the reference frame (SFN0) by receiving the BCH and acquires the relative position information to the resource region expressed based on the reference frame by receiving the SIB. The UE served by a neighboring eNB or located in the partial-network coverage area or in-network coverage area receives the synchronization signal and synchronization channel transmitted in the SRU to determine the absolute time of the reference frame (SFN0) first and acquires the relative position information to the resource region indicated based on the reference frame.

The D2D UE may select one synchronization UE according to predetermined priority to synchronize the reference timing for transmission. If there is other synchronization UE with the reference timing different from that of the selected synchronization UE, the transmission reference timing of the selected synchronization UE is used to synchronize the reference timing for receiving the synchronization signal from the other synchronization UE during a predetermined time period. At least one synchronization resource, i.e., an SRU, may be arranged during one synchronization signal period and, if the reference timing for transmission is synchronized, it may operate so as not to transmit the synchronization signal if there is no idle SRU, when inspecting the condition for synchronization signal transmission, such as reception power of the eNB signal or other synchronization UEs and signal detection. For example, although the condition for transmitting the synchronization signal is fulfilled, the UE transmits the synchronization signal using one SRU selected among the idle SRUs only when there are idle SRUs. It may be possible to apply relatively loose idle SRU determination condition. For example, if the number of synchronization signals received at a reception power higher than a predetermined reception power threshold in a SRU is less than N, the SRU may be determined as the idle SRU.

Figure 19B:
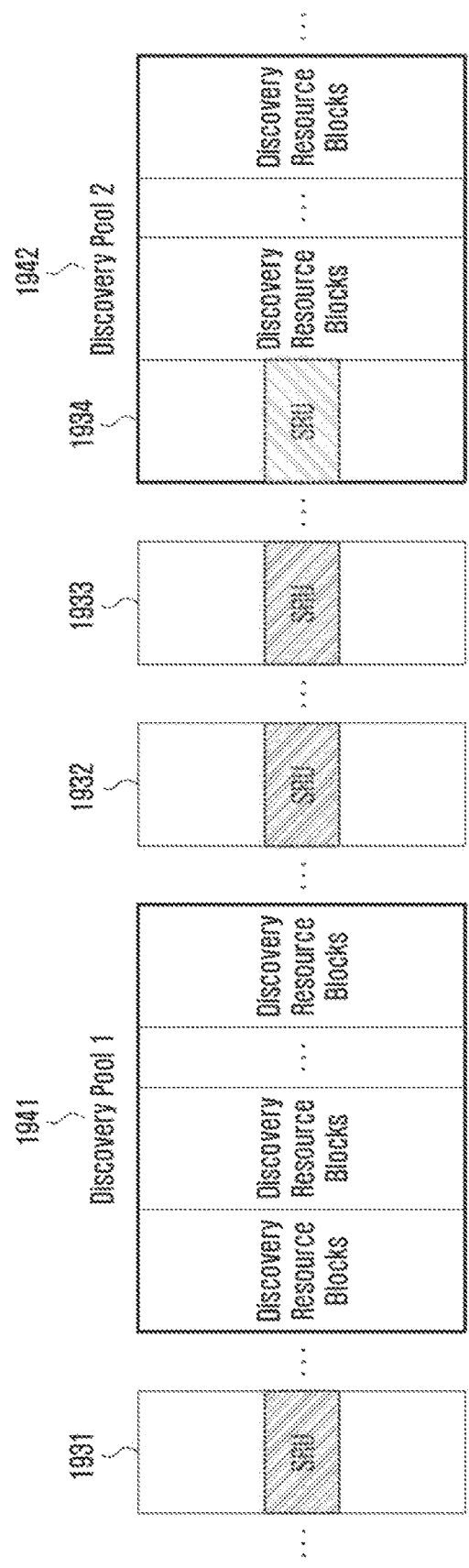

FIG. 19B is a diagram illustrating the resource pool structure including synchronization resources for D2D discovery according to an embodiment of the present disclosure.

Similar to the case of FIG. 19A, a UE receives the BCH from the eNB in the discovery resource region to determine the absolute time of the reference frame (SFN0) and acquires the relative position information of the discovery region indicated in relation to the reference frame by receiving the SIB. The UE served by a neighboring eNB or located in the partial-network coverage area or in-network coverage receives the synchronization signal and synchronization channel area transmitted in the SRU to determine the absolute time of the reference frame (SFN0) first and acquires the relative position information to the resource region indicated based on the reference frame.

For example, if the synchronization channel received from the UE served by a neighboring eNB indicates SFN10, the reference frame SFN0 will be positioned before 10 SFN periods. Meanwhile, the UE served by the neighboring eNB in the discovery resource region 2 (1942) receives BCH and SIB from the serving eNB to acquire the information on the position relative to the reference time (SFN0) of the service eNB for the reference resource region 2 (1942) of at least one other neighboring eNB. When the start point of the resource region of the other eNB arrives, the UE may perform the transmission/reception operation with the WAN and, if the UE is not transmitting the synchronization signal or other D2D signals, the UE receives the synchronization signal and channel expected at the start time of the corresponding resource region. The synchronization signal is transmitted according to specific condition, but the synchronization channel may not be transmitted. A terminal served by a neighboring eNB receives the synchronization signal so as to acquire accurate reception synchronization reference timing about the start of the corresponding discovery resource region. Such an operation may be applied to the D2D communication resource region without being restricted to this example.

Meanwhile, the discovery resource region 1 (1941) and discovery resource region 2 (1942) are used simultaneously, a field for indicating whether the first duration of the resource region (e.g., a subframe) is used for SRU should be included in the BCH or SIB from the eNB. In the case of the Synchronization Source UE, whether the resource for transmitting the synchronization signal exists should be determined based on the field notifying of the usability of the SRU, and in the case of the receiving UE served by the neighboring eNB, whether to receive the synchronization signal and channel in the corresponding resource region or whether to receive the discovery signal may be determined according to the field notifying of the usability of the SRU. This field is referred to as periodic synchronization transmission field in an embodiment of the present disclosure.

In the case of using the periodic (blue) SRU (1931, 1932, 1933), the eNB turns the periodic synchronization transmission field ON to notify of it through the BCH or SIB. In the case of using the temporary (one-shot) SRU (1934), the periodic synchronization transmission field is OFF to notify of it through the BCH or SIB.

If an extra (pink) SRU (1934) is not used in the resource region 2, the UE located in a partial network coverage area or out-of-network coverage area receives the synchronization signal and synchronization channel transmitted by the UE in the periodically transmitted (blue) SRUs (1931, 1932, 1933) to determine the absolute time of the reference frame (SFN0) and acquires the relative position information on both the resource region 1 (1941) and resource region 2 (1942) indicated in comparison to the reference frame. The relative position information can be acquired based on the information relayed by a neighboring eNB as well as the information received from the serving eNB. After acquiring the relative position information of the resource region, the UE may wake up from the idle state at least one synchronization period earlier than the start point of the resource region to receive the synchronization signal at the periodic SRU to compensate synchronization.

Meanwhile, in the case that extra SRU is used in the resource region 2 (1942), the UE may receive the periodic SRU and acquire the relative position information from the reference time (SFN0) of the serving eNB for the resource region of the neighboring eNB and may wake up from the idle state right before the start time of the resource region 2 (1942) to receive the synchronization signal in the extra SRU to compensate the synchronization. In the case of using only the extra SRU in the resource region 2 (1942) without periodic SRUs (11931, 1932, 1933), if the eNB has not provide the information on the start point of the resource region in advance or if the UE is the out-of-coverage UE, the UE may operate inefficiently to perform the synchronization procedure for receiving a non-periodic SRU for a long time.

Figure 19C:
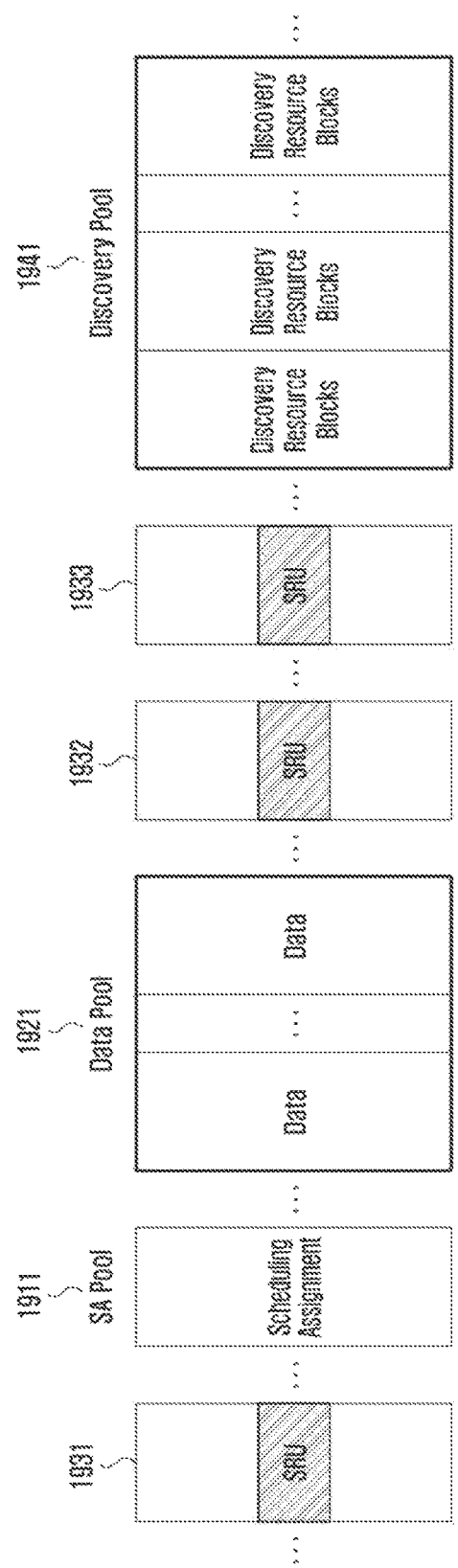
Figure 19D:
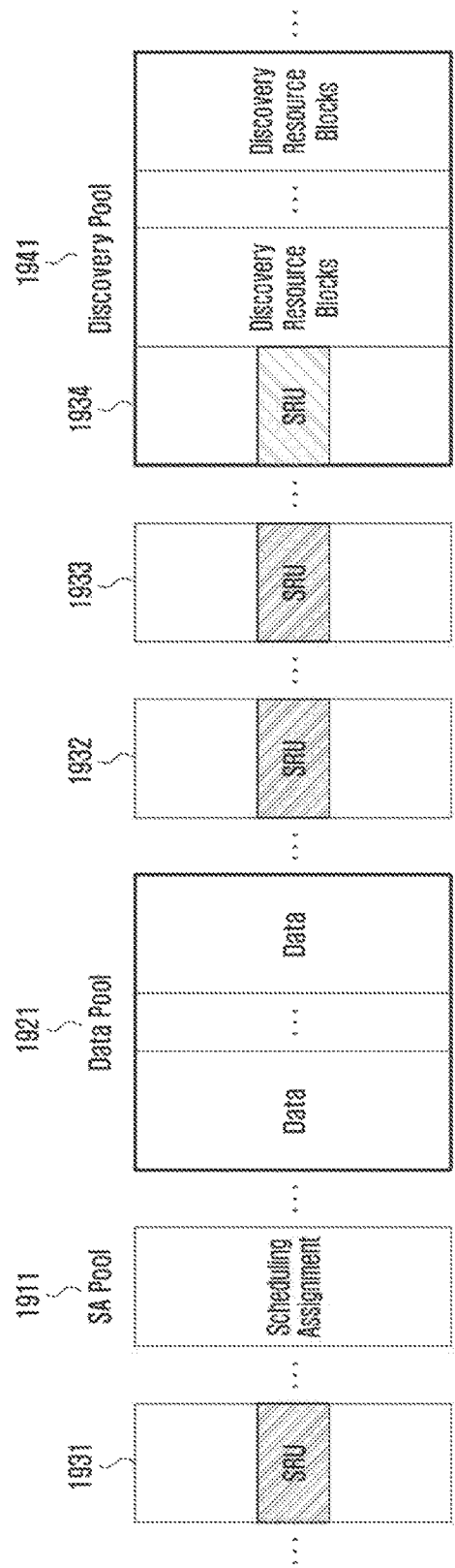

FIG. 19C is a diagram illustrating the resource pool structure including synchronization resources for D2D Discovery and Communication according to an embodiment of the present disclosure, and FIG. D is a diagram illustrating the resource pool structure including synchronization resources for D2D Discovery an Communication according to another embodiment of the present disclosure.

Referring to FIG. 19C, the SRUs 1931, 1932, and 1933 are arranged periodically, and the SA pool 1911 for resource allocation and Data pool 1921 for communication is arranged. In addition, the Discovery pool 1941 is arranged along with. The resource structure of FIG. 19D differs from resource structure of FIG. 10C in that an aperiodic SRU 1934 is included in the first transmission region of the Discovery pool.

For each resource pool information, the eNB may explicitly or implicitly notify a UE whether to listen to a periodic synchronization signal or a one-shot synchronization signal. The SA pool (1911) and data pool (1921) are used for communication and require synchronization using a periodic synchronization signal, but the discovery pool allows synchronization using a periodic synchronization signal or a one-shot synchronization signal.

Hence, the eNB may explicitly notify 1-bit information indicating one of two synchronization setting modes together with the resource pool information via a broadcast channel (BCH and SIB) or UE-dedicated signaling. On the other hand, implicit notification is described below. The eNB uses two pieces of offset information to notify the resource pool. The first offset information indicates the gap between the reference frames (SFN0) of the serving and neighboring eNBs. In LTE, this offset may be indicated by 10 ms (FDD) or 20 ms (TDD) as a frame unit. The second offset information indicates the start point of the resource pool used by the neighboring eNB relative to the reference frame (SFN0) of the neighboring eNB. In LTE, this offset may be indicated by 1 ms as a subframe unit. The eNB receives information indicating whether the resource pool of the neighboring eNB utilizes a one-shot synchronization signal from the network, and, if a one-shot synchronization signal is used, does not transmit the first offset information (or transmit null information). If a periodic synchronization signal is used, the eNB transmits both the first offset information and the second offset information. The UE performs synchronization reception operation to identify the start point of a desired resource pool by use of the number of offset information, the first offset information set to null, or an offset information separator received from the eNB.

In FIGS. 19A and 19B, it is assumed that the eNB notifies the resource pool information via BCH and SIB. However, in some cases, it is possible to notify the resource pool information via a UE-specific control signal (dedicated signaling). In the event that the first frame of the resource pool is allocated for an aperiodic one-shot synchronization signal resource, when the resource pool is notified via BCH and SIB, it is possible for all UEs in the coverage area of the eNB to transmit a synchronization signal at the first frame of the resource pool. When the resource pool is notified via dedicated signaling, only UEs having received the dedicated signaling from the eNB may transmit a synchronization signal.

Synchronization Signal Measurement

When a D2D UE receives a synchronization signal, according to the states of connection with the eNB, the D2D UE may measure another synchronization signal in order to determine whether to become a synchronization source UE or to report measurement results to the eNB. In addition, when the resource pool requiring use of a periodic synchronization signal and the resource pool permitting use of a one-shot synchronization signal are distinguished, the scheme for measuring a synchronization signal may be varied depending upon the situation. In the case of a one-shot synchronization signal, all UEs determined as a synchronization source according to the control of the eNB or a preset condition has to transmit by use of a single SRU. Hence, the synchronization signal is transmitted at the same resource and by the same transmission scheme as in the case of a Single Frequency Network.

Here, as one or more synchronization signals are received in an overlapped manner, reception power may be higher compared with a case where one synchronization UE transmits a synchronization signal at one resource, and the transmission distance of the synchronization signal can be greater than that of data. In the case of resource allocation for a periodic synchronization signal from the eNB, all UEs determined as a synchronization source according to the control of the eNB or a preset condition may transmit a synchronization signal by selecting an unused synchronization resource. Here, as synchronization signals from a small number of synchronization UEs may overlap at one resource, reception power at the receiving UE may be lower compared with the case of a one-shot synchronization signal, and the difference between transmission distances of a synchronization signal and data is not large. Owing to such environmental differences, to select a synchronization relaying UE for an out-of-coverage UE, it may be inappropriate to measure one-shot synchronization signals. To select a synchronization relaying UE, it is more appropriate to measure periodic synchronization signals only. To this end, a synchronization UE in in-coverage should notify the location of the synchronization resource (i.e., SRU period and offset) via a synchronization signal and synchronization channel.

The synchronization UE may relay information on a resource pool not utilizing a periodic synchronization resource (i.e., an offset, a bitmap, and the like). To become a synchronization relaying UE, a UE having received the synchronization signal and synchronization channel from the synchronization UE measures a synchronization signal from a neighboring synchronization UE. Based on the information on a resource pool not utilizing a periodic synchronization resource, a synchronization signal that is transmitted by a UE belonging to the same eNB and is received at the resource pool may be ignored (this can be known from the ID contained in the synchronization signal and synchronization channel).

As another example, the synchronization UE may relay information on a resource pool utilizing a periodic synchronization resource (i.e., an offset, a bitmap, and the like). To become a synchronization relaying UE, a UE having received the synchronization signal and synchronization channel from the synchronization UE measures a synchronization signal from a neighboring synchronization UE. Based on the information on a resource pool utilizing a periodic synchronization resource, only a synchronization signal that is transmitted by a UE belonging to the same eNB and is received at the resource pool is measured (this can be known from the ID contained in the synchronization signal and synchronization channel).

Meanwhile, based on information regarding a resource pool utilizing a periodic synchronization resource or a resource pool not utilizing a periodic synchronization resource and information on the relay hop count from the eNB, it is still possible to determine whether to periodically transmit a synchronization signal at the resource pool not utilizing a periodic synchronization resource. For example, for a relay hop count of 2, i.e., an eNB (0 hop)->UE 1 (1 hop)->UE 2 (2 hops), synchronization transmission of UE 2 may be restricted so as not to cause interference with or exert influence on other in-coverage UEs operating at the resource pool not utilizing a periodic synchronization resource. On the other hand, for a relay hop count of 3, i.e., an eNB (0 hop)->UE 1 (1 hop)->UE 2 (2 hops)->UE 3 (3 hops), as the signal of UE 3 does not reach in-coverage UEs, UE 3 may perform synchronization transmission at the resource pool not utilizing a periodic synchronization resource.

Sync for Tx

A description is given of an overall synchronization procedure for D2D discovery and communication. The overall synchronization procedure includes a transmission synchronization procedure to synchronize the reference time for transmission and a reception synchronization procedure to synchronize the reference time for reception. The reason is as follows. Although the reference time for transmission has been synchronized under the assumption that it is extremely difficult to achieve accurate synchronization in an out-of-coverage situation, when a different synchronization signal is received, it is desirable to allow the UE to perform D2D discovery or receive a communication signal in accordance with the different synchronization signal. The overall procedure includes scanning to acquire transmission synchronization, and acquiring transmission synchronization and determining the role, while scanning to acquire reception synchronization and acquiring reception synchronization.

Figure 20A:
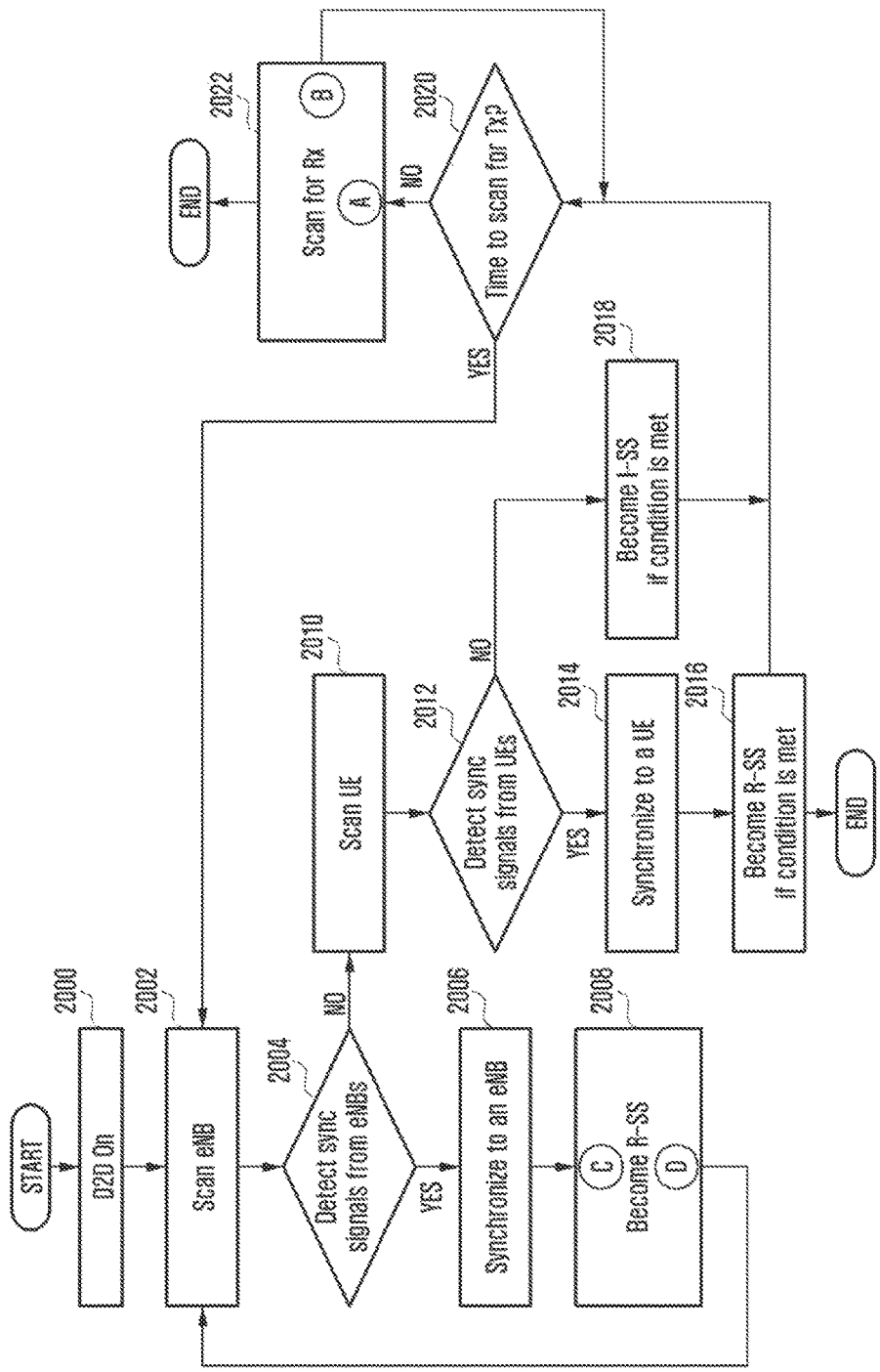
FIGS. 20A and 20B are flowcharts illustrating transmission synchronization procedures according to an embodiment of the present disclosure.
Figure 20B:
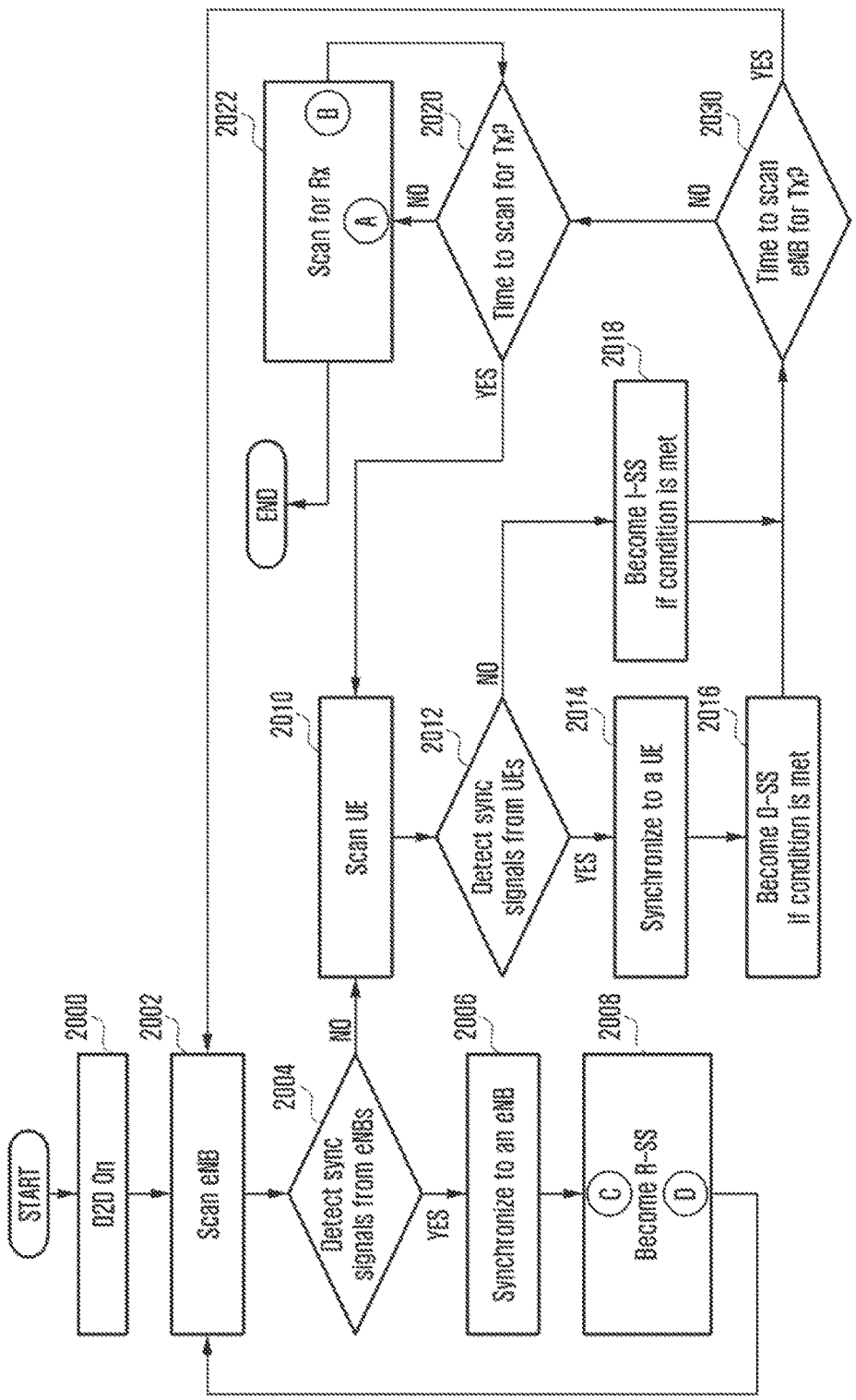

FIGS. 20A and 20B are flowcharts illustrating transmission synchronization procedures according to an embodiment of the present disclosure.

Referring to FIG. 20A, when the UE is turned on in operation 2000, for example, when wireless communicating unit (201) for D2D operation and the modem (203) for D2D operations is turned on by the controller (205), the UE scans eNBs in operation 2002. If a synchronization signal (PSS/SSS) of at least one eNB is detected in operation 2004, the UE selects one of the detected synchronization signals in operation 2004, synchronizes with the reference time of the selected synchronization signal in operation 2006, and determines whether to become a relaying synchronization source (R-SS) in operation 2008. Selecting one of synchronization signals of multiple eNBs is based on the reception power level as in the case of the existing LTE standard. Determining whether to become a relaying synchronization source is described with reference to the drawing below. After determining, the procedure returns operation 2002 to scan for eNBs.

If no synchronization signal of an eNB is detected in operation 2004, the UE scans synchronization source UEs by moving to operation 2010. If a synchronization signal (D2DSS, D2DBCH or D2DSCH) of at least one synchronization source UE is detected in operation 2012, the UE selects one of the detected synchronization signals, moves to operation 2014 to synchronize with the reference time of the selected synchronization signal, and moves to operation 2016 to determine whether to become a relaying synchronization source. Selecting one of synchronization signals of UEs may be based on at least one of reception power level, D2D frame number, relay hop count, UE valid duration, UE age and synchronization phase. If the UE fails to detect an eNB synchronization signal or D2D synchronization signal, the UE may act as an independent synchronization source (I-SS), that is, when moved from operation 2012 to operation 2018.

Meanwhile, unlike the case of synchronization with an eNB, the UE synchronized with a synchronization source UE has to periodically perform scanning. This is because network changeability is high owing to UE mobility. Thereafter, the UE determines expiration of the time to scan for transmission in operation 2020, and the procedure returns to scanning eNBs in operation 2002 if the time to scan for transmission has not expired. If the time to scan for transmission has expired, the procedure proceeds to determining arrival of the time to scan for reception in operation 2022. Scanning for reception is described below with reference to the following figures.

From the point of view of the synchronization source UE, the transmission scheme may differ between scanning for transmission and scanning for reception. For example, while change of synchronization is expected in scanning for transmission, existing transmission timing is maintained in scanning for reception. Hence, while the synchronization source UE discontinues to transmit the synchronization signal during scanning for transmission, the synchronization source UE continues to transmit the synchronization signal during scanning for reception.

Referring to FIG. 20B, compared to FIG. 20Aa, it further includes operation 2030. In operation 2030, the time to scan for transmission is different for eNBs and UEs. Specifically, after a match with the reference time of a synchronization source UE, eNB scanning may be performed with a short period. After scanning for eNBs, UE scanning may be performed with a long period.

Sync for Rx

Figure 21A:
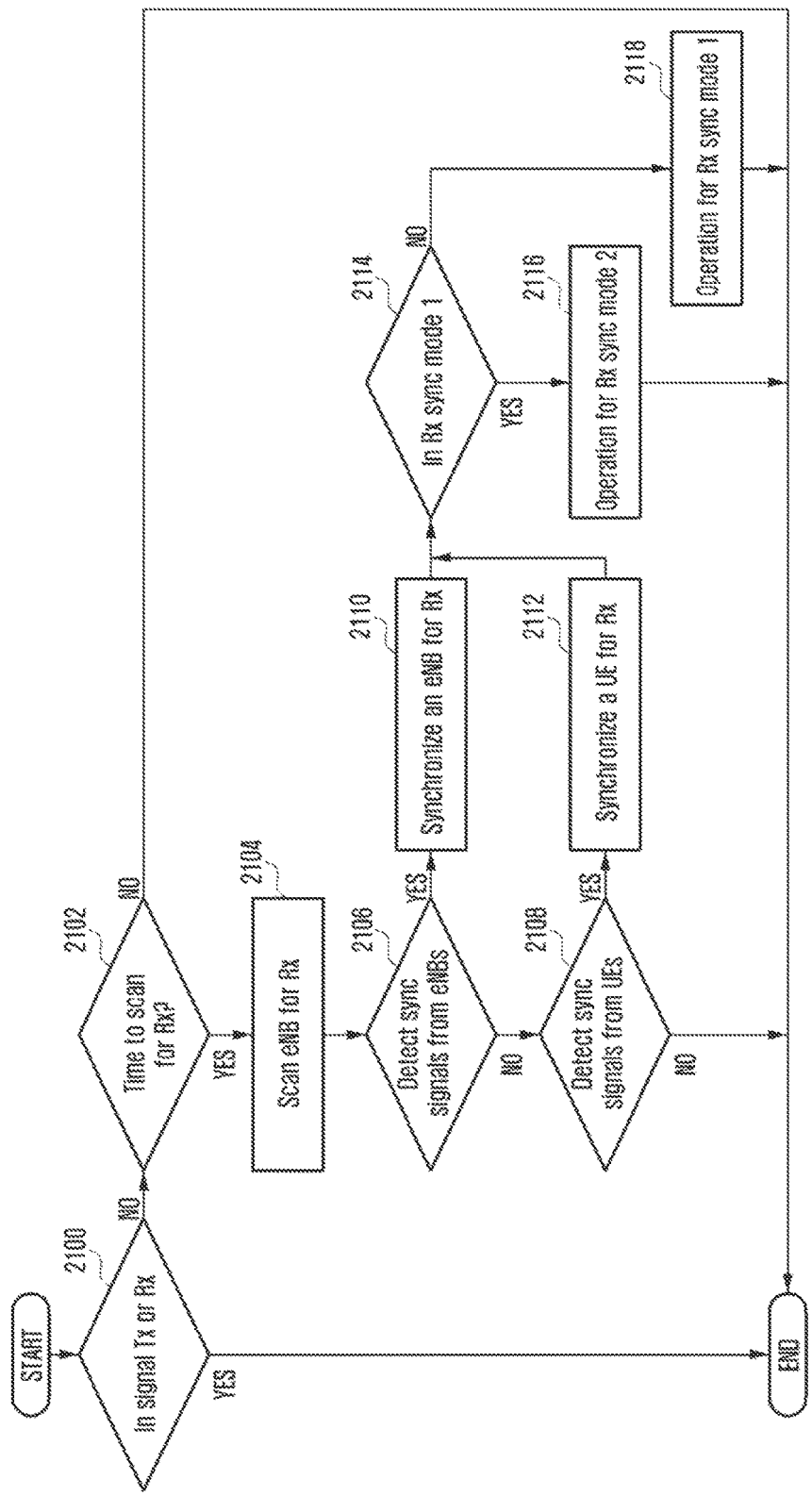
FIGS. 21A, 21B, and 21C are flowcharts illustrating a procedure of scanning for reception according to an embodiment of the present disclosure.
Figure 21B:
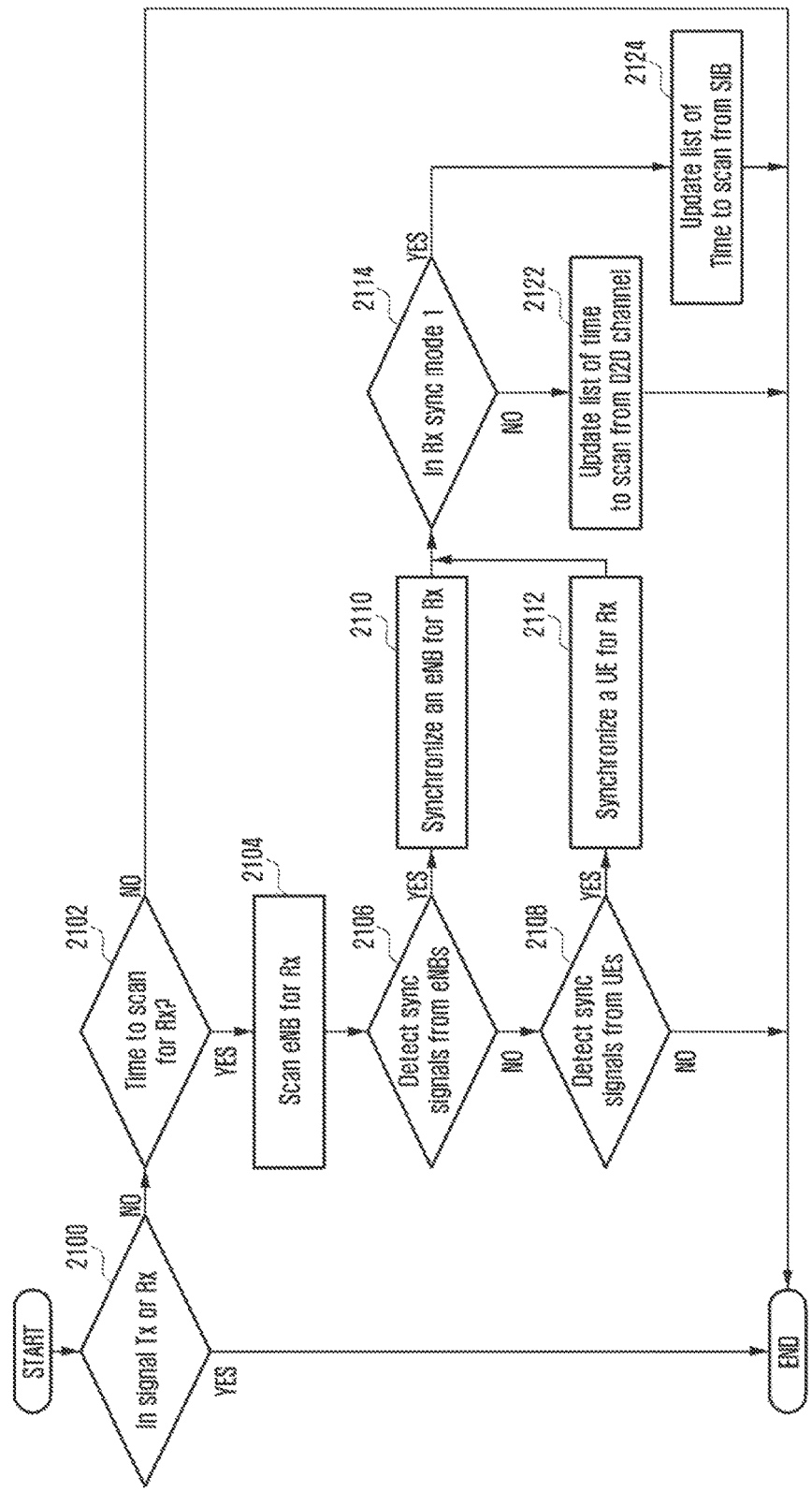
Figure 21C:
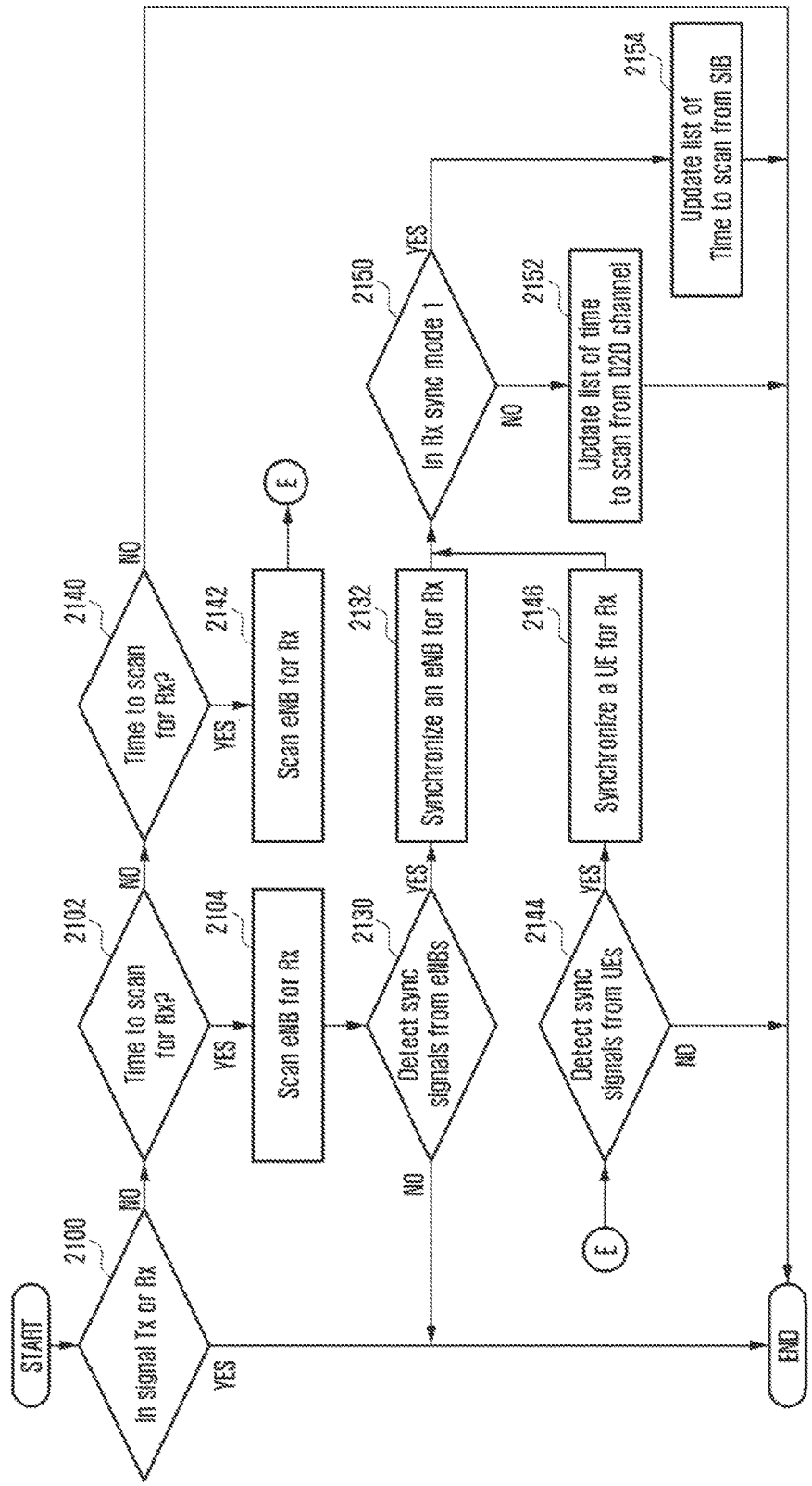

FIGS. 21A, 21B, and 21C are flowcharts illustrating a procedure of scanning for reception according to an embodiment of the present disclosure.

Referring to FIG. 21A, the UE determines whether D2D transmission or reception is in progress in operation 2100. If a control or data signal is being transmitted or received for D2D discovery or communication, the UE may have difficulty in receiving another synchronization signal before completion of the transmission and reception operation. If D2D transmission or reception is not in progress during the search result of operation 2100, the UE determines expiration of the time to scan for reception in operation 2102. If the time to scan for reception has not expired, the UE scans eNBs for a synchronization signal in operation 2104, synchronizes with, if a synchronization signal is detected in operation 2106, the reference time of the detected synchronization signal for reception, and receives a D2D signal in Rx mode in operation 2110. However, if no synchronization signal is detected from eNBs, the UE scans UEs for a synchronization signal in operation 2108, synchronizes with, if a synchronization signal is detected, the reference time of the detected synchronization signal for reception in operation 2112, and receives a D2D signal in Rx mode.

The D2D signal may be received in one of two Rx synchronization modes: Rx sync mode 1 and Rx sync mode 2. The UE determines the Rx synchronization mode at operation 2114. Here, the reception operation in the resource pool for the serving cell may be omitted in the Rx mode. If the current operation mode is the Rx sync mode 1, the procedure goes to operation 2118 and, otherwise, if the current operation mode is the Rx sync mode 2, the procedure goes to operation 2116.

Difference between Rx sync mode 1 and Rx sync mode 2:
  Rx sync mode 1: it is assumed that the serving eNB notifies resource pool information including an offset related with a neighboring eNB as a difference from the reference frame timing (e.g., SFN0). The UE performs D2D reception only at the notified resource pool, and, if a synchronization signal from a UE belonging to the neighboring eNB is detected, obtains the symbol and frame boundaries from the detected synchronization signal and performs desired D2D operation.

An out-of-coverage UE having obtained the eNB reference time via a synchronization signal relayed by a UE may receive information on the offset and resource pool of a neighboring eNB relayed by a synchronization UE through a synchronization channel and perform reception operation like the case of an in-coverage UE. Here, via a synchronization signal from a synchronization UE, the receiving UE should be able to identify the ID of the eNB with or on which the synchronization UE is associated or camps.

It is not easy to apply Rx sync mode 1 to an out-of-coverage UE having acquired an independent reference time not originating from a reception network. This corresponds to a situation where a synchronization UE is generated owing to absence of a synchronization relaying UE in network coverage. When complexity does not matter, the following is possible. An in-coverage UE may receive the independent reference time of an out-of-coverage UE and report the reference time to the corresponding eNB. Upon reception of such a report from at least one UE, the eNB may notify UEs in the cell of the offset related to the reference time of the out-of-coverage UE. When complexity does matter, use of Rx sync mode 2 may be more efficient.

Rx sync mode 2: it is assumed that a neighboring eNB or a synchronization UE belonging to the neighboring eNB notifies resource pool information including an offset related with the neighboring eNB as a difference from the reference timing (e.g., SFN0) of the neighboring eNB. The UE has to receive a synchronization signal and channel, obtain the symbol and frame boundaries from the synchronization signal, and identify the current SFN and resource pool location from the synchronization channel. When the current timing corresponds to the identified D2D resource pool, the UE performs D2D operation at the D2D resource pool. When the current timing does not correspond to the identified D2D resource pool, the UE may enter the idle state waiting for arrival of the D2D resource pool if there is no WAN operation other than D2D operation.

In Rx sync mode 2, an out-of-coverage UE having obtained the eNB reference time via a synchronization signal relayed by a UE or other-coverage UE may receive information on the SFN and resource pool of a neighboring eNB relayed by a synchronization UE through a synchronization channel and perform D2D reception operation.

Referring to FIG. 21B, operations corresponding to Rx sync mode 1 and Rx sync mode 2 are illustrated. If the UE is in Rx sync mode 1, the UE moves to operation 2124 and if the UE is in Rx sync mode 2, the UE moves to operation 2122. In Rx sync mode 1, the UE uses SIB from the eNB to obtain information on the start point of the resource pool of a neighboring eNB, and updates a list of information regarding the timing to start scanning for reception accordingly. In Rx sync mode 2, the UE uses D2DBCH (broadcast channel) or D2DSCH (synchronization channel) to obtain information on the start points of the resource pools of a neighboring eNB and synchronization source UE, and updates a list of information regarding the timing to start scanning for reception accordingly.

Referring to FIG. 21C, unlike the case of FIG. 21B, the time to scan for reception is different for eNBs and UEs.

The UE determines whether it is transmitting or receiving D2D signals at operation 2100. For example, if the UE is transmitting or receiving control or data signals for Discovery or Communication, it may be difficult to receive other synchronization signals before the transmission/reception operation is completed. If the UE is no transmitting or receiving D2D signals at operation 2100, the UE determines whether it is Time to Scan for Reception from the eNB at operation 2102. If it is Time to Scan for Reception, the UE scans for eNB synchronization signals at operation 2104 and, if any eNB synchronization signal is listened at operation 2130, configures an Rx time reference at operation 2132 to receive D2D signals. Otherwise, if no eNB synchronization signal is listened, the UE ends the routine of FIG. 21C.

If it is not the Time to Scan for Reception from the eNB at operation 2102, the UE determines whether it is Time to Scan for Reception from other UEs at operation 2140. If it is Time to Scan for Reception from other UEs, the UE scans for the synchronization signals from other UEs at operation 2142 and, any synchronization signals from other UEs are detected at operation 2144, configures the reception time reference at operation 2146 to receive D2D signals. If not synchronization signal from another UE is detected at operation 2144, the UE ends the routine of FIG. 21C.

Meanwhile, if the procedure goes to operation 2150, the UE determines whether it is in the Rx sync mode 1 or Rx sync mode 2 and, if it is in the Rx sync mode 1, the procedure goes to operation 2154 and, otherwise, if it is in the Rx sync mode 2, the procedure goes to operation 2152.
Become R-SS FIG. 22 is a flowchart illustrating a procedure of becoming a relaying synchronization source according to an embodiment of the present disclosure.

Figure 22:
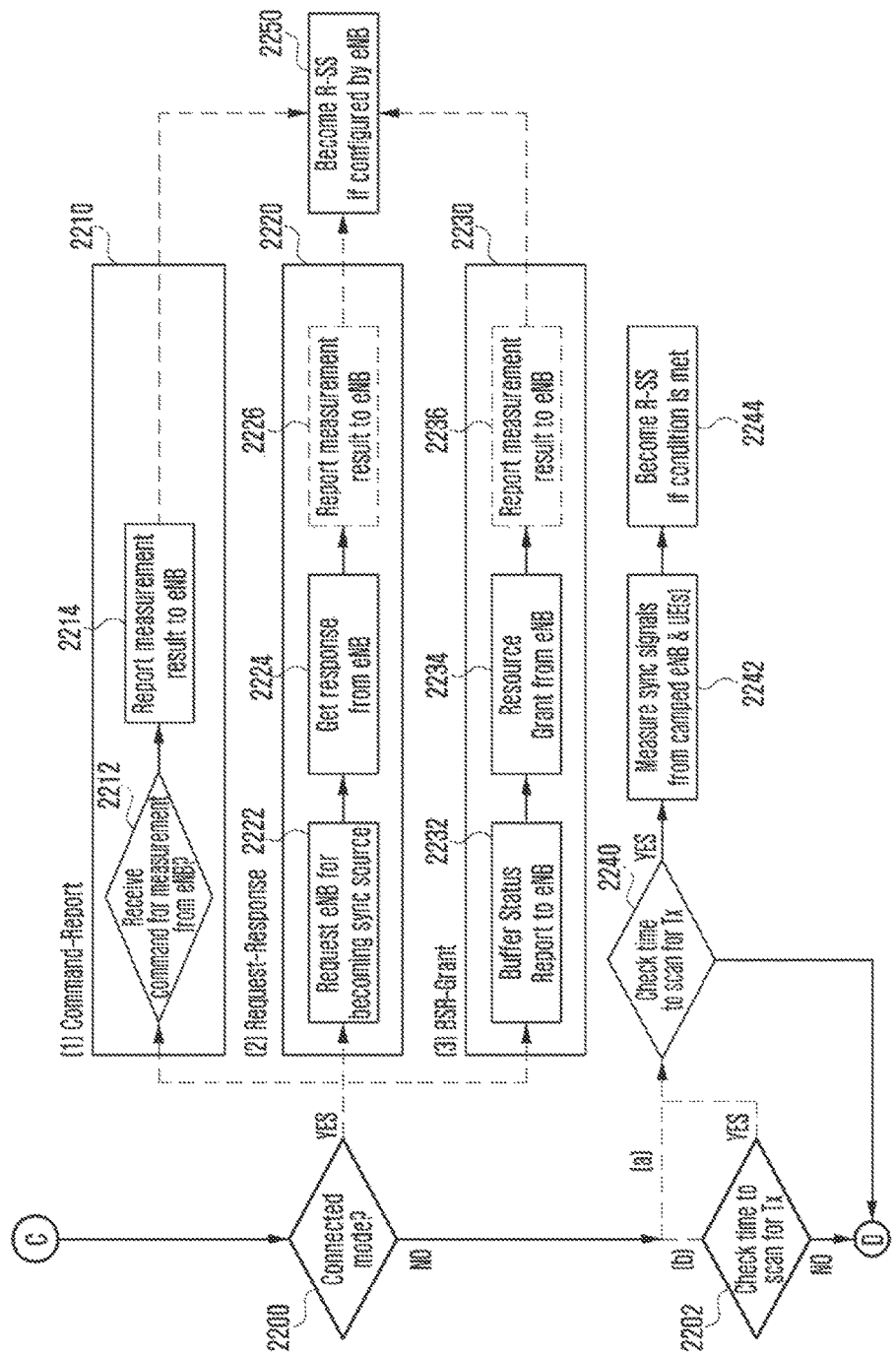
FIG. 22 is a flowchart illustrating a procedure of becoming a relaying synchronization source (R-SS) according to an embodiment of the present disclosure.

Referring to FIG. 22, a UE determines if there is a connection mode in the eNB region in operation 2200. Based on the result of operation 2200, an in-coverage UE in connected mode may operate as a relaying synchronization source according to one of the following three options under the control of the eNB.

The first option is a command-report scheme as in operation 2210, where when a command for synchronization signal measurement is received from the eNB at operation 2212, the UE performs corresponding measurement and reports the measurement result to the eNB at operation 2214.

The second option is a request-response scheme as in operation 2220, where when the UE transmits a request to become a relaying synchronization source to the eNB in operation 2222, the eNB examines the request and transmits a response message to the UE. The UE receives a response message in operation 2224 and the UE may also transmit a measurement result to the eNB in operation 2226. When the response message indicates a ready consent, the UE operates as a relaying synchronization source. When a measurement result is transmitted, the eNB may permit the UE to operate as a relaying synchronization source via a separate control signal.

The third option is a BSR-grant scheme as in operation 2230, where the UE transmits additional request information when transmitting a buffer status report (BSR) to request resource allocation for data transmission in operation 2232, and the eNB examines the request and may transmit an R-SS indication when transmitting a grant control signal to the UE. The UE may receive a Resource Grant message indicating whether to operate as R-SS at operation 2234. Depending on case, the eNB may request the UE to perform additional measurement. The UE may perform additional measurement report at operation 2236.

The UE may become an R-SS at operation 2250 through one of the three methods as described above.

If the UE is in idle mode operation 2200, determines whether there is any data to be transmitted (b) at operation 2202. If there is no data to be transmitted, the UE does not attempt to become a relaying synchronization source.

In another embodiment of the present disclosure, the UE may become a relaying synchronization source regardless of data to be transmitted (a). To examine the possibility of becoming a relaying synchronization source, the UE determines expiration of the time to scan for transmission in operation 2240. If the time to scan for transmission has not expired, the UE measures synchronization signals from the camping and neighboring eNBs in operation 2242. When the measurement result satisfies a preset condition, the UE operates as a relaying synchronization source in operation 2244. Satisfaction of this condition may be related to determining whether the reception power level of a signal from an eNB is less than a threshold of X dBm, whether the reception power level of a synchronization signal from a neighboring synchronization relaying UE is less than a threshold of Y dBm, or whether the reception power level of a signal from an independent neighboring synchronization relaying UE is less than a threshold of Z dBm.
Relationship Between eNB ID and D2D Synchronization Signal A receiving UE should be able to identify, via a synchronization signal (including a synchronization channel) from a synchronization UE, the ID of the eNB with or on which the synchronization UE is associated or camps. To this end, the eNB ID may be directly transmitted as a part of the synchronization signal, or the ID of a UE-specific synchronization signal or the ID of a set of UE-specific synchronization signals whose relationship with the eNB ID is predefined may be transmitted. As such, a UE having received a synchronization signal may identify the ID of the eNB with or on which a UE having transmitted the synchronization signal is associated or camps based on the ID of the synchronization signal. Alternatively, a UE may transmit a synchronization signal having the ID of a set of eNBs.
Zone ID

- A "zone" may include one or more eNBs. Zone may be used interchangeably with Clustering, Grouping, or Common Configuration.
- When zone information is received from a higher layer via an eNB, it may be unnecessary to identify serving cell information (resource location and ID of a synchronization signal of the serving eNB are already notified by the eNB).

When the reference frame (SFN0) of the cell having transmitted SIB is already obtained from the current serving eNB, there is no need to obtain SFN from the synchronization channel (PD2DSCH).

The zone is to enable multiple eNBs to commonly use some or all of RRC parameters for D2D communication between eNBs. For example, the bitmap information representing resource pool allocation may be used in common, and start points of eNB-specific resource pools may be represented by different offsets. Alternatively, allocation bitmap information and offsets may be the same and locations of eNB-specific D2D frequency resources may be different. To this end, it is possible to separate zone-specific information from cell-specific information in SIB. Zone-specific information may be notified together with zone ID, and it is possible to implicitly know from SIB reception that cell-specific information is related to the serving eNB. It is necessary to explicitly indicate the zone to which the serving eNB belongs. For example, in SIB, an eNB has to separate resource pool information for a zone including the serving eNB from resource pool information for a zone not including the serving eNB.

If separation of resource pool information for a zone including the serving eNB from that for a zone not including the serving eNB requires additional signaling or cause difficulties in supporting UEs in idle mode, a scheme not explicitly indicating the zone may be used. For example, it is possible to transmit both resource pool information of a zone and an ID list of synchronization signals usable in the zone. Here, synchronization signals may include PSS/SSS from an eNB and D2DSS from a UE.

In a scenario where zone IDs are separately managed for different PLMNs, in addition to zone ID, PLMN ID is to be transmitted through SIB or PD2DSCH.

When offset information between zones is notified by the network, there is no need to transmit and receive SFN information via PD2DSCH for operation between eNBs. However, it is required to transmit SFN information (or D2D frame number) via PD2DSCH for out-of-coverage operation.

Although zone IDs may be separately configured, existing paging area IDs or timing advance group (TAG) IDs (cells in one TAG have the same timing advance (TA) for coordinated multi point (CoMP) operation) may be reused to configure zone IDs. Alternately, without use of zone IDs, it is possible to apply common parameters to all eNBs in one public land mobile network (PLMN) area.

A UE may receive zone IDs and zone-specific information associated therewith from a D2D server (e.g., a proximity service server, a mobility management entity (MME), and the like) in advance at initial attachment. Otherwise, the eNB should notify the UE of all or some zones via BCH and SIB when the UE is in the eNB or camps on the eNB. When zone IDs are not separately configured, the D2D server or MME notifies the UE of common parameters for all eNBs at initial attachment.

Hierarchical Enhancement

Figure 23:
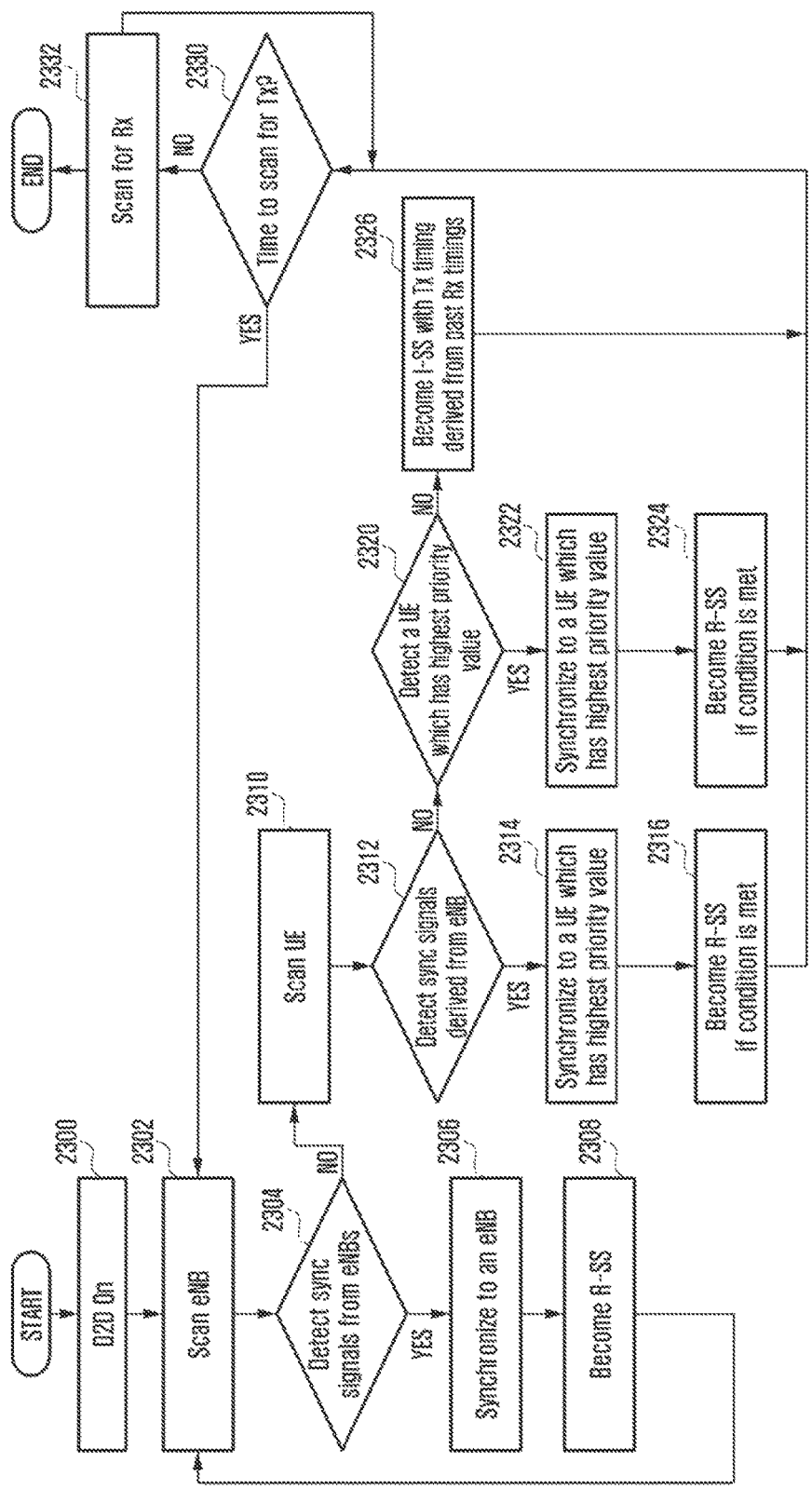
FIG. 23 is a flowchart illustrating a method of becoming an R-SS which is capable of compensating for a hierarchical synchronization procedure issue of an OOC UE according to an embodiment of the present disclosure.

FIG. 23 is a flowchart illustrating a method of becoming an R-SS which is capable of compensating for a hierarchical synchronization procedure issue of an OOC UE according to an embodiment of the present disclosure.

Referring to FIG. 23, a UE turns the D2D function on at operation 2300 and scans for signals from eNBs at operation 2302. The UE determines whether synchronization signals from eNBs are detected at operation 2304. If a synchronization signal is received from any eNB, the UE acquires synchronization with the eNB at operation 2306 to become an R-SS at operation 2308.

If no eNB synchronization signal is received at operation 2034, the UE scans for signals from UEs at operation 2310 and determines whether any synchronization signal is received from at least one UE synchronized with an eNB at operation 2312. If any synchronization signal from at least one UE synchronized with an eNB is received, the UE acquires synchronization with a UE with the highest priority at operation 2314 and, if a condition for becoming an R-S S is fulfilled at operation 2316, becomes an R-SS.

If the procedure goes from 2312 to 2320, the UE determines whether a UE having the highest priority is detected. If a UE having the highest priority is detected at operation 2320, the UE acquires synchronization with the UE having the highest priority at operation 2322 and, if the condition for becoming an R-SS is fulfilled at operation 2324, becomes an R-SS. If no UE having the highest priority is detected at operation 2320, the UE becomes an independent synchronization source UE (I-SS).

The UE determines whether it is Time to Scan for Transmission at operation 2330 and, if so, it returns the procedure to operation 2302 and, otherwise, operation 2332 to scan for reception at operation 2332.

In the existing hierarchical synchronization procedure, synchronization is achieved through repeated relay up to the maximum hop count from the independent synchronization source (I-SS). However, a synchronization mismatch between clusters formed by different independent synchronization sources may cause interference between UEs of different clusters or inconsistency in action timing. In FIG. 23, high synchronization performance is achieved by combining periodic change of independent synchronization sources and converging previous reference times into a new reference time with I-SS change of operation 2326. The I-SS is determined based on priority values transmitted by UEs via D2DBCH or D2DSCH. A UE wishing to become I-SS transmits its priority value to proximate UEs, and a proximate UE finds a UE with the highest priority value and sets up transmission synchronization with the UE with the highest priority value. The UE having set up transmission synchronization determines whether to become R-SS.

The condition to become R-SS may correspond to the reception power level of D2DSS, the reception power level of a synchronization signal from a synchronization relaying UE belonging to the same nearby cluster and with the same hop count, and whether to transmit a D2D discovery/communication signal. When the UE receives synchronization signals from multiple synchronization source UEs during the time to scan for transmission and the time to scan for reception, the UE updates the reference time to be used for next I-SS. The reference time to be used for operating as I-SS is determined based on the timing obtained from different synchronization signals according to a preset rule. The rule is designed so that reference times of all UEs can be converged. Examples of such a rule may include average timing based determination, earliest timing based determination, and pulse-coupled oscillator modelling. If it becomes an I-SS, the UE transmits synchronization signal as the ISS and performs the scanning procedure during the synchronization source UE operation period determined according to a rule pre-configured or determined randomly by the UE, under the control of the eNB, or predetermined. If the condition for becoming the I-SS is fulfilled as the scanning result, the UE repeats the above operation to determine the transmission timing based on the synchronization signal reception timing received during the I-SS operation time period.

D2D Frame Number Priority

In synchronization for communication, although synchronization with the frame boundary is achieved based on a received synchronization signal, when different operation procedures are defined for different frames, each device needs to identify the frame associated with the device. Hence, in a communication system, (system) frame numbers or indexes are designed and assigned so that different frames can be distinguished. For example, in the LTE system, the SFN (System Frame Number) is transmitted to a device by transmitting MIB (Master Information Block) via a control BCH. The SFN may be referred to as Radio Frame Number.

Since the frame number configuration procedure has been described in the first embodiment with reference to FIGS. 13A, 13B, 13C, and 13D, description thereon is omitted herein.

A description is made of the D2D frame number determination in the In-Coverage and Partial Coverage network scenarios with reference to FIG. 14 for the first embodiment of the present disclosure.

In FIG. 14, UE 1 1431 receives PSS/SSS and BCH from eNB 1 and eNB 2 and receives D2DSS and D2DBCH (or PD2DSCH) from SSUE 2 (synchronization source UE 2). As a synchronization signal from the eNB takes priority over a synchronization signal from the UE in general, D2DSS and D2DBCH from SSUE 2 are ignored. UE 1 selects one of eNB 1 and eNB 2 according to the reception power level of PSS/SSS therefrom. In a special situation where, for example, UE 1 belonging to eNB 2 fails to receive PSS/SSS and succeeds in receiving D2DSS from SSUE 2 belonging to eNB 2, UE 1 may synchronize with D2DSS from SSUE 2 (other than a synchronization signal from an eNB) as an exception.

In FIG. 14, the UE 3 1433 receives a UE synchronization signal and UE broadcast channel from the synchronization source UE1 (SSUE1) SSUE2 1442. Ruling out the exception, the UE3 1433 selects one of a plurality of UE synchronization signals according to a priority rule for UE synchronization signals and receives the UE broadcast channel at the position determined based on the selected UE synchronization signal. The priority rule may be determined based on at least one of received signal power strength or quality, eNB ID or SSUE ID indicated in the synchronization signal, and SFN or DFN. If the UE broadcast channel is received successfully, the UE acquires and follows the DFN. The UE operating with the DFN becomes an R-SS, the UE calculates the DFN associated with the synchronization signal based on the acquired DFN and transmits the calculated DFN in the synchronization signal or UE broadcast channel. In the aforementioned exceptional condition, in the case that the eNB informs that it uses the absolute time (e.g., GPS-provided time), if there an eNB using the absolute time according to the information included in the UE broadcast channel, the UE follows the reference time of the corresponding eNB and, otherwise, if there is no eNB using the absolute time, the UE follows the reference time of the UE synchronization signal selected according to the priority rule for the UE synchronization signal and the DFN of the UE broadcast channel.

In FIG. 14, the UE2 1432 receives the UE synchronization signals and UE broadcast channel from the in-coverage SSUE1 1441 and the out-of-coverage SSUE3 1443. In order to make it possible to identify the UE 2 1432, the synchronization signal or synchronization channel/broadcast channel has to include the information indicating In-coverage/Out-of-coverage scenario. The UE2 1432 selects the in-coverage SSUE1 with priority in comparison to the out-of-coverage SSUE3 1443. If there are multiple In-coverage SSUEs, the UE selection is performed according to the priority rule as in the case where the UE2 1432 selects an In-coverage SSUE. In FIG. 14, although it is similar to the UE 3 1433, the UE4 1343 is the out-of-coverage UE with the absolute time. Basically, there may be two rules as described with reference to FIG. 14.

In addition, the out-of-coverage D2D frame number determination scenario described in the first embodiment with reference to FIG. 15 may be applied to the second embodiment with appropriate modification. In the second embodiment of the present disclosure, the detailed description about the out-of-coverage D2D frame number determination scenario is omitted.

Similarly, the absolute time-based synchronization information alignment and selection procedure has been described in the first embodiment with reference to FIG. 16. For example, operation 2022 of FIG. 20A or 20B showing the entire operation of the second embodiment may be applied to the procedure of FIG. 16 or 17 illustrating the first embodiment without modification. Thus, detailed description thereof is omitted herein.

Inter-PLMN Support

There are two schemes to support D2D discovery and communication between UEs belonging to different PLMNs. For example, assuming that UE 1 belongs to PLMN 1 and UE 2 belongs to PLMN 2, in the first scheme, each UE transmits in their serving PLMN and receives in the other PLMN. In the second scheme, each UE transmits in the other PLMN and receives in their serving PLMN. In the first scheme, the UE may normally operate in the same PLMN based on resource pool information of the serving and neighboring eNBs notified by the network, but may have difficulty in notifying the other PLMN of dynamic switching of resource pool information between eNBs. In addition, as UE 2 operates first in its serving PLMN 2, the UE 2 may not perform reception in the other PLMN while performing transmission and reception in the serving PLMN. Hence, it is uncertain that the signal transmitted by UE 1 in PLMN 1 is received by UE 2 in PLMN 2. In the second scheme, UE 1 may receive information indicating D2D support in PLMN 2 from the eNB while remaining in PLMN 1, detects an eNB synchronization signal in a frequency band used by PLMN 2, receives, if accessible, system information for D2D communication from the corresponding eNB, and connects to, if necessary, the corresponding eNB of PLMN 2 to perform D2D discovery and communication. Based on all the two schemes, it may be desirable for a UE wishing to transmit (UE 1) to know whether a UE belonging to a different PLMN is configured to receive from the PLMN of UE 1. To this end, notifying individually whether a specific UE is configured to receive from a given PLMN is unrealistic owing to much overhead. Instead, the eNB may control a D2D UE, via broadcast channel, SIB or UE-specific control signaling, to receive a D2D signal in an operating frequency band of a specific PLMN. In addition, the eNB may notify of the D2D UE of the PLMN frequency band and temporal resource pool information indicating the time interval to receive. A UE belonging to PLMN 1 (UE 1) wishing to transmit a D2D signal to a UE belonging to PLMN 2 (UE 2) switches first to the frequency band of PLMN 2, detects a eNB synchronization signal, receives, if accessible, system information (SIB or UE-specific control signal) for D2D communication from the corresponding eNB, and transmits, if information obtained from the corresponding eNB indicates that their UEs are configured to receive from PLMN 1, a D2D signal in PLMN 1 according to eNB control or UE-determination. Otherwise (i.e., no information obtained from the corresponding eNB indicating that their UEs are configured to receive from PLMN 1 or information obtained from the corresponding eNB indicating that their UEs are configured not to receive from PLMN 1), UE 1 switches to PLMN 2, connects to the corresponding eNB, and transmits a D2D signal according to eNB control or UE-determination. In an embodiment of the present disclosure, the PLMN reception control indication transmitted via SIB may also be transmitted through a synchronization channel (PD2DSCH) by a UE relaying the SIB from the eNB.

Control of Transmission Period and Resource Selection for Type 1 Discovery

The basic procedure of D2D Communication operation is also identical with that of the first embodiment of the present disclosure. In the environment where the performance is not guaranteed according to the above-described 3 determination conditions, the eNB may configure the period value and transmission probability to the UE but it is almost impossible to control the UE in adaptation to the situation of the UE in the case that the UE has a large coverage area. In the above embodiment of the present disclosure, the initial transmission period or transmission probability is determined under the control of the eNB and may be changed by the UE according to the environmental situation. In an embodiment of the present disclosure, the eNB may transmit the UE the minimum and maximum values of the transmission period or probability, and the UE may change the values depending on the environmental situation in a predetermined range configured by the eNB.

Fallback Operation

When an eNB synchronization signal is not detected while T310 is running, the UE may receive D2DSS from a terminal belonging to the serving eNB to set up the reference time. If the UE fails to receive a synchronization signal from both the eNB and the terminal, the UE may initiate the handover or reselection procedure. The UE sets up the reference time based on an eNB or D2D synchronization signal, switches to mode 2, and communicates through preset fallback resources. To reduce overhead caused by notifying the fallback resource through a separate resource pool, the eNB may notify some of resource allocation patterns in mode 1 or mode 2 as the fallback resource in advance via a broadcast channel or a UE-specific control channel.

As described above, the D2D network of the present disclosure is capable of providing efficient and stable synchronization and advantageous in terms of mitigating interference between terminals and improving communication performance in D2D Discovery, 1:1 communication, and 1:N communication.

While the present disclosure has been shown and described with reference to various embodiments thereof, it will be understood by those skilled in the art that various changes in form and details may be made therein without departing from the spirit and scope of the present disclosure as defined in the appended claims and their equivalents.

What is claimed is:

1. A method for synchronization between user equipments (UEs) in a network supporting device-to-device (D2D) communication, the method comprising:
   identifying, by a UE, whether the UE is in coverage of a base station;
   measuring, by the UE, a received signal power from the base station, if the UE in a radio resource control (RRC) idle state is required D2D communication;
   transmitting, by the UE, a synchronization signal in at least one subframe for D2D synchronization signal transmission if the received signal power is less than a first threshold value; and
   transmitting, by the UE, D2D data through a subframe for D2D communication to a second UE.

2. The method of claim 1, further comprising:
   identifying whether a synchronization signal is received from at least one UE, if the UE is out of coverage of the base station; and
   transmitting the synchronization signal in at least one subframe for D2D synchronization signal transmission, if no synchronization signal is received from any terminal and the UE is out of coverage of the base station.

3. The method of claim 1, further comprising:
   measuring a received signal power form a third UE if the UE is out of coverage of the base station; and
   transmitting the synchronization signal in at least one subframe for D2D synchronization signal transmission if the received signal power from the third UE is less than predetermined threshold value.

4. The method of claim 3, further comprising:
   selecting a UE having the highest priority if synchronization signals are received from two or more UEs.

5. The method of claim 4, wherein each synchronization signal received from the two or more UEs includes information identifying an in-coverage or out of coverage.

6. The method of claim 1, further comprising:
   selecting a subframe for D2D synchronization based on the synchronization offset information, if the SIB including synchronization offset information; and
   transmitting D2D synchronization signal through the selected subframe to the second UE.

7. A user equipment (UE) of supporting device-to-device (D2D) communication, the UE comprising:
   a radio processing device configured to transmit to and receive from base stations and other terminals;
   a memory configured to store control data; and
   at least one processor configured to control the radio processing device,
   wherein the at least one processor is further configured to:
      identify whether the UE is in coverage of a base station,
      measure a received signal power from the base station, if the UE in a radio resource control (RRC) idle state is required D2D communication,
      transmit a synchronization signal in at least one subframe for D2D synchronization signal transmission if the received signal power is less than the threshold value, and
      transmit D2D data through a subframe for D2D communication to a second UE.

8. The UE of claim 7, wherein the at least one processor is further configured to:
   identify whether a synchronization signal is received from at least one UE, if the UE is out of coverage of the base station, and
   transmit the synchronization signal in at least one subframe for D2D synchronization signal transmission, if no synchronization signal is received from any terminal and the UE is out of coverage of the base station.

9. The UE of claim 7, wherein the at least one processor is further configured to:

measure a received signal power form a third UE if the UE is out of coverage of the base station, and transmit the synchronization signal in at least one subframe for D2D synchronization signal transmission if the received signal power from the third UE is less than predetermined threshold value.

10. The UE of claim 8, wherein the at least one processor is further configured to select a UE having the highest priority if synchronization signals are received from two or more UEs.

11. The UE of claim 10, wherein each synchronization signal received from the two or more UEs includes information identifying an in-coverage or out of coverage.

12. The UE of claim 7, wherein the at least one processor is further configured to:
select a subframe for D2D synchronization based on the synchronization offset information, if the SIB including synchronization offset information, and transmit D2D synchronization signal through the selected subframe to the second UE.

* * * * *